US006999242B2

(12) United States Patent
Nanba et al.

(10) Patent No.: US 6,999,242 B2
(45) Date of Patent: Feb. 14, 2006

(54) ZOOM LENS AND OPTICAL APPARATUS HAVING THE SAME

(75) Inventors: Norihiro Nanba, Utsunomiya (JP); Koji Hoshi, Utsunomiya (JP); Hiroyuki Hamano, Yamato (JP); Makoto Sekita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 10/935,225

(22) Filed: Sep. 8, 2004

(65) Prior Publication Data

US 2005/0030642 A1 Feb. 10, 2005

Related U.S. Application Data

(62) Division of application No. 10/355,176, filed on Jan. 31, 2003, which is a division of application No. 09/650,861, filed on Aug. 29, 2000, now Pat. No. 6,545,819.

(30) Foreign Application Priority Data

| | | |
|---|---|---|
| Aug. 31, 1999 | (JP) | 11-245273 |
| Mar. 27, 2000 | (JP) | 2000-086400 |
| Apr. 14, 2000 | (JP) | 2000-113181 |
| Apr. 14, 2000 | (JP) | 2000-113182 |

(51) Int. Cl.
*G02B 15/14* (2006.01)

(52) U.S. Cl. ...................... 359/689; 359/680; 359/685

(58) Field of Classification Search ................ 359/689, 359/680–682, 685–687, 683, 676
See application file for complete search history.

(56) References Cited

U.S. PATENT DOCUMENTS

| | | | |
|---|---|---|---|
| 4,465,343 A | 8/1984 | Horimoto | 359/680 |
| 4,647,160 A | 3/1987 | Ikemori | 359/680 |
| 4,810,072 A | 3/1989 | Takahashi | 359/689 |
| 4,828,372 A | 5/1989 | Betensky et al. | 359/689 |
| 4,832,471 A | 5/1989 | Hamano | 359/683 |
| 4,838,666 A | 6/1989 | Shiraishi | 359/689 |
| 4,934,796 A | 6/1990 | Sugiura et al. | 359/683 |

(Continued)

FOREIGN PATENT DOCUMENTS

EP 0 913 718 A2 5/1999

(Continued)

OTHER PUBLICATIONS

Mar. 2, 2004 Notification of Reasons for Refusal in Japanese Patent Application No. 2000-113182, with English-language translation.

(Continued)

*Primary Examiner*—Jordan M. Schwartz
(74) *Attorney, Agent, or Firm*—Fitzpatrick, Cella, Harper & Scinto

(57) ABSTRACT

A zoom lens, including, in order from an object side to an image side (a) a first lens unit of negative optical power, the first lens unit consisting of, in order from the object side to the image side, a negative lens and a positive lens, (b) a second lens unit of positive optical power, and (c) a third lens unit of positive optical power, wherein a separation between the first lens unit and the second lens unit and a separation between the second lens unit and the third lens unit are varied to effect variation of magnification, wherein, during the variation of magnification from a wide-angle end to a telephoto end with an infinitely distant object focused on, the third lens unit moves monotonically toward the image side or moves with a locus convex toward the image side.

10 Claims, 31 Drawing Sheets

U.S. PATENT DOCUMENTS

| | | | | |
|---|---|---|---|---|
| 4,988,174 | A | 1/1991 | Horiuchi et al. | 359/683 |
| 4,991,942 | A | 2/1991 | Fujibayashi et al. | 359/690 |
| 4,998,809 | A | 3/1991 | Tsuji et al. | 359/557 |
| 4,999,007 | A | 3/1991 | Aoki et al. | 359/676 |
| 5,009,491 | A | 4/1991 | Hata | 359/689 |
| 5,009,492 | A | 4/1991 | Hamano | 359/684 |
| 5,050,972 | A | 9/1991 | Mukaiya et al. | 359/683 |
| 5,103,343 | A | 4/1992 | Sekita | 359/684 |
| 5,132,848 | A | 7/1992 | Nishio et al. | 359/686 |
| 5,134,524 | A | 7/1992 | Hamano et al. | 359/687 |
| 5,138,492 | A | 8/1992 | Hamano et al. | 359/684 |
| 5,182,673 | A | 1/1993 | Kikuchi et al. | 359/691 |
| 5,253,113 | A | 10/1993 | Sekita et al. | 359/680 |
| 5,262,897 | A | 11/1993 | Kawamura | 359/689 |
| 5,270,863 | A | 12/1993 | Uzawa | 359/682 |
| 5,299,064 | A | 3/1994 | Hamano et al. | 359/684 |
| 5,430,576 | A | 7/1995 | Hamano | 359/684 |
| 5,434,710 | A | 7/1995 | Zozawa | 359/689 |
| 5,521,758 | A | 5/1996 | Hamano | 359/557 |
| 5,546,230 | A | 8/1996 | Sato et al. | 359/684 |
| 5,568,321 | A | 10/1996 | Ogawa et al. | 359/676 |
| 5,574,599 | A | 11/1996 | Hoshi et al. | 359/689 |
| 5,600,490 | A | 2/1997 | Sugawara et al. | 359/690 |
| 5,610,766 | A | 3/1997 | Aoki et al. | 359/683 |
| 5,638,216 | A | 6/1997 | Horiuchi et al. | 359/683 |
| 5,677,792 | A | 10/1997 | Hamano | 359/557 |
| 5,682,269 | A | 10/1997 | Kimura et al. | 359/770 |
| 5,745,301 | A | 4/1998 | Betensky et al. | 359/689 |
| 5,751,496 | A | 5/1998 | Hamano | 359/677 |
| 5,771,123 | A | 6/1998 | Hamano | 359/557 |
| 5,774,275 | A | 6/1998 | Hamano | 359/687 |
| 5,815,320 | A | 9/1998 | Hoshi et al. | 359/686 |
| 5,818,646 | A | 10/1998 | Hamano | 359/684 |
| 5,831,772 | A | 11/1998 | Nishio et al. | 359/689 |
| 5,847,875 | A | 12/1998 | Kodama et al. | 359/557 |
| 5,905,530 | A | 5/1999 | Yokota et al. | 348/240 |
| 5,909,318 | A | 6/1999 | Tanaka | 359/689 |
| 5,917,662 | A | 6/1999 | Sekita | 359/729 |
| 5,933,283 | A | 8/1999 | Hamano | 359/687 |
| 5,963,378 | A | 10/1999 | Tochigi et al. | 359/687 |
| 5,969,878 | A | 10/1999 | Koizumi | 359/682 |
| 5,973,858 | A | 10/1999 | Sekita | 359/729 |
| 5,991,091 | A | 11/1999 | Hayakawa | 359/680 |
| 5,995,287 | A | 11/1999 | Sekita | 359/599 |
| 5,999,311 | A | 12/1999 | Nanba et al. | 359/365 |
| 6,016,228 | A | 1/2000 | Uzawa | 359/687 |
| 6,021,004 | A | 2/2000 | Sekita et al. | 359/676 |
| 6,038,084 | A | 3/2000 | Okada et al. | 359/689 |
| 6,052,225 | A | 4/2000 | Hoshi | 359/432 |
| 6,081,389 | A | 6/2000 | Takayama et al. | 359/680 |
| 6,104,547 | A | 8/2000 | Nanba | 359/687 |
| 6,124,986 | A | 9/2000 | Sekita et al. | 359/691 |
| 6,163,400 | A | 12/2000 | Nanba | 359/365 |
| 6,172,818 | B1 * | 1/2001 | Sakamoto | 359/689 |
| 6,185,048 | B1 | 2/2001 | Ishii et al. | 359/687 |
| 6,229,655 | B1 | 5/2001 | Kohno et al. | 359/689 |
| 6,308,011 | B1 | 10/2001 | Wachi et al. | 396/72 |
| 6,349,002 | B1 | 2/2002 | Shibayama et al. | 359/689 |
| 6,452,729 | B1 | 9/2002 | Yamamoto | 359/676 |
| 6,456,443 | B1 | 9/2002 | Kohno et al. | 359/689 |
| 6,473,231 | B1 | 10/2002 | Hamano et al. | 359/557 |
| 6,498,687 | B1 | 12/2002 | Sekita et al. | 359/680 |
| 6,522,475 | B1 | 2/2003 | Akiyama et al. | 359/676 |
| 6,532,114 | B1 | 3/2003 | Kohno et al. | 359/689 |
| 6,606,200 | B1 | 8/2003 | Nakayama et al. | 359/686 |
| 6,633,437 | B1 | 10/2003 | Hoshi et al. | 359/687 |
| 6,650,475 | B1 | 11/2003 | Hamano | 359/557 |
| 6,710,933 | B1 | 3/2004 | Boku et al. | 359/687 |
| 2001/0013980 | A1 | 8/2001 | Kohno et al. | 359/689 |

FOREIGN PATENT DOCUMENTS

| | | |
|---|---|---|
| JP | 48-20536 | 3/1973 |
| JP | 57-26816 | 2/1982 |
| JP | 63-135913 | 6/1988 |
| JP | 3-240011 | 10/1991 |
| JP | 3-288113 | 12/1991 |
| JP | 4-217219 | 8/1992 |
| JP | 4-218013 | 8/1992 |
| JP | 5-173073 | 7/1993 |
| JP | 6-40170 | 5/1994 |
| JP | 7-3507 | 1/1995 |
| JP | 7-261083 | 10/1995 |
| JP | 10-133115 | 5/1998 |
| JP | 10-213745 | 8/1998 |
| JP | 10-293253 | 11/1998 |
| JP | 10-307258 | 11/1998 |
| JP | 11-52237 | 2/1999 |
| JP | 11-52245 | 2/1999 |
| JP | 11-84243 | 3/1999 |
| JP | 11-95103 | 4/1999 |
| JP | 11-95104 | 4/1999 |
| JP | 11-119101 | 4/1999 |
| JP | 11-149044 | 6/1999 |
| JP | 11-194274 | 7/1999 |
| JP | 11-287953 | 10/1999 |
| JP | 2000-9999 | 1/2000 |
| JP | 2000-267009 | 9/2000 |
| JP | 2001-343587 | 12/2001 |

OTHER PUBLICATIONS

Jun. 8, 2004 Decision of Rejection in Japanese Patent Application No. 2000-113182, with English-language translation.

* cited by examiner

FNO/2.00

ω=33.0°

ω=33.0°

ω=33.0°

FNO/2.48

ω=23.3°

ω=23.3°

ω=23.3°

FNO/3.00

ω=17.6°

ω=17.6°

ω=17.6°

ZOOM LENS AND OPTICAL APPARATUS HAVING THE SAME

This application is a division of application Ser. No. 10/355,176 filed Jan. 31, 2003, which is a division of application Ser. No. 09/650,861 filed Aug. 29, 2000, U.S. Pat. No. 6,545,819 B1.

BACKGROUND OF THE INVENTION

1. Field of the Invention

The present invention relates to a zoom lens and an optical apparatus having the zoom lens, and more particularly to a zoom lens suited for a film still camera, a video camera, a digital still camera or the like, which has three lens units in which a lens unit of negative refractive power leads, and which has the entirety of a lens system thereof reduced in size by appropriately setting the lens construction of the respective lens units.

2. Description of Related Art

In recent years, with the advancement of high performance of an image pickup apparatus (camera), such as a video camera or a digital still camera, using a solid-state image sensor, a zoom lens having a large aperture ratio including a wide angle of view is desired for the purpose of being used for an optical system of such an image pickup apparatus. Since, in such an image pickup apparatus, a variety of optical members, including a low-pass filter, a color correction filter, etc., are disposed between the rearmost portion of the zoom lens and the image sensor, a lens system having a relatively long back focal distance is required for the optical system. In addition, in the case of a color camera using an image sensor for color images, a zoom lens excellent in telecentricity on the image side is desired for an optical system of the color camera so as to prevent color shading.

Heretofore, there have been proposed a variety of wide-angle two-unit zoom lenses of the so-called short zoom type each of which is composed of a first lens unit of negative refractive power and a second lens unit of positive refractive power, the separation between the first lens unit and the second lens unit being varied to effect the variation of magnification. In such an optical system of the short zoom type, the variation of magnification is effected by moving the second lens unit of positive refractive power, and the compensation for the shift of an image point due to the variation of magnification is effected by moving the first lens unit of negative refractive power.

In such a lens construction composed of two lens units, the zoom magnification thereof is 2× or thereabout. Further, in order to make the entirety of a lens system in a compact form while having a high variable magnification ratio greater than 2×, there have been proposed, for example, in Japanese Patent Publication No. Hei 7-3507 (corresponding to U.S. Pat. No. 4,810,072), Japanese Patent Publication No. Hei 6-40170 (corresponding to U.S. Pat. No. 4,647,160), etc., the so-called three-unit zoom lenses in each of which a third lens unit of negative or positive refractive power is disposed on the image side of the two-unit zoom lens so as to correct the various aberrations occurring due to the high variable magnification.

Further, in U.S. Pat. No. 4,828,372 and No. 5,262,897, there is disclosed a three-unit zoom lens in which the second lens unit is composed of six lens elements, as a whole, including two cemented lenses, thereby attaining the high variable magnification of 3× or more.

Three-unit zoom lenses satisfying both the back focal distance and the telecentric characteristic have been proposed in, for example, Japanese Laid-Open Patent Application No. Sho 63-135913 (corresponding to U.S. Pat. No. 4,838,666), Japanese Laid-Open Patent Application No. Hei 7-261083, etc. In addition, in Japanese Laid-Open Patent Application No. Hei 3-288113 (corresponding to U.S. Pat. No. 5,270,863), there is disclosed a three-unit zoom lens in which a first lens unit of negative refractive power is fixed and a second lens unit of positive refractive power and a third lens unit of positive refractive power are moved to effect the variation of magnification. However, in these zoom lenses, there are such drawbacks that the number of constituent lens elements of each lens unit is relatively large, the total length of the lens system is great, and the production cost is high.

Further, in recent years, there has been widely used the so-called barrel-retractable zoom lens in which, in order to make the compactness of a camera and the high magnification of a lens system compatible with each other, the separation between the respective adjacent lens units at the time of nonuse of the camera is reduced up to the separation different from that at the time of use of the camera, thereby lessening the amount of protrusion of the zoom lens from the camera body. However, in a case where, as in the conventional zoom lenses, the number of constituent lens elements of each lens unit is large and, as a result, the length of each lens unit on the optical axis is great, or in a case where the amount of movement of each lens unit during zooming and during focusing is large and the total lens length is, therefore, great, it is sometimes impossible to attain the desired length of the zoom lens as retracted.

Further, in the zoom lens disclosed in Japanese Laid-Open Patent Application No. Hei 7-261083, a convex lens (positive lens) is disposed on the most object side of the first lens unit of negative refractive power, so that there is such a drawback that an increase of the outer diameter of the zoom lens when made to have a wide angle is inevitable. In addition, in this zoom lens, since the focusing onto a close object is effected by moving the first lens unit of negative refractive power, there is such a drawback that the construction of a lens mounting mechanism is complicated in combination with the movement for zooming.

Further, in U.S. Pat. No. 4,999,007, there is disclosed a three-unit zoom lens in which each of the first lens unit and the second lens unit is composed of a single lens. However, in this zoom lens, the total lens length at the wide-angle end is relatively great, and, because the distance between the first lens unit and the stop at the wide-angle end is large, the height of incidence of an off-axial ray of light is large to increase the diameter of a lens element of the first lens unit. Therefore, there is such a drawback that the entirety of a lens system becomes large.

BRIEF SUMMARY OF THE INVENTION

In view of the above-mentioned drawbacks of the conventional zoom lenses, an object of the invention is to provide a zoom lens which is suited for a photographic system using a solid-state image sensor, has a high variable magnification ratio despite being compact and small in diameter with less constituent lens elements, and has excellent optical performance, and to provide an optical apparatus having the zoom lens.

To attain the above object, in accordance with an aspect of the invention, there is provided a zoom lens, which comprises, in order from an object side to an image side, a first lens unit of negative optical power, the first lens unit including a negative meniscus lens having a concave surface facing the image side and a positive meniscus lens having a convex surface facing the object side, a second lens unit of positive optical power, the second lens unit including a cemented lens of positive optical power as a whole disposed on the most image side of the second lens unit, and a lens having a concave surface facing the image side and adjoining a surface on the object side of the cemented lens, and a third lens unit of positive optical power, wherein a separation between the first lens unit and the second lens unit and a separation between the second lens unit and the third lens unit are varied to effect variation of magnification.

In accordance with another aspect of the invention, there is provided a zoom lens, which comprises, in order from an object side to an image side, a first lens unit of negative optical power, the first lens unit including a negative meniscus lens having a concave surface facing the image side and a positive meniscus lens having a convex surface facing the object side, a second lens unit of positive optical power, the second lens unit including a negative lens of bi-concave form, a positive lens disposed on the object side of the negative lens of bi-concave form and having a convex surface facing the object side, and a cemented lens of positive optical power as a whole disposed on the image side of the negative lens of bi-concave form, and a third lens unit of positive optical power, wherein a separation between the first lens unit and the second lens unit and a separation between the second lens unit and the third lens unit are varied to effect variation of magnification.

In accordance with a further aspect of the invention, there is provided a zoom lens, which comprises, in order from an object side to an image side, a first lens unit of negative optical power, the first lens unit including a negative meniscus lens having a concave surface facing the image side and a positive meniscus lens having a convex surface facing the object side, a second lens unit of positive optical power, the second lens unit including, in order from the object side to the image side, one or two positive lenses, a negative lens of bi-concave form, and a cemented lens of positive optical power as a whole, and a third lens unit of positive optical power, wherein a separation between the first lens unit and the second lens unit and a separation between the second lens unit and the third lens unit are varied to effect variation of magnification, and wherein the zoom lens satisfies the following conditions:

$$0.5<fc/f2<2.0$$

$$0.5<(Ra+Rb)/(Ra-Rb)<2.5$$

$$0.3<|fn|/f2<2.0$$

$$0.5<(Rd+Rc)/(Rd-Rc)<2.5$$

where fc is a focal length of the cemented lens in the second lens unit, fn is a focal length of the negative lens in the second lens unit, f2 is a focal length of the second lens unit, Ra is a radius of curvature of a surface on the object side of the cemented lens in the second lens unit, Rb is a radius of curvature of a surface on the image side of the negative lens in the second lens unit, and Rc and Rd are radii of curvature of lens surfaces on the object side and the image side, respectively, of the positive lens disposed on the most object side of the second lens unit.

In accordance with a still further aspect of the invention, there is provided a zoom lens, which comprises, in order from an object side to an image side, a first lens unit of negative optical power, the first lens unit including a negative lens and a positive lens, a second lens unit of positive optical power, the second lens unit consisting of a cemented lens and one positive lens, and a third lens unit of positive optical power, the third lens unit including a positive lens, wherein a separation between the first lens unit and the second lens unit and a separation between the second lens unit and the third lens unit are varied to effect variation of magnification.

In accordance with a still further aspect of the invention, there is provided a zoom lens, which comprises, in order from an object side to an image side, a first lens unit of negative optical power, a second lens unit of positive optical power, and a third lens unit of positive optical power, the third lens unit consisting of one or two lenses including a positive lens, wherein a separation between the first lens unit and the second lens unit and a separation between the second lens unit and the third lens unit are varied to effect variation of magnification, and wherein the zoom lens satisfies the following conditions:

$$ndp3<1.5$$

$$\nu dp3>70.0$$

where ndp3 and νdp3 are a refractive index and Abbe number, respectively, of material of the positive lens in the third lens unit.

In accordance with a still further aspect of the invention, there is provided a zoom lens, which comprises, in order from an object side to an image side, a first lens unit of negative optical power, a second lens unit of positive optical power, and a third lens unit of positive optical power, wherein a separation between the first lens unit and the second lens unit and a separation between the second lens unit and the third lens unit are varied to effect variation of magnification, and wherein, during the variation of magnification from a wide-angle end to a telephoto end with an infinitely distant object focused on, the third lens unit moves monotonically toward the image side or moves with a locus convex toward the image side, and the zoom lens satisfies the following condition:

$$0.08<M3/fw<0.4$$

where M3 is an amount of movement of the third lens unit toward the image side during the variation of magnification from the wide-angle end to the telephoto end with an infinitely distant object focused on, and fw is a focal length of the zoom lens at the wide-angle end.

In accordance with a still further aspect of the invention, there is provided a zoom lens, which comprises, in order from an object side to an image side, a first lens unit of negative optical power, the first lens unit consisting of, in order from the object side to the image side, a negative lens and a positive lens, a second lens unit of positive optical power, and a third lens unit of positive optical power, wherein a separation between the first lens unit and the second lens unit and a separation between the second lens unit and the third lens unit are varied to effect variation of magnification, wherein, with an infinitely distant object focused on, the third lens unit is located nearer to the image side at a telephoto end than at a wide-angle end, and wherein the zoom lens satisfies the following condition:

$$0.7<|f1/ft|<1.0$$

where f1 is a focal length of the first lens unit, and ft is a focal length of the zoom lens at the telephoto end.

In accordance with a still further aspect of the invention, there is provided a zoom lens, which comprises, in order from an object side to an image side, a first lens unit of negative optical power, the first lens unit consisting of, in order from the object side to the image side, a negative lens and a positive lens, a second lens unit of positive optical power, and a third lens unit of positive optical power, focusing being effected by moving the third lens unit, wherein a separation between the first lens unit and the second lens unit and a separation between the second lens unit and the third lens unit are varied to effect variation of magnification, and wherein, during the variation of magnification from a wide-angle end to a telephoto end with an infinitely distant object focused on, the third lens unit moves monotonically toward the image side or moves with a locus convex toward the image side, and the zoom lens satisfies the following conditions:

$$0.08<M3/fw<0.4$$

$$0.7<|f1/ft|<1.0$$

$$1.45<f3/ft<2.0$$

$$0.63<f2/ft<0.8$$

where M3 is an amount of movement of the third lens unit toward the image side during the variation of magnification from the wide-angle end to the telephoto end with an infinitely distant object focused on, fw and ft are focal lengths of the zoom lens at the wide-angle end and the telephoto end, respectively, and f1, f2 and f3 are focal lengths of the first lens unit, the second lens unit and the third lens unit, respectively.

Further, an optical apparatus according to the invention comprises a zoom lens set forth in accordance with any one of the above aspects of the invention.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

According to the embodiments of the invention, there is provided a zoom lens which satisfies at least one of the following items.

(i) To correct well astigmatism and distortion at the wide-angle end, in particular.

(ii) To reduce the share of correcting aberration of a moving lens unit while taking the smallest lens construction, and to lessen the deterioration of performance due to the decentering or the like of lens units caused by manufacturing errors, thereby making it easy to manufacture the zoom lens.

(iii) To attain a large aperture ratio suited for a high-density-pixel image sensor having low sensitivity.

(iv) To realize the good telecentric image formation on the image side suited for a photographing system using a solid-state image sensor while minimizing the number of constituent lens elements of the zoom lens.

(v) To shorten the length on the optical axis of each lens unit required for the barrel-retractable zoom lens, and the amount of movement on the optical axis of each lens unit during zooming and during focusing.

(vi) To correct well distortion not only at the wide-angle end but also over the entire range of zooming.

(vii) To lessen the variation of the image-side telecentric image formation due to zooming.

(viii) To reduce the amount of movement of a variator lens unit while retaining the telecentric image formation, thereby attaining the further reduction in size.

(ix) To simplify a focusing mechanism for a close object.

(First Embodiment)

FIG. 1 to FIGS. 20A to 20D relate to a first embodiment of the invention, which corresponds to numerical examples 1 to 5 of the invention to be described later.

Figure 1:
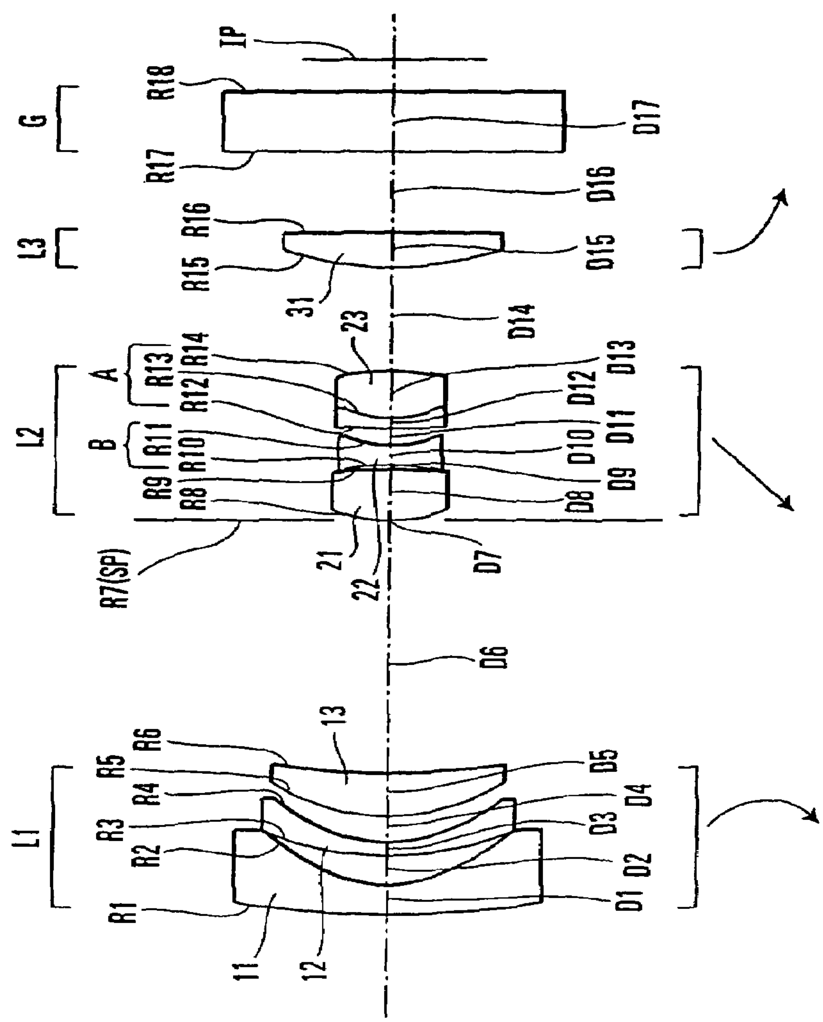
FIG. 1 is a lens block diagram showing a zoom lens at the wide-angle end according to a numerical example 1 of the invention.
Figure 2A:
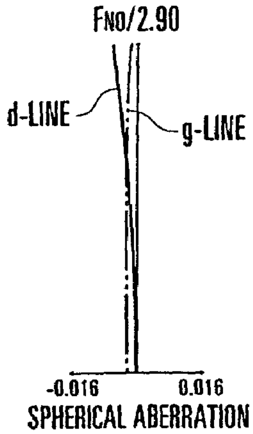
FIGS. 2A to 2D are graphs showing aberration curves at the wide-angle end in the zoom lens according to the numerical example 1 of the invention.
Figure 2B:
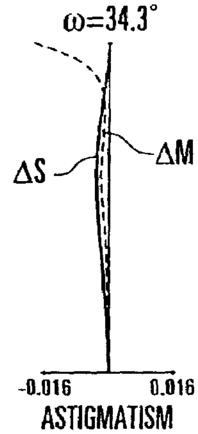
Figure 2C:
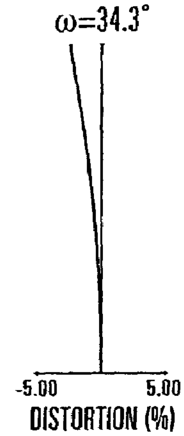
Figure 2D:
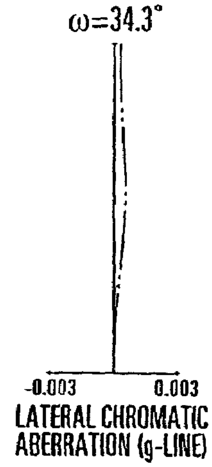
Figure 3A:
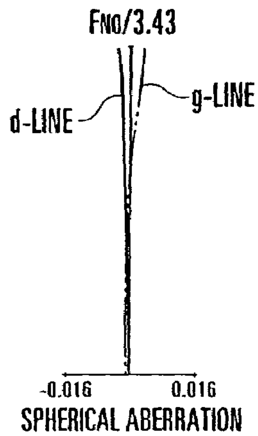
FIGS. 3A to 3D are graphs showing aberration curves at the middle focal length position in the zoom lens according to the numerical example 1 of the invention.
Figure 3B:
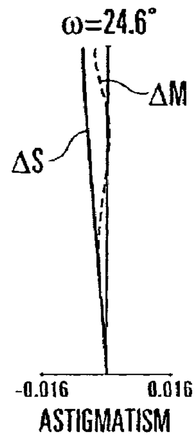
Figure 3C:
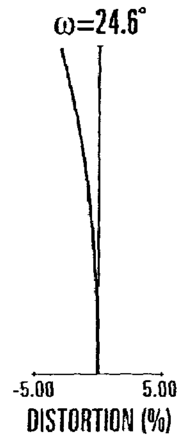
Figure 3D:
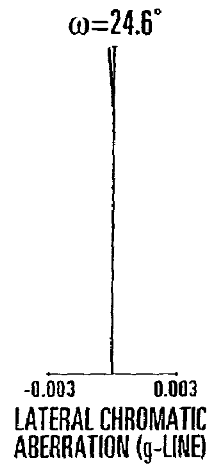
Figure 4A:
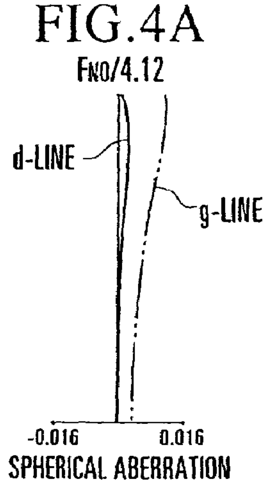
FIGS. 4A to 4D are graphs showing aberration curves at the telephoto end in the zoom lens according to the numerical example 1 of the invention.
Figure 4B:
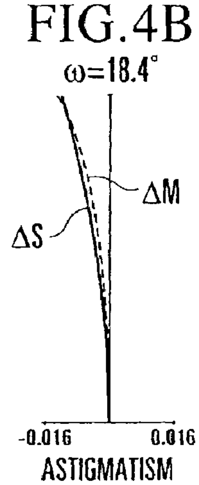
Figure 4C:
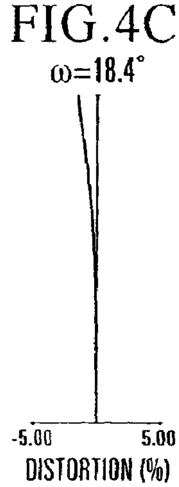
Figure 4D:
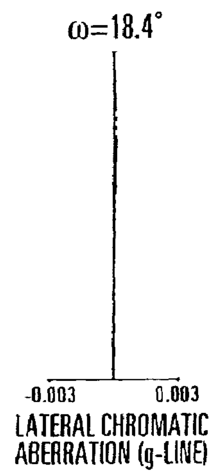

FIG. 1 is a lens block diagram showing a zoom lens according to the numerical example 1 of the invention. FIGS. 2A to 2D through FIGS. 4A to 4D are graphs showing aberration curves at the wide-angle end, the middle focal length position and the telephoto end, respectively, in the zoom lens according to the numerical example 1 of the invention.

Figure 5:
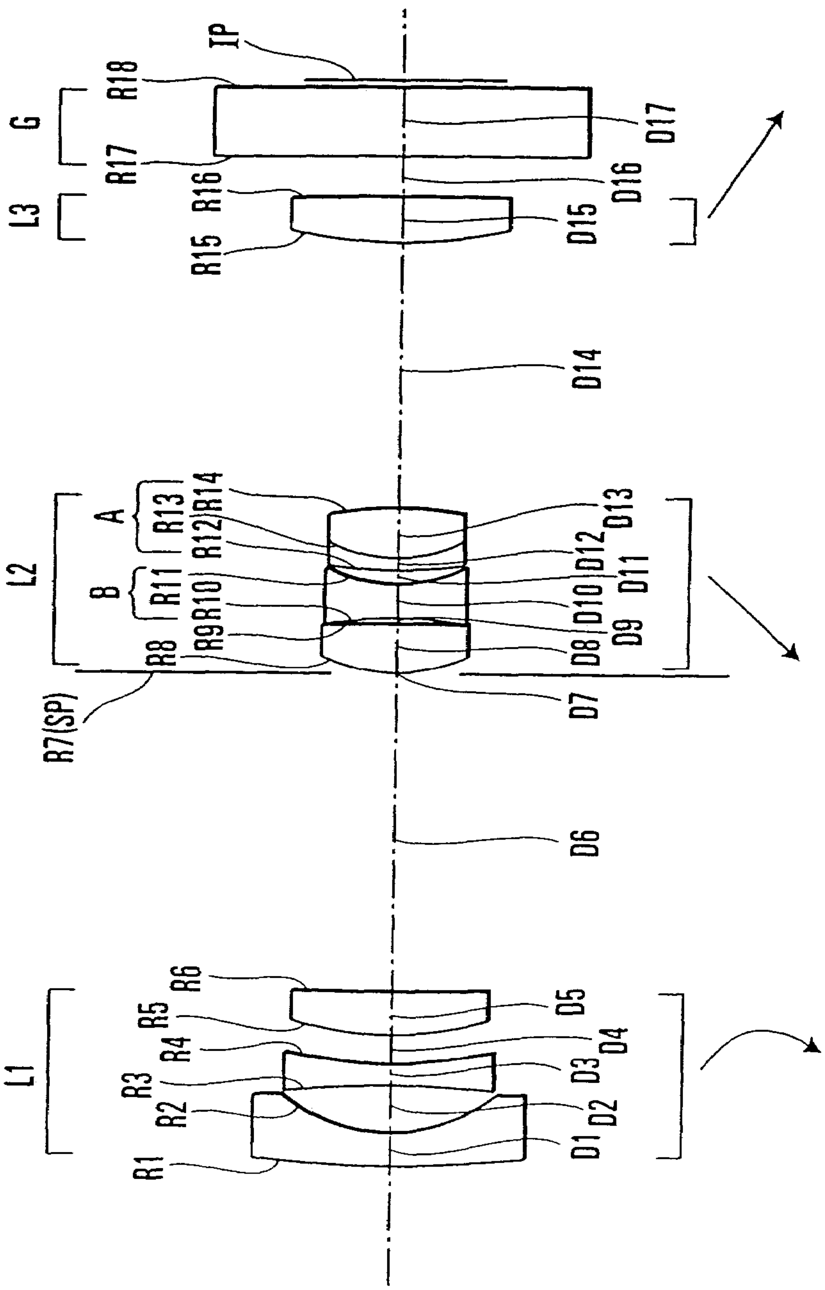
FIG. 5 is a lens block diagram showing a zoom lens at the wide-angle end according to a numerical example 2 of the invention.
Figure 6A:
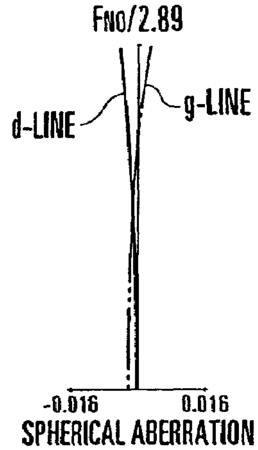
FIGS. 6A to 6D are graphs showing aberration curves at the wide-angle end in the zoom lens according to the numerical example 2 of the invention.
Figure 6B:
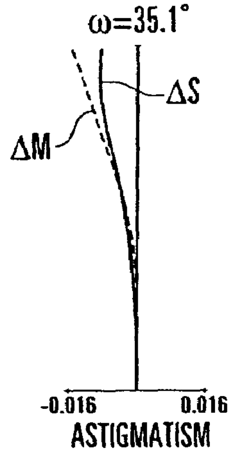
Figure 6C:
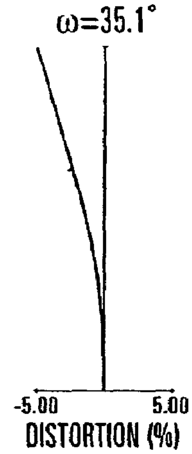
Figure 6D:
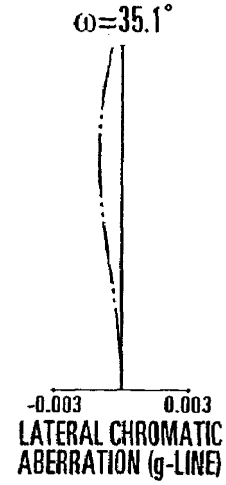
Figure 7A:
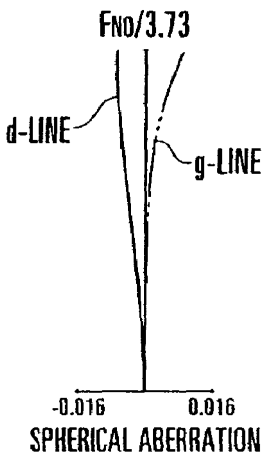
FIGS. 7A to 7D are graphs showing aberration curves at the middle focal length position in the zoom lens according to the numerical example 2 of the invention.
Figure 7B:
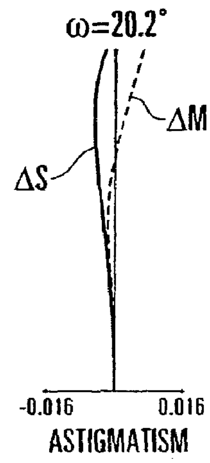
Figure 7C:
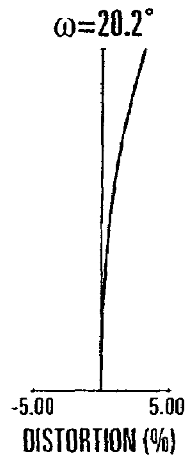
Figure 7D:
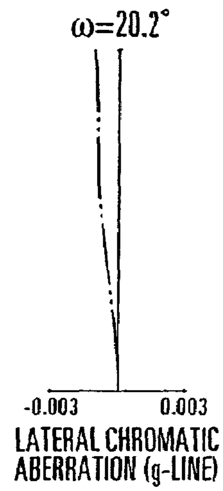
Figure 8A:
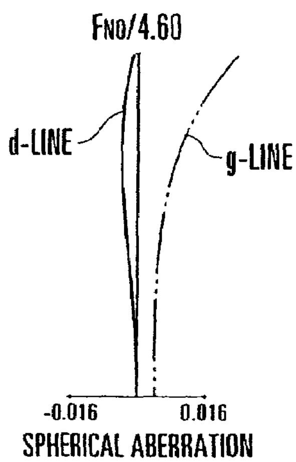
FIGS. 8A to 8D are graphs showing aberration curves at the telephoto end in the zoom lens according to the numerical example 2 of the invention.
Figure 8B:
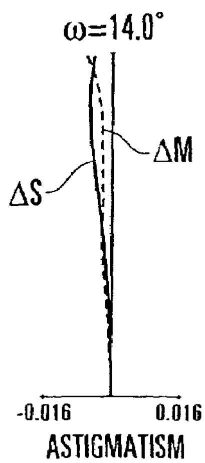
Figure 8C:
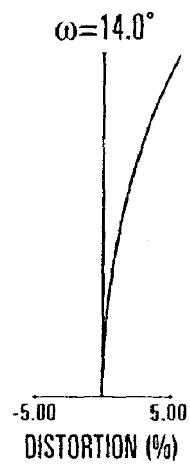
Figure 8D:
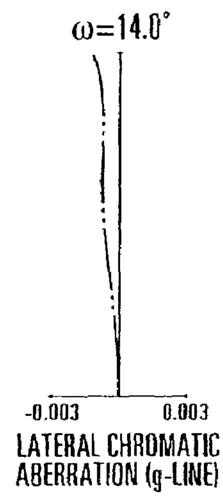

FIG. 5 is a lens block diagram showing a zoom lens according to the numerical example 2 of the invention. FIGS. 6A to 6D through FIGS. 8A to 8D are graphs showing aberration curves at the wide-angle end, the middle focal length position and the telephoto end, respectively, in the zoom lens according to the numerical example 2 of the invention.

Figure 9:
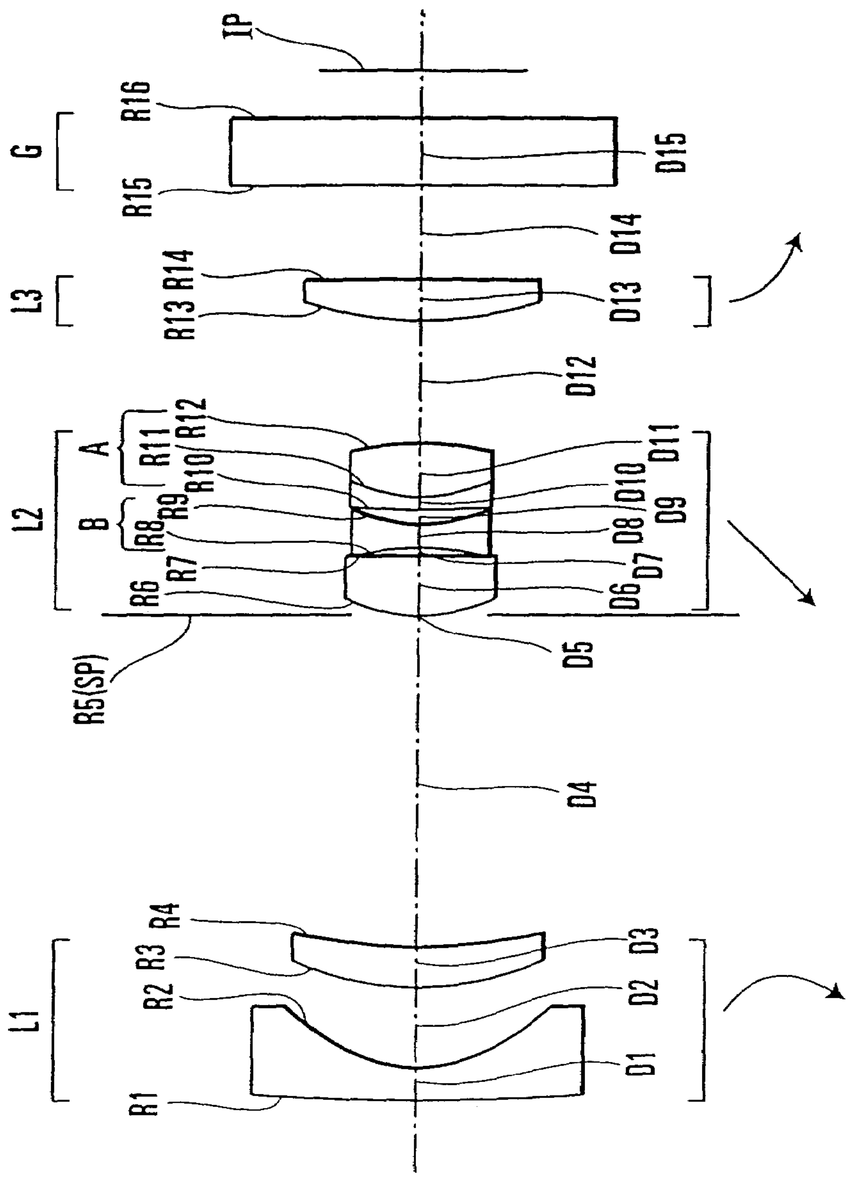
FIG. 9 is a lens block diagram showing a zoom lens at the wide-angle end according to a numerical example 3 of the invention.
Figure 10A:
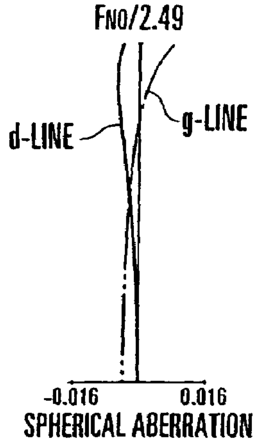
FIGS. 10A to 10D are graphs showing aberration curves at the wide-angle end in the zoom lens according to the numerical example 3 of the invention.
Figure 10B:
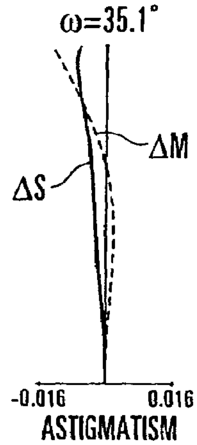
Figure 10C:
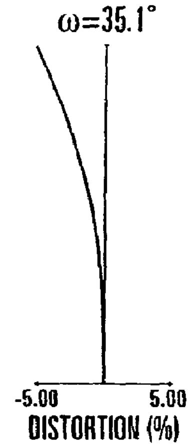
Figure 10D:
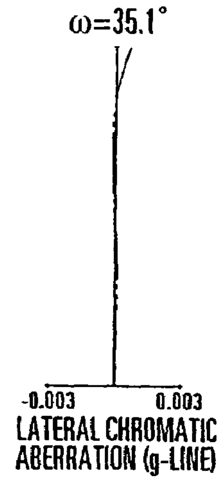
Figure 11A:
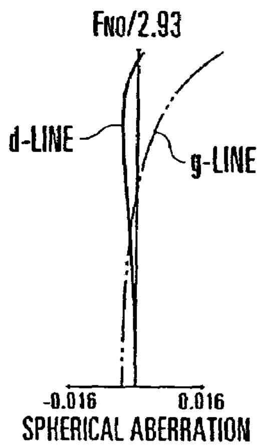
FIGS. 11A to 11D are graphs showing aberration curves at the middle focal length position in the zoom lens according to the numerical example 3 of the invention.
Figure 11B:
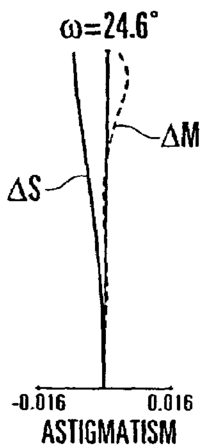
Figure 11C:
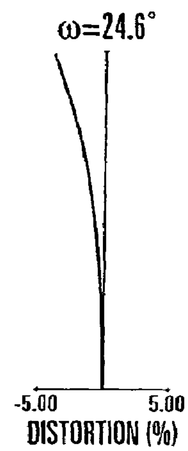
Figure 11D:
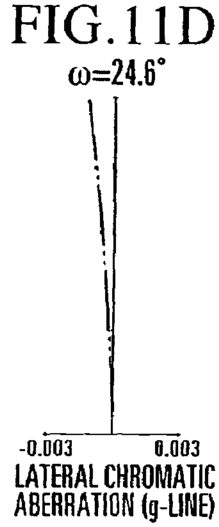
Figure 12A:
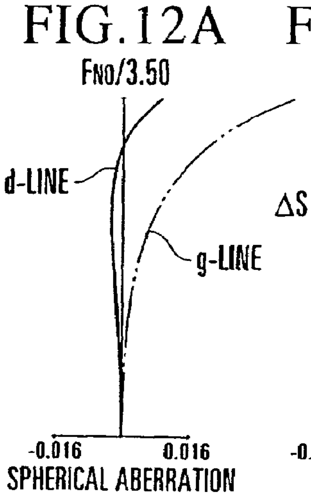
FIGS. 12A to 12D are graphs showing aberration curves at the telephoto end in the zoom lens according to the numerical example 3 of the invention.
Figure 12B:
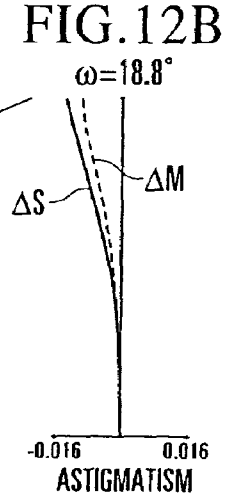
Figure 12C:
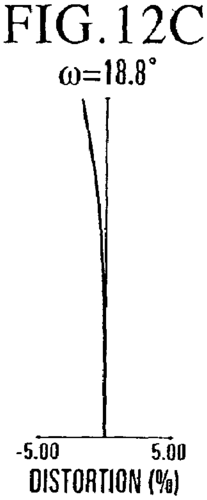
Figure 12D:
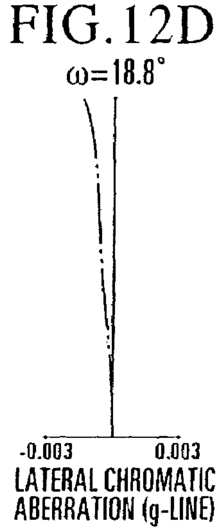

FIG. 9 is a lens block diagram showing a zoom lens according to the numerical example 3 of the invention. FIGS. 10A to 10D through FIGS. 12A to 12D are graphs showing aberration curves at the wide-angle end, the middle focal length position and the telephoto end, respectively, in the zoom lens according to the numerical example 3 of the invention.

Figure 13:
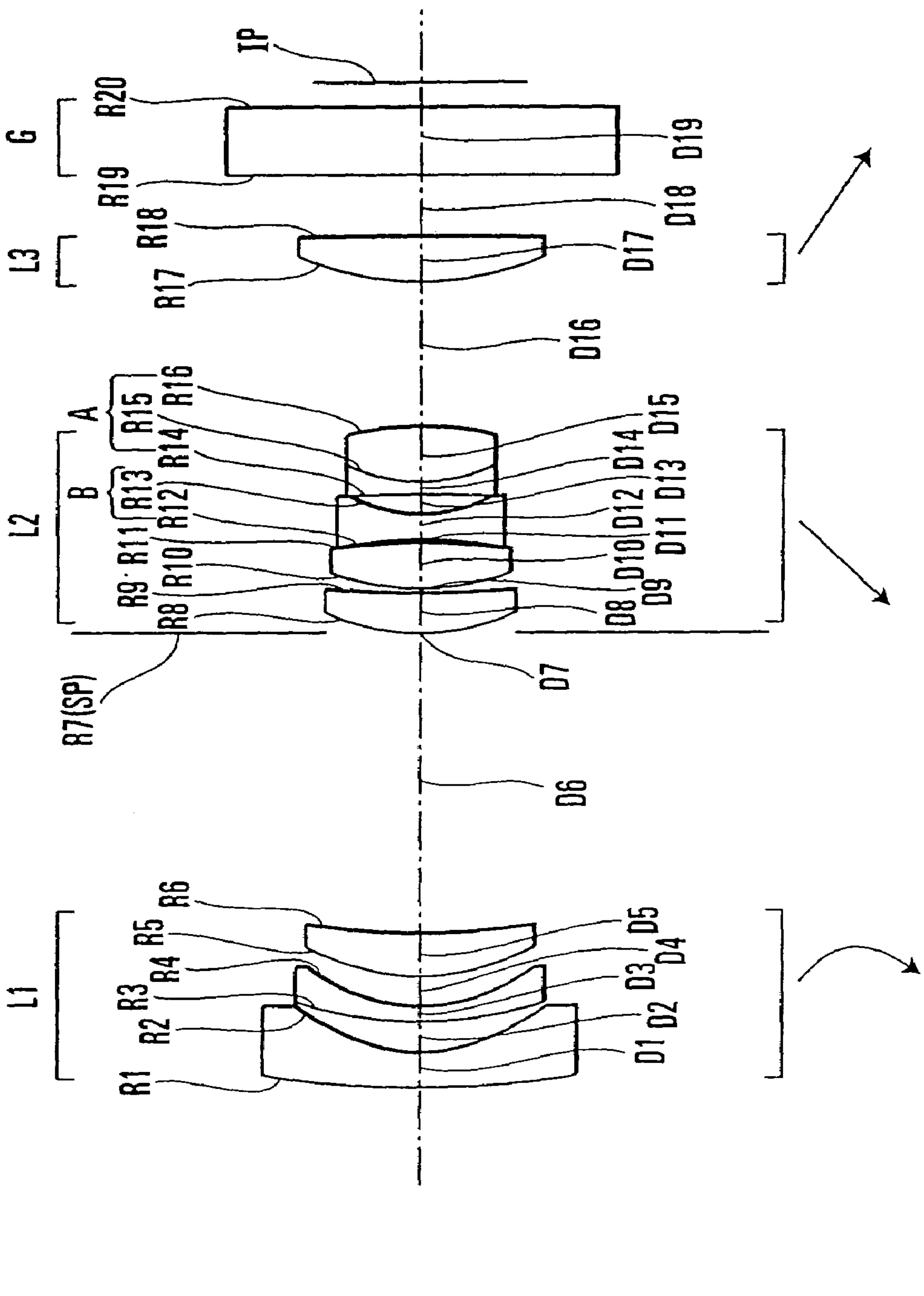
FIG. 13 is a lens block diagram showing a zoom lens at the wide-angle end according to a numerical example 4 of the invention.
Figure 14A:
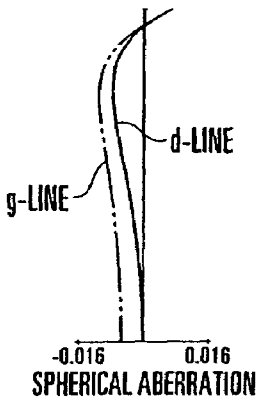
FIGS. 14A to 14D are graphs showing aberration curves at the wide-angle end in the zoom lens according to the numerical example 4 of the invention.
Figure 14B:
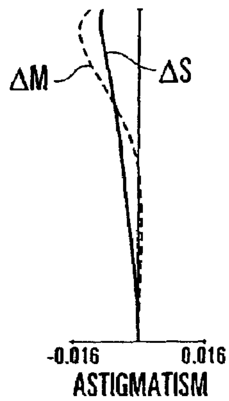
Figure 14C:
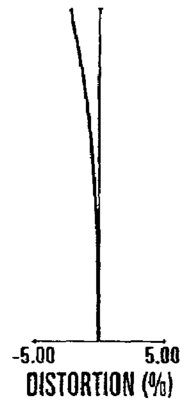
Figure 14D:
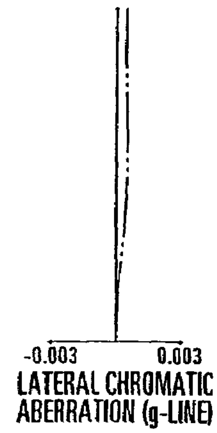
Figure 15A:
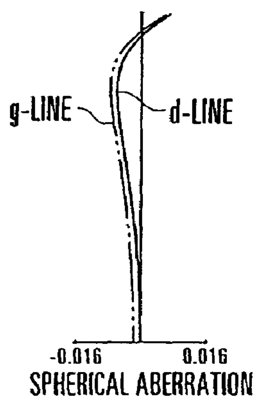
FIGS. 15A to 15D are graphs showing aberration curves at the middle focal length position in the zoom lens according to the numerical example 4 of the invention.
Figure 15B:
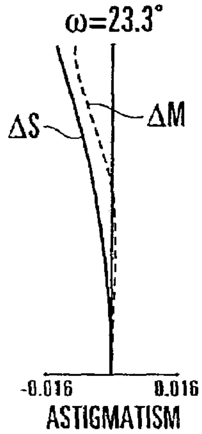
Figure 15C:
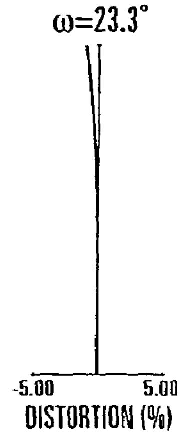
Figure 15D:
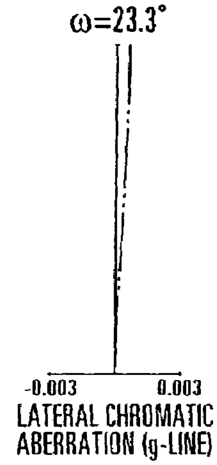
Figure 16A:
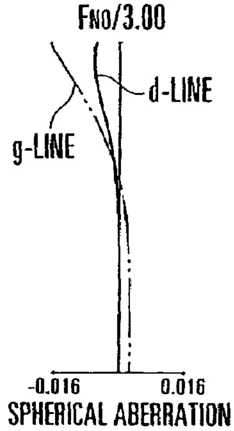
FIGS. 16A to 16D are graphs showing aberration curves at the telephoto end in the zoom lens according to the numerical example 4 of the invention.
Figure 16B:
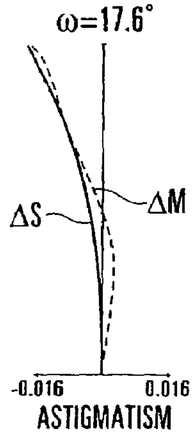
Figure 16C:
Figure 16D:
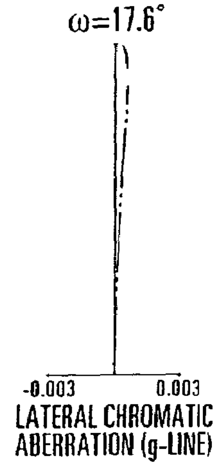

FIG. 13 is a lens block diagram showing a zoom lens according to the numerical example 4 of the invention. FIGS. 14A to 14D through FIGS. 16A to 16D are graphs showing aberration curves at the wide-angle end, the middle focal length position and the telephoto end, respectively, in the zoom lens according to the numerical example 4 of the invention.

Figure 17:
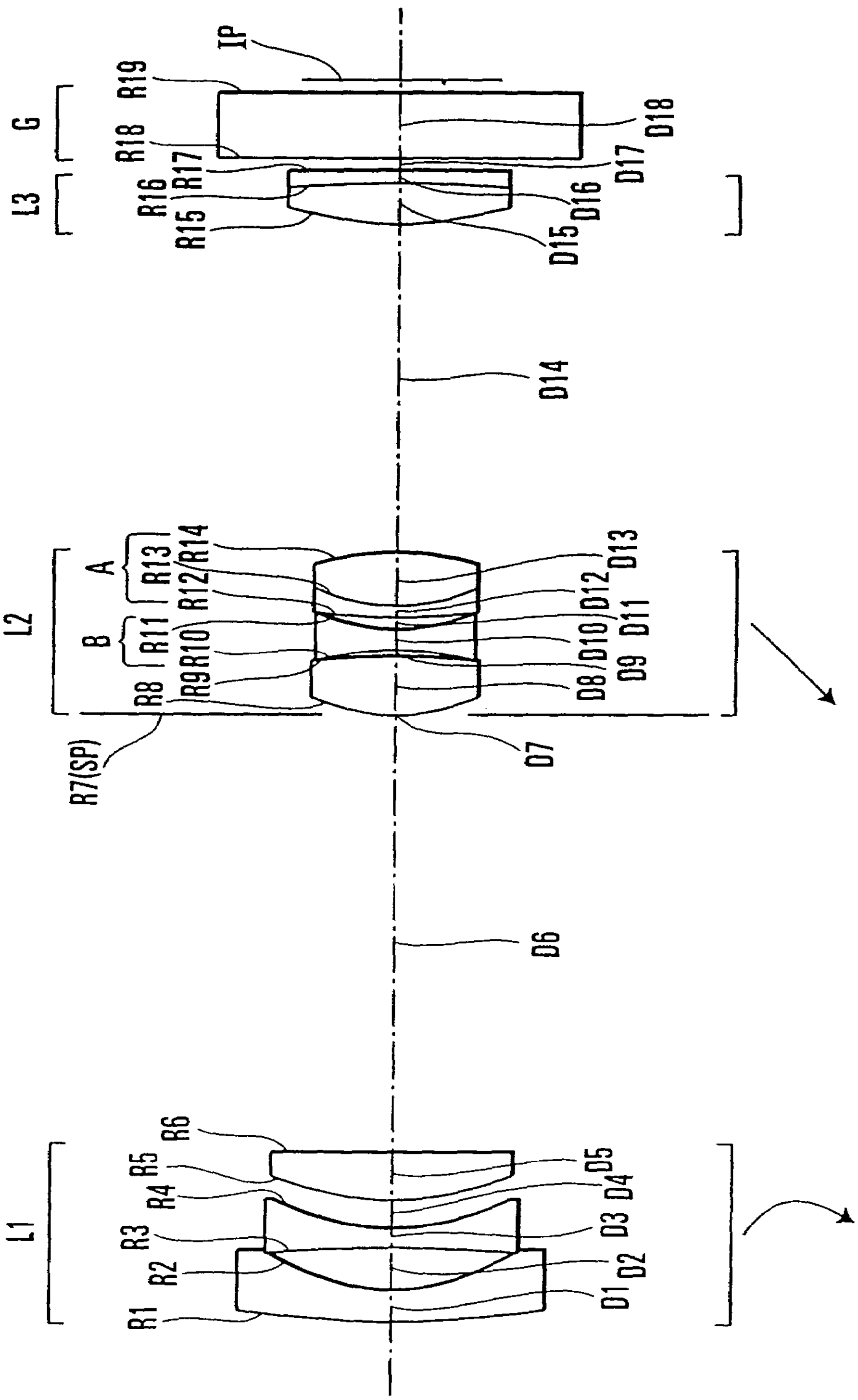
FIG. 17 is a lens block diagram showing a zoom lens at the wide-angle end according to a numerical example 5 of the invention.
Figure 18A:
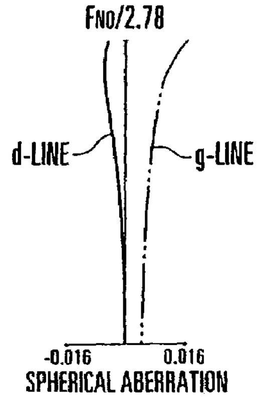
FIGS. 18A to 18D are graphs showing aberration curves at the wide-angle end in the zoom lens according to the numerical example 5 of the invention.
Figure 18B:
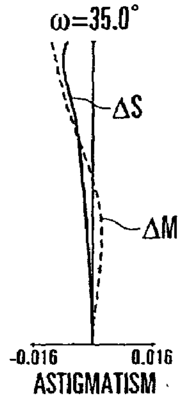
Figure 18C:
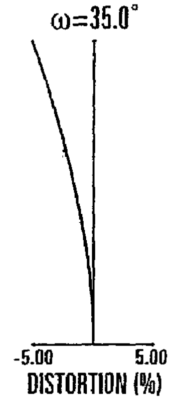
Figure 18D:
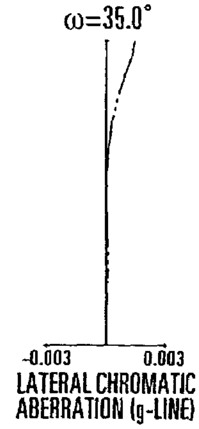
Figure 19A:
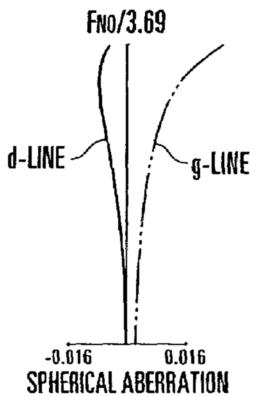
FIGS. 19A to 19D are graphs showing aberration curves at the middle focal length position in the zoom lens according to the numerical example 5 of the invention.
Figure 19B:
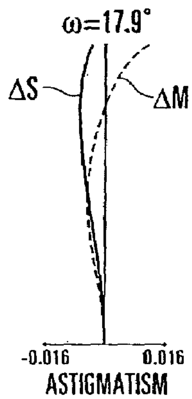
Figure 19C:
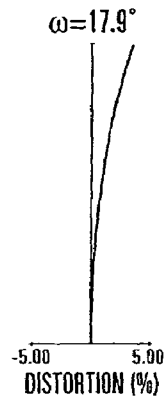
Figure 19D:
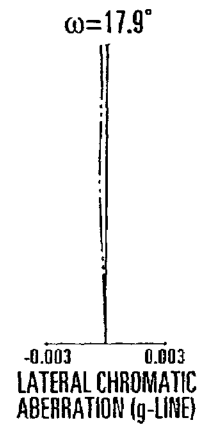
Figure 20A:
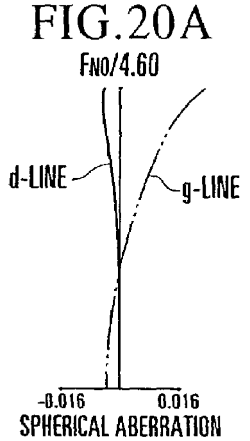
FIGS. 20A to 20D are graphs showing aberration curves at the telephoto end in the zoom lens according to the numerical example 5 of the invention.
Figure 20B:
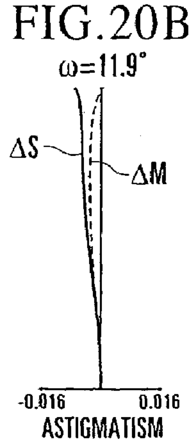
Figure 20C:
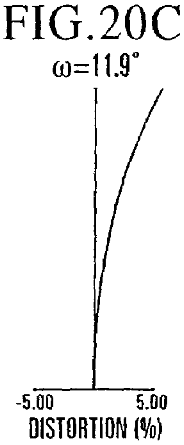
Figure 20D:
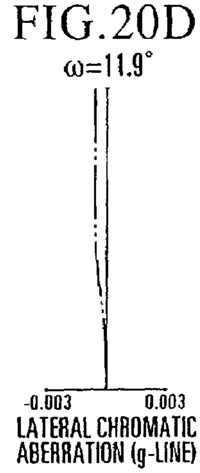

FIG. 17 is a lens block diagram showing a zoom lens according to the numerical example 5 of the invention. FIGS. 18A to 18D through FIGS. 20A to 20D are graphs showing aberration curves at the wide-angle end, the middle focal length position and the telephoto end, respectively, in the zoom lens according to the numerical example 5 of the invention.

In the lens block diagrams shown in FIGS. 1, 5, 9, 13 and 17, reference character L1 denotes a first lens unit of negative refractive power, reference character L2 denotes a second lens unit of positive refractive power, reference character L3 denotes a third lens unit of positive refractive power, reference character SP denotes an aperture stop for determining the brightness of an optical system, reference character IP denotes an image plane, and reference character G denotes a glass block, such as a filter or a color separation prism.

In the basic construction of the zoom lens according to the first embodiment, the first lens unit of negative refractive power and the second lens unit of positive refractive power constitute the so-called short zoom system, and the variation of magnification is effected by moving the second lens unit of positive refractive power while the shift of an image point due to the variation of magnification is compensated for by moving forward and backward the first lens unit of negative refractive power. The third lens unit of positive refractive power, when being made stationary during zooming (in the case of the numerical example 5), does not contribute to the variation of magnification, but shares the increase of a refractive power of the photographic lens due to the reduction in size of an image sensor so as to decrease a refractive power of the short zoom system composed of the first and second lens units. Therefore, in particular, it is possible to suppress the occurrence of aberrations in lens elements constituting the first lens unit, thereby attaining good optical performance. Further, the formation of a telecentric image on the image side required for an image pickup apparatus using a solid-state image sensor or the like is attained by making the third lens unit of positive refractive power have the role of a field lens. On the other hand, in a case where the third lens unit is made to move during zooming (in the cases of the numerical examples 1 to 4), the height from the optical axis of an off-axial ray incident on the third lens unit can be controlled. Therefore, the faculty of correcting the various off-axial aberrations is enhanced, so that it is possible to realize good optical performance over the entire range of variable magnification.

Further, the stop SP is disposed on the object side of the second lens unit so as to shorten the distance between the entrance pupil and the first lens unit at the wide-angle end, so that the outer diameter of lens elements constituting the first lens unit is prevented from increasing. In addition, the various off-axial aberrations are canceled by the first lens unit and the third lens unit between which the stop SP disposed on the object side of the second lens unit of positive refractive power is put, so that it is possible to obtain good optical performance without increasing the number of constituent lens elements.

In particular, the zoom lens according to the first embodiment of the invention has any one of the following characteristic features (1—1), (1-2) and (1-3) under the basic construction described above.

(1—1) The first lens unit includes a negative lens of meniscus form having a concave surface facing the image side, and a positive lens of meniscus form having a convex surface facing the object side, and the second lens unit includes a cemented lens A of positive refractive power as a whole disposed on the most image side of the second lens unit and composed of a negative lens and a positive lens, and a lens B disposed on the most image side among lenses disposed closer to the object side than the cemented lens A, a lens surface on the image side of the lens B having a shape having a concave surface facing the image side.

In addition, in the above construction (1—1), it is preferable to satisfy at least one of the following conditions (a-1) and (a-2).

(a-1) The following conditions are satisfied:

$$0.5 < fc/f2 < 2.0 \quad (1)$$

$$0.5 < (Ra+Rb)/(Ra-Rb) < 2.5 \quad (2)$$

where fc is the focal length of the cemented lens A in the second lens unit, f2 is the focal length of the second lens unit, Ra is a radius of curvature of a lens surface on the object side of the cemented lens A, and Rb is a radius of curvature of the lens surface on the image side of the lens B.

(a-2) The second lens unit includes, in order from the object side to the image side, a positive lens having a convex surface facing the object side, a negative lens having a concave surface facing the image side, and a cemented lens.

(1-2) The first lens unit includes a negative lens of meniscus form having a concave surface facing the image side, and a positive lens of meniscus form having a convex surface facing the object side, and the second lens unit includes a negative lens of bi-concave form, a positive lens disposed on the object side of the negative lens of bi-concave form and having a convex surface facing the object side, and a cemented lens of positive refractive power as a whole disposed on the image side of the negative lens of bi-concave form and composed of a negative lens and a positive lens.

In addition, in the above construction (1-2), it is preferable to satisfy at least one of the following conditions (b-1) and (b-2).

(b-1) The following conditions are satisfied:

$$0.3<|fn|/f2<2.0 \quad (3)$$

$$0<(Rd+Rc)/(Rd-Rc)<2.5 \quad (4)$$

where fn is the focal length of the negative lens of bi-concave form in the second lens unit, f2 is the focal length of the second lens unit, Rc and Rd are radii of curvature of lens surfaces on the object side and the image side, respectively, of the positive lens disposed on the most object side of the second lens unit and having a convex surface facing the object side.

(b-2) The third lens unit consists of one positive lens, or consists of a cemented lens of positive refractive power as a whole composed of a positive lens and a negative lens.

(1-3) The first lens unit includes a negative lens of meniscus form having a concave surface facing the image side and a positive lens of meniscus form having a convex surface facing the object side, and the second lens unit includes, in order from the object side to the image side, one or two positive lenses, a negative lens B of bi-concave form, and a cemented lens A composed of a negative lens and a positive lens, and the zoom lens satisfies the following conditions:

$$0.5<fc/f2<2.0 \quad (1)$$

$$0.5<(Ra+Rb)/(Ra-Rb)<2.5 \quad (2)$$

$$0.3<|fn|/f2<2.0 \quad (3)$$

$$0<(Rd+Rc)/(Rd-Rc)<2.5 \quad (4)$$

where fc is the focal length of the cemented lens A in the second lens unit, f2 is the focal length of the second lens unit, Ra is a radius of curvature of a lens surface on the object side of the cemented lens A, Rb is a radius of curvature of a lens surface on the image side of the negative lens B, fn is a focal length of the negative lens B in the second lens unit, Rc and Rd are radii of curvature of lens surfaces on the object side and the image side, respectively, of a positive lens disposed on the most object side of the second lens unit and having a convex surface facing the object side.

Next, the characteristic features of the above constructions (1—1) to (1-3) according to the first embodiment of the invention are further described in detail.

In the zoom lens according to the first embodiment, the first lens unit of negative refractive power is composed of two lenses, i.e., in order from the object side to the image side, a negative lens of meniscus form having a convex surface facing the object side and a positive lens of meniscus form having a convex surface facing the object side, or the first lens unit of negative refractive power is composed of three lenses, i.e., in order from the object side to the image side, a concave lens (negative lens) 11 having a concave surface facing the image side, a concave lens (negative lens) 12 having a concave surface facing the image side and a convex lens (positive lens) 13 having a convex surface facing the object side. Further, the second lens unit of positive refractive power is composed of three lens subunits including four lens elements, i.e., in order from the object side to the image side, a convex lens (positive lens) 21 having a convex surface facing the object side, a concave lens (negative lens) 22 of bi-concave form, and a cemented lens 23 composed of a negative lens and a positive lens, or the second lens unit of positive-refractive power is composed of four lens subunits including five lens elements, i.e., in order from the object side to the image side, two positive lenses, a negative lens 22 of bi-concave form, and a cemented lens 23 composed of a negative lens and a positive lens.

Further, the third lens unit of positive refractive power is composed of one convex lens or a cemented lens composed of a positive lens and a negative lens. By adopting such a desired refractive power arrangement as to be compatible with the correction of aberrations, as described above, it is possible to attain the compactness of a lens system while keeping good optical performance.

The first lens unit of negative refractive power has the role of causing an off-axial principal ray to be pupil-imaged on the center of the stop. In particular, since the amount of refraction of the off-axial principal ray is large at the wide-angle end, the various off-axial aberrations, particularly, astigmatism and distortion, tend to occur. Therefore, similarly to the ordinary wide-angle lens, the zoom lens according to the first embodiment is made to have the concave-convex arrangement by which the increase of the lens diameter on the most object side can be prevented, and then the negative refractive power is shared by the two negative lens units 11 and 12 which mainly share the negative refractive power of the first lens unit. Lenses constituting the first lens unit have respective shapes close to concentrical spherical surfaces centered on the center of the stop so as to suppress the occurrence of off-axial aberration caused by the refraction of an off-axial principal ray. Thus, each of the negative lenses 11 and 12 is made in the meniscus form having a concave surface facing the image side, and the positive lens 13 is made in the meniscus form having a convex surface facing the object side.

The second lens unit of positive refractive power is constructed in a symmetrical form on the refractive power arrangement by respectively disposing positive lenses before and behind the concave lens 22 of bi-concave form. This is because, since the second lens unit is arranged to move greatly during the variation of magnification, in order to prevent the degradation of optical performance due to the decentering or the like of lens units caused by a manufacturing error, it is necessary for the second lens unit itself to remove spherical aberration, coma, etc., to a certain degree.

The convex lens 21 disposed on the most object side of the second lens unit is made in a form convex toward the object side so as to prevent an off-axial principal ray having exited from the first lens unit from being greatly refracted to generate the various off-axial aberrations. Further, also, in order to decrease the amount of occurrence of spherical aberration with respect to an on-axial light flux having exited from the first lens unit in a diverging manner, the convex lens 21 is made in a form convex toward the object side.

Further, both lens surfaces on the object side and the image side of the concave lens 22 are concave, and a negative air lens is formed by the concave lens 22 and each of the convex lens 21 and the positive cemented lens 23 which are disposed before and behind the concave lens 22, so that spherical aberration and coma which occur owing to the large aperture ratio are corrected well.

Further, the cemented lens 23 is disposed on the image side of the concave lens 22 to correct chromatic aberration well. In the zoom lens according to the first embodiment, since the height at which an off-axial light flux bends in the first lens unit is high at the wide-angle end and low at the telephoto end, the variation of lateral chromatic aberration due to the variation of magnification occurs in the first lens unit in particular. Therefore, the refractive power arrangement of the first lens unit and the selection of glass material therefor are made in such a way as to make, especially, the variation of lateral chromatic aberration minimum. In a case where the first lens unit is formed in the concave-convex construction, as described above, to make the first lens unit compact and the number of constituent lens elements of the first lens unit is made to be two or three, a component of the variation of longitudinal chromatic aberration tends to remain within the first lens unit. Therefore, the cemented lens is disposed within the second lens unit to correct longitudinal chromatic aberration well.

Further, in order to cause the second lens unit also to take its share of the correction of lateral chromatic aberration even to a small extent, it is effective that the cemented lens is disposed distant from the stop. Therefore, in the first embodiment, the cemented lens is disposed on the image side of the concave lens 22.

The third lens unit of positive refractive power is constructed with a convex lens of form having a convex surface facing the object side, or is constructed with a cemented lens composed of a positive lens and a negative lens, thereby making the image side of the third lens unit telecentric. In addition, the third lens unit is made to serve also as a field lens.

Further, in order to attain the further improvement of optical performance while constructing each lens unit with a less number of constituent lens elements, an aspheric surface is effectively introduced into the zoom lens according to the first embodiment.

In the case of the numerical example 1 shown in FIG. 1, a lens surface on the image side of the concave lens 11 of the first lens unit is made to be an aspheric surface of such a shape that a diverging function becomes progressively weaker toward the marginal portion thereof, thereby correcting curvature of field, astigmatism and distortion, especially, at the wide-angle side to lower the variation of aberration due to the variation of magnification.

Further, a lens surface on the object side of the convex lens 21 of the second lens unit is made to be an aspheric surface of such a shape that a converging function becomes progressively weaker toward the marginal portion thereof, thereby effectively correcting spherical aberration, which becomes conspicuous owing to the large aperture ratio.

Further, a lens surface on the object side of the convex lens 31 of the third lens unit is made to be an aspheric surface of such a shape that a converging function becomes progressively weaker toward the marginal portion thereof, thereby effectively correcting curvature of field, astigmatism and distortion in the whole range of the variation of magnification.

In a case where a near-distance object is photographed by using the zoom lens according to the first embodiment, good focusing performance can be obtained by moving the first lens unit toward the object side. However, the rear-focusing method in which the third lens unit is moved toward the object side for focusing may be employed. This method gives the advantage of preventing the diameter of a front lens member from increasing due to focusing, the advantage of shortening the minimum imaging distance, and the advantage of lightening the focusing lens unit.

Next, the technical significance of each of the above-mentioned conditions (1) to (4) is described.

The condition (1) is an inequality for regulating the refractive power of the cemented lens of the second lens unit. The second lens unit in the first embodiment takes the symmetrical refractive power arrangement of positive, negative and positive refractive powers, as mentioned in the foregoing. The refractive power of the cemented lens bears the positive refractive power on the image side of the second lens unit. Therefore, it is desirable that the refractive power of the cemented lens lies within a certain range compared with the refractive power of the second lens unit.

If the refractive power of the cemented lens becomes weaker beyond the upper limit of the condition (1), it becomes necessary to strengthen the refractive power of the positive lens on the object side of the second lens unit to make the second lens unit have a necessary converging function. In this instance, excessive spherical aberration occurs, the correction of which would become insufficient even if an aspheric surface is used. If the refractive power of the positive lens on the object side of the second lens unit is not strengthened, the refractive power of the second lens unit itself becomes weaker. Therefore, the amount of movement for the variation of magnification becomes large, causing an increase of the total lens length and the diameter of a front lens member, so that it becomes impossible to construct a compact zoom lens.

On the other hand, if the refractive power of the cemented lens becomes stronger beyond the lower limit of the condition (1), the Petzval sum in the second lens unit becomes large in the positive direction, causing curvature of field in the under direction. Further, in order to correct longitudinal chromatic aberration, it is necessary to make the curvature of the cementing surface of the cemented lens stronger. Accordingly, in order to secure the edge thickness of the positive lens of the cemented lens, the lens thickness at the central portion of the cemented lens has to be made larger. This is disadvantageous in compactness of the zoom lens.

The condition (2) is an inequality for defining the shape factor of an air lens of negative refractive power which is formed by the cemented lens disposed on the image side of the second lens unit and the concave lens disposed immediately before the cemented lens.

If the stop is disposed on the object side of the second lens unit, coma of the same sign is caused by a lens surface on the object side of the positive lens disposed on the object side of the second lens unit and a lens surface on the object side of the concave lens of the second lens unit. On the other hand, coma of the sign different from the above sign is caused by a lens surface on the object side of the air lens, and coma of the same sign as the above sign is caused by a lens surface on the image side of the air lens. Therefore, if the curvature of the lens surface on the object side of the air lens is made strong to a certain extent in the form of a concave surface facing the image side and, on the other hand, the curvature of the lens surface on the image side of the air lens is made relatively weak, coma is effectively corrected. Incidentally, when the shape factor in the condition (2) is larger than "1", the air lens takes the meniscus form, and, when smaller than "1", the air lens is a bi-convex lens. As the shape factor becomes larger from "1", the lens surface on the image side of the air lens has a smaller radius of curvature while having the center of curvature thereof on the image side, and, on the other hand, as the shape factor becomes smaller from "1", the lens surface on the image side of the air lens has a smaller radius of curvature while having the center of curvature thereof on the object side.

If the degree of meniscus form of the air lens is strengthened beyond the upper limit of the condition (2), the curvature of the lens surface on the image side of the air lens becomes too strong, so that the faculty of the air lens for correcting coma becomes weak. As a result, coma is insufficiently corrected by the second lens unit.

If the shape factor of the air lens becomes smaller than "1", the lens surface on the image side of the air lens has the center of curvature thereof on the object side, so that the air lens takes the bi-convex form. Accordingly, the cemented lens, which is disposed on the image side of the air lens, takes the meniscus form. Then, in order to make the cemented lens have such a refractive power as to satisfy the condition (1), it is necessary to strengthen the curvature of the lens surface on the image side of the cemented lens. If the lower limit of the condition (2) is exceeded, as a result, the curvature of the lens surface on the image side of the cemented lens becomes too strong, so that spherical aberration in the under direction occurs, which is not sufficiently corrected even by using an aspheric surface.

The condition (3) is an inequality for regulating a refractive power of the negative lens of bi-concave form of the second lens unit.

If the refractive power of the negative lens becomes weak beyond the upper limit of the condition (3), the Petzval sum in the second lens unit increases in the positive direction, thereby causing curvature of field in the under direction. Further, it becomes impossible to secure a sufficient back focal distance for disposing a filter or the like. Furthermore, a problem arises in that it is impossible to make the exit pupil sufficiently distant from the image plane.

If the refractive power of the negative lens becomes strong beyond the lower limit of the condition (3), spherical aberration is over-corrected, curvature of field occurs in the over direction, and the back focal distance becomes too long to make the zoom lens compact.

The condition (4) is an inequality for defining the shape factor of the positive lens on the object side of the second lens unit.

If the curvature of the lens surface on the image side of the positive lens becomes strong while having the center of curvature thereof on the image side beyond the upper limit of the condition (4), in particular, coma occurs conspicuously, which is difficult to correct even by using an aspheric surface.

If the curvature of the lens surface on the image side of the positive lens becomes strong while having the center of curvature thereof on the object side beyond the lower limit of the condition (4), the angle of incidence of an on-axial land ray on the lens surface on the image side of the positive lens becomes too large, so that spherical aberration occurs in the under direction.

Next, numerical data of the numerical examples 1 to 5 of the invention are shown. In the numerical data of the numerical examples 1 to 5, Ri denotes the radius of curvature of the i-th surface, when counted from the object side, Di denotes the lens thickness or air separation between the i-th surface and the (i+1)th surface, when counted from the object side, Ni and νi respectively denote the refractive index and Abbe number, relative to d-line, of the i-th optical member, when counted from the object side. Further, the two surfaces closest to the image side constitute a filter member, such as a crystal low-pass filter or an infrared cutting filter.

The shape of an aspheric surface is expressed in the coordinates with an X axis in the optical axis direction and an H axis in the direction perpendicular to the optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10} + FH^{12}$$

where R is the radius of osculating sphere, and K, B, C, D, E and F are aspheric coefficients. Further, the indication "e-0X" means "$\times 10^{-X}$".

In addition, the values of the factors in the above-mentioned conditions (1) to (4) for the numerical examples 1 to 5 are listed in Table-1.

NUMERICAL EXAMPLE 1

The zoom lens according to the numerical example 1 is constructed with, in order from the object side to the image side, a first lens unit of negative refractive power, a second lens unit of positive refractive power, and a third lens unit of positive refractive power. During zooming from the wide-angle end to the telephoto end, the first lens unit makes a reciprocating motion convex toward the image side, the second lens unit moves toward the object side, and the third lens unit moves toward the image side. Lens data of the numerical example 1 is shown as follows.

Numerical Example 1:

f = 1.00–1.99 Fno = 2.90–4.12 2ω = 68.6°–36.8°

| | | | |
|---|---|---|---|
| R1 = 7.468 | D1 = 0.21 | N1 = 1.674700 | ν1 = 54.9 |
| R2 = 0.993* | D2 = 0.21 | | |
| R3 = 2.407 | D3 = 0.10 | N2 = 1.728250 | ν2 = 28.5 |
| R4 = 1.188 | D4 = 0.19 | | |
| R5 = 1.486 | D5 = 0.32 | N3 = 1.846660 | ν3 = 23.8 |
| R6 = 5.074 | D6 = Variable | | |
| R7 = Stop | D7 = 0.00 | | |
| R8 = 0.981* | D8 = 0.38 | N4 = 1.693500 | ν4 = 53.2 |
| R9 = −4.331 | D9 = 0.04 | | |
| R10 = −1.864 | D10 = 0.14 | N5 = 1.516330 | ν5 = 64.1 |
| R11 = 0.906 | D11 = 0.13 | | |
| R12 = 17.071 | D12 = 0.08 | N6 = 1.846660 | ν6 = 23.8 |
| R13 = 0.966 | D13 = 0.35 | N7 = 1.772499 | ν7 = 49.6 |
| R14 = −1.646 | D14 = Variable | | |
| R15 = 2.410* | D15 = 0.25 | N8 = 1.583130 | ν8 = 59.5 |
| R16 = −38.921 | D16 = Variable | | |
| R17 = ∞ | D17 = 0.43 | N9 = 1.544270 | ν9 = 70.6 |
| R18 = ∞ | | | |

*Aspheric Surface

| Variable | Focal Length | | |
|---|---|---|---|
| Separation | 1.00 | 1.50 | 1.99 |
| D6 | 1.88 | 0.80 | 0.41 |
| D14 | 0.77 | 1.43 | 2.34 |
| D16 | 0.60 | 0.58 | 0.32 |

Aspheric Coefficients:

| | | | |
|---|---|---|---|
| R2 | K = 0 | B = −1.23832e−01 | C = −2.29538e−02 |
| | D = −2.45611e−01 | E = 3.31822e−01 | F = −2.96505e−01 |
| R8 | K = 0 | B = −5.79780e−02 | C = −1.08652e−02 |
| | D = 2.34725e−02 | E = 2.63031e−01 | F = 0.00000e+00 |

-continued

| | | | |
|---|---|---|---|
| R15 | K = 0 | B = 5.91674e−04 | C = −5.06821e−02 |
| | D = 2.87149e−01 | E = −5.94448e−01 | F = 4.55368e−01 |

NUMERICAL EXAMPLE 2

The zoom lens according to the numerical example 2 is constructed with, in order from the object side to the image side, a first lens unit of negative refractive power, a second lens unit of positive refractive power, and a third lens unit of positive refractive power. During zooming from the wide-angle end to the telephoto end, the first lens unit makes a reciprocating motion convex toward the image side, the second lens unit moves toward the object side, and the third lens unit moves toward the image side. Lens data of the numerical example 2 is shown as follows.

Numerical Example 2:

f = 1.00–2.54 Fno = 2.89–4.60 2ω = 70.2°–28.0°

| | | | |
|---|---|---|---|
| R1 = 7.492 | D1 = 0.21 | N1 = 1.674700 | ν1 = 54.9 |
| R2 = 1.121* | D2 = 0.30 | | |
| R3 = −7.375 | D3 = 0.13 | N2 = 1.720000 | ν2 = 43.7 |
| R4 = 3.048 | D4 = 0.19 | | |
| R5 = 2.496 | D5 = 0.27 | N3 = 1.846660 | ν3 = 23.8 |
| R6 = 13.429 | D6 = Variable | | |
| R7 = Stop | D7 = 0.00 | | |
| R8 = 1.142* | D8 = 0.32 | N4 = 1.693500 | ν4 = 53.2 |
| R9 = −21.428 | D9 = 0.03 | | |
| R10 = −3.947 | D10 = 0.22 | N5 = 1.517417 | ν5 = 52.4 |
| R11 = 1.061 | D11 = 0.08 | | |
| R12 = 2.860 | D12 = 0.08 | N6 = 1.846660 | ν6 = 23.8 |
| R13 = 1.004 | D13 = 0.32 | N7 = 1.772499 | ν7 = 49.6 |
| R14 = −2.683 | D14 = Variable | | |
| R15 = 2.498* | D15 = 0.29 | N8 = 1.583130 | ν8 = 59.5 |
| R16 = −31.782 | D16 = Variable | | |
| R17 = ∞ | D17 = 0.43 | N9 = 1.544270 | ν9 = 70.6 |
| R18 = ∞ | | | |

*Aspheric Surface

| Variable | Focal Length | | |
|---|---|---|---|
| Separation | 1.00 | 1.76 | 2.54 |
| D6 | 2.04 | 0.77 | 0.25 |
| D14 | 1.69 | 2.69 | 3.68 |
| D16 | 0.26 | 0.21 | 0.16 |

Aspheric Coefficients:

| | | | |
|---|---|---|---|
| R2 | K = 0 | B = −3.92457e−02 | C = 1.76441e−02 |
| | D = −1.79210e−01 | E = 3.23743e−01 | F = −2.57814e−01 |
| R8 | K = 0 | B = −4.52188e−02 | C = −7.37087e−03 |
| | D = 0.00000e+00 | E = 0.00000e+00 | F = 0.00000e+00 |
| R15 | K = 0 | B = −1.06457e−01 | C = 2.32651e−01 |
| | D = −1.16441e+00 | E = 2.17741e+00 | F = −1.56135e+00 |

NUMERICAL EXAMPLE 3

The zoom lens according to the numerical example 3 is constructed with, in order from the object side to the image side, a first lens unit of negative refractive power, a second lens unit of positive refractive power, and a third lens unit of positive refractive power. During zooming from the wide-angle end to the telephoto end, the first lens unit makes a reciprocating motion convex toward the image side, the second lens unit moves toward the object side, and the third lens unit moves toward the image side.

The numerical example 3 differs from the numerical example 1 in that the number of constituent lens elements of the first lens unit is two. In the numerical example 3, the first lens unit is constructed with a negative lens of meniscus form having a concave surface facing the image side and a positive lens of meniscus form having a convex surface facing the object side, that is, two concave lenses in the numerical example 1 are formed into one concave lens. This arrangement gives such advantages that the number of lens elements is reduced to lead to reduction in cost, and the front lens member is reduced in weight. Lens data of the numerical example 3 is shown as follows.

Numerical Example 3:

f = 1.00–2.00 Fno = 2.49–3.50 2ω = 70.2°–37.6°

| | | | |
|---|---|---|---|
| R1 = 15.872 | D1 = 0.21 | N1 = 1.674700 | ν1 = 54.9 |
| R2 = 0.984* | D2 = 0.51 | | |
| R3 = 2.011 | D3 = 0.25 | N2 = 1.846660 | ν2 = 23.8 |
| R4 = 3.882 | D4 = Variable | | |
| R5 = Stop | D5 = 0.00 | | |
| R6 = 1.049* | D6 = 0.38 | N3 = 1.693500 | ν3 = 53.2 |
| R7 = −18.496 | D7 = 0.06 | | |
| R8 = −1.875 | D8 = 0.14 | N4 = 1.522494 | ν4 = 59.8 |
| R9 = 1.019 | D9 = 0.10 | | |
| R10 = 7.075 | D10 = 0.08 | N5 = 1.805181 | ν5 = 25.4 |
| R11 = 0.879 | D11 = 0.35 | N6 = 1.772499 | ν6 = 49.6 |
| R12 = −1.696 | D12 = Variable | | |
| R13 = 2.412* | D13 = 0.25 | N7 = 1.583130 | ν7 = 59.5 |
| R14 = −39.003 | D14 = Variable | | |
| R15 = ∞ | D15 = 0.43 | N8 = 1.544270 | ν8 = 70.6 |
| R16 = ∞ | | | |

*Aspheric Surface

| Variable | Focal Length | | |
|---|---|---|---|
| Separation | 1.00 | 1.52 | 2.00 |
| D4 | 2.12 | 0.84 | 0.41 |
| D12 | 0.79 | 1.45 | 2.35 |
| D14 | 0.59 | 0.57 | 0.32 |

Aspheric Coefficients:

| | | | |
|---|---|---|---|
| R2 | K = 0 | B = −1.14032e−01 | C = 2.67387e−02 |
| | D = −3.23821e−01 | E = 4.20448e−01 | F = −3.39683e−01 |
| R6 | K = 0 | B = −3.07051e−02 | C = 2.68063e−02 |
| | D = 0.00000e+00 | E = 0.00000e+00 | F = 0.00000e+00 |
| R13 | K = 0 | B = −2.75565e−02 | C = 1.56521e−01 |
| | D = −5.60681e−01 | E = 1.06327e+00 | F = −7.73626e−01 |

NUMERICAL EXAMPLE 4

The zoom lens according to the numerical example 4 is constructed with, in order from the object side to the image side, a first lens unit of negative refractive power, a second lens unit of positive refractive power, and a third lens unit of positive refractive power. During zooming from the wide-angle end to the telephoto end, the first lens unit makes a reciprocating motion convex toward the image side, the second lens unit moves toward the object side, and the third lens unit moves toward the image side.

The numerical example 4 differs from the numerical example 1 in that the number of constituent lens elements of the second lens unit is five, being grouped into four lens subunits. In the numerical example 4, the second lens unit is constructed with, in order from the object side to the image side, a positive lens of meniscus form having a convex surface facing the object side, a convex lens of bi-convex form, a concave lens of bi-concave form, and a cemented lens of positive refractive power as a whole composed of a concave lens and a convex lens, that is, one positive lens on the object side in the numerical example 1 is formed into two positive lenses. This arrangement enables the two positive lenses to share the function of converging an on-axial light flux which has exited from the first lens unit in a diverging state, and, therefore, gives such advantages that it is possible to reduce the occurrence of spherical aberration and it is possible to construct a photographic lens having a larger aperture diameter. Lens data of the numerical example 4 is shown as follows.

Numerical Example 4:

| f = 1.00–2.00 Fno = 2.00–3.00 2ω = 66.0°–35.2° | | | |
|---|---|---|---|
| R1 = 7.477 | D1 = 0.21 | N1 = 1.674700 | ν1 = 54.9 |
| R2 = 1.046* | D2 = 0.20 | | |
| R3 = 2.556 | D3 = 0.10 | N2 = 1.728250 | ν2 = 28.5 |
| R4 = 1.145 | D4 = 0.19 | | |
| R5 = 1.463 | D5 = 0.27 | N3 = 1.846660 | ν3 = 23.8 |
| R6 = 4.613 | D6 = Variable | | |
| R7 = Stop | D7 = 0.00 | | |
| R8 = 1.381 | D8 = 0.25 | N4 = 1.693500 | ν4 = 53.2 |
| R9 = 6.370 | D9 = 0.03 | | |
| R10 = 1.615* | D10 = 0.29 | N5 = 1.693500 | ν5 = 53.2 |
| R11 = −4.778 | D11 = 0.04 | | |
| R12 = −2.130 | D12 = 0.14 | N6 = 1.516330 | ν6 = 64.1 |
| R13 = 0.907 | D13 = 0.14 | | |
| R14 = −70.592 | D14 = 0.08 | N7 = 1.846660 | ν7 = 23.8 |
| R15 = 0.990 | D15 = 0.35 | N8 = 1.772499 | ν8 = 49.6 |
| R16 = −1.991 | D16 = Variable | | |
| R17 = 1.819* | D17 = 0.29 | N9 = 1.583130 | ν9 = 59.5 |
| R18 = −38.968 | D18 = Variable | | |
| R19 = ∞ | D19 = 0.43 | N10 = 1.544270 | ν10 = 70.6 |
| R20 = ∞ | | | |

*Aspheric Surface

| Variable | Focal Length | | |
|---|---|---|---|
| Separation | 1.00 | 1.49 | 2.00 |
| D6 | 1.88 | 0.92 | 0.41 |
| D16 | 0.91 | 1.59 | 2.26 |
| D18 | 0.39 | 0.35 | 0.32 |

Aspheric Coefficients:

| | | | |
|---|---|---|---|
| R2 | K = 0 | B = −1.13188e−01 | C = 1.50616e−04 |
| | D = −2.51746e−01 | E = 3.47476e−01 | F = −2.63121e−01 |
| R10 | K = 0 | B = −2.71823e−02 | C = 2.14414e−02 |
| | D = −2.52640e−02 | E = 0.00000e+00 | F = 0.00000e+00 |

-continued

| | | | |
|---|---|---|---|
| R17 | K = 0 | B = −3.50857e−02 | C = 3.08965e−02 |
| | D = 1.84237e−01 | E = −6.40556e−01 | F = 5.97621e−01 |

NUMERICAL EXAMPLE 5

The zoom lens according to the numerical example 5 is constructed with, in order from the object side to the image side, a first lens unit of negative refractive power, a second lens unit of positive refractive power, and a third lens unit of positive refractive power. During zooming from the wide-angle end to the telephoto end, the first lens unit makes a reciprocating motion convex toward the image side, the second lens unit moves toward the object side, and the third lens unit remains stationary.

The numerical example 5 differs from the numerical example 1 in that the number of constituent lens elements of the third lens unit is two, being grouped into one lens subunit. In the numerical example 5, the third lens unit is constructed with a cemented lens of positive refractive power as a whole composed of a convex lens and a concave lens, that is, a single lens in the numerical example 1 is formed into a cemented lens. This arrangement enables lateral chromatic aberration, in particular, to be corrected by the third lens unit. As mentioned in the foregoing, the variation of lateral chromatic aberration due to zooming is caused greatly by the first lens unit. However, in the case of the numerical example 5, the correction of lateral chromatic aberration can be shared such that the component of the variation of lateral chromatic aberration is corrected by the first lens unit and the absolute amount of lateral chromatic aberration is corrected by the third lens unit. Accordingly, the numerical example 5 has such advantages that it is possible to correct lateral chromatic aberration well over the whole range of the variation of magnification even when the zoom ratio is increased.

Further, the numerical example 5 differs from the numerical example 1 in that the third lens unit remains stationary during zooming. With the third lens unit kept stationary, the numerical example 5 has such advantages that, since any moving mechanism for the third lens unit is not necessary, the construction of a lens barrel can be simplified. Lens data of the numerical example 5 is shown as follows.

Numerical Example 5:

| f = 1.00–2.98 Fno = 2.78–4.60 2ω = 70.0°–23.8° | | | |
|---|---|---|---|
| R1 = 7.471 | D1 = 0.21 | N1 = 1.674700 | ν1 = 54.9 |
| R2 = 1.392* | D2 = 0.29 | | |
| R3 = −8.099 | D3 = 0.13 | N2 = 1.723420 | ν2 = 38.0 |
| R4 = 1.731 | D4 = 0.19 | | |
| R5 = 2.191 | D5 = 0.32 | N3 = 1.846660 | ν3 = 23.8 |
| R6 = 137.077 | D6 = Variable | | |
| R7 = Stop | D7 = 0.00 | | |
| R8 = 1.335* | D8 = 0.38 | N4 = 1.693500 | ν4 = 53.2 |
| R9 = −5.330 | D9 = 0.05 | | |
| R10 = −2.015 | D10 = 0.14 | N5 = 1.517417 | ν5 = 52.4 |
| R11 = 1.319 | D11 = 0.08 | | |
| R12 = 7.466 | D12 = 0.08 | N6 = 1.846660 | ν6 = 23.8 |
| R13 = 1.351 | D13 = 0.35 | N7 = 1.772499 | ν7 = 49.6 |
| R14 = −1.958 | D14 = Variable | | |
| R15 = 2.272* | D15 = 0.27 | N8 = 1.583130 | ν8 = 59.5 |

-continued

| f = 1.00–2.98 Fno = 2.78–4.60 2ω = 70.0°–23.8° | | | |
|---|---|---|---|
| R16 = −7.923 | D16 = 0.08 | N9 = 1.698947 | ν9 = 30.1 |
| R17 = −31.691 | D17 = 0.08 | | |
| R18 = ∞ | D18 = 0.43 | N10 = 1.544270 | ν10 = 70.6 |
| R19 = ∞ | | | |

*Aspheric Surface

| Variable | Focal Length | | |
|---|---|---|---|
| Separation | 1.00 | 1.99 | 2.98 |
| D6 | 2.92 | 0.92 | 0.25 |
| D14 | 2.17 | 3.41 | 4.64 |

Aspheric Coefficients:

| | | | |
|---|---|---|---|
| R2 | K = 0 | B = −3.90048e−02 | C = 8.55478e−02 |
| | D = −3.52446e−01 | E = 5.28091e−01 | F = −2.97792e−01 |
| R8 | K = 0 | B = −2.41197e−02 | C = 1.74507e−02 |
| | D = 0.00000e+00 | E = 0.00000e+00 | F = 0.00000e+00 |
| R15 | K = 0 | B = −5.30968e−02 | C = −9.80294e−02 |
| | D = 1.70223e−01 | E = −2.85852e−01 | F = 1.85253e−01 |

TABLE 1

| | Numerical Example | | | | |
|---|---|---|---|---|---|
| Condition | 1 | 2 | 3 | 4 | 5 |
| (1) | 1.11 | 1.04 | 0.88 | 1.64 | 1.00 |
| (2) | 1.11 | 2.18 | 1.34 | 0.97 | 1.43 |
| (3) | 0.57 | 0.82 | 0.57 | 0.61 | 0.68 |
| (4) | 0.63 | 0.90 | 0.89 | 1.55 | 0.60 |

According to the first embodiment of the invention, it is possible to attain a zoom lens which is suited for a photographic system using a solid-state image sensor, has a high variable magnification ratio despite being compact and small in diameter with less constituent lens elements, is corrected particularly for chromatic aberration, and has excellent optical performance.

(Second Embodiment)

FIG. 21 to FIGS. 32A to 32D relate to a second embodiment of the invention, which corresponds to numerical examples 6 to 8 of the invention to be described later.

Figure 21:
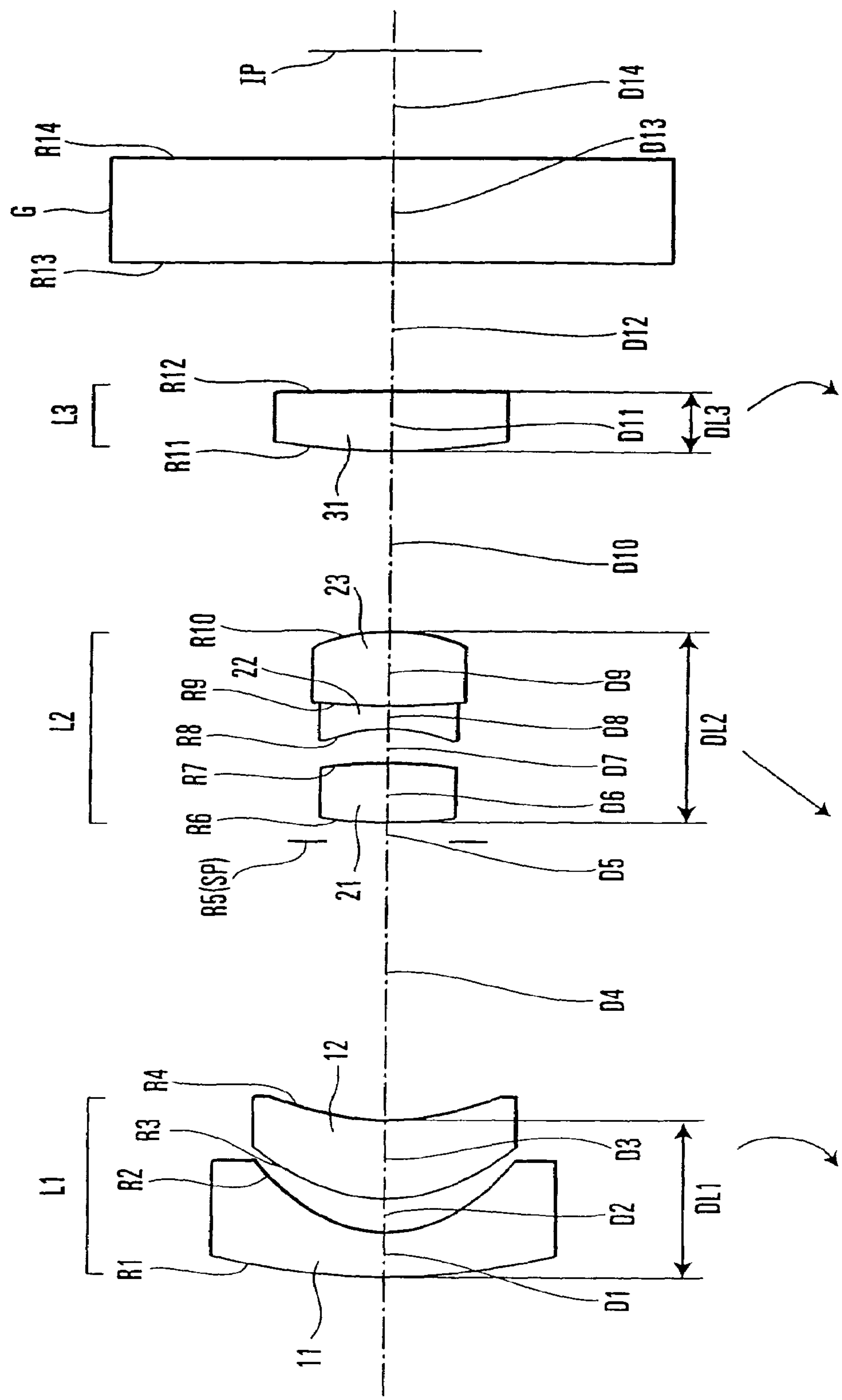
FIG. 21 is a lens block diagram showing a zoom lens at the wide-angle end according to a numerical example 6 of the invention.
Figure 22A:
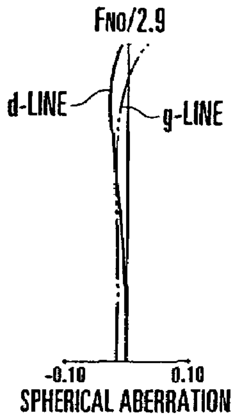
FIGS. 22A to 22D are graphs showing aberration curves at the wide-angle end in the zoom lens according to the numerical example 6 of the invention.
Figure 22B:
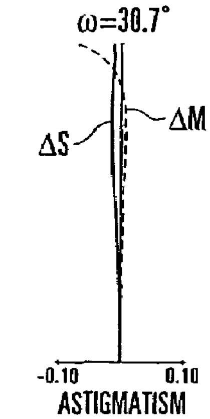
Figure 22C:
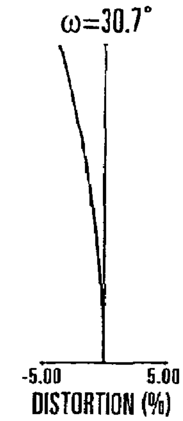
Figure 22D:
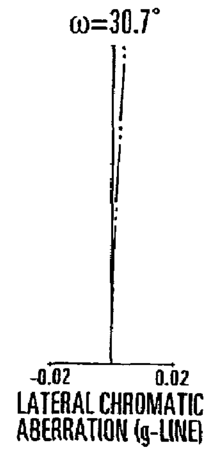
Figure 23A:
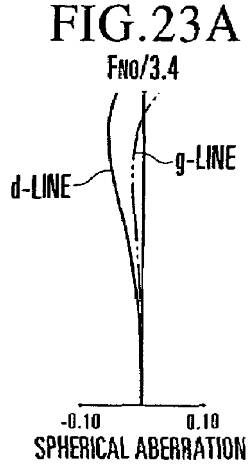
FIGS. 23A to 23D are graphs showing aberration curves at the middle focal length position in the zoom lens according to the numerical example 6 of the invention.
Figure 23B:
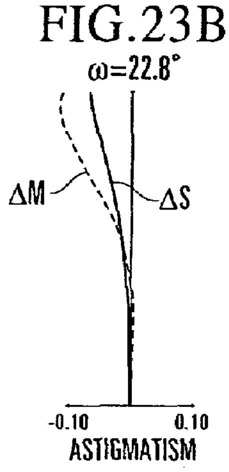
Figure 23C:
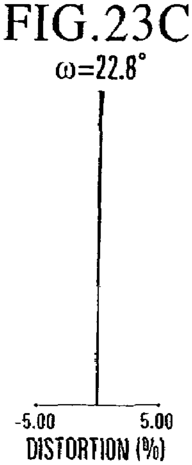
Figure 23D:
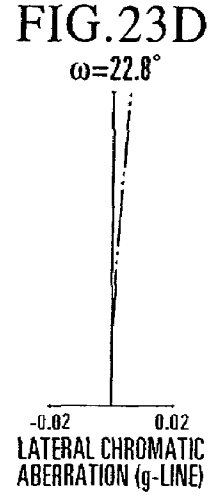
Figure 24A:
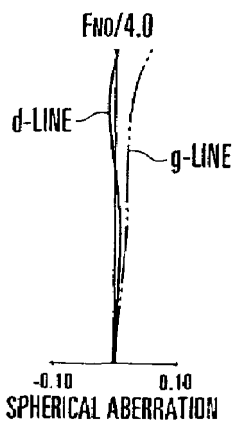
FIGS. 24A to 24D are graphs showing aberration curves at the telephoto end in the zoom lens according to the numerical example 6 of the invention.
Figure 24B:
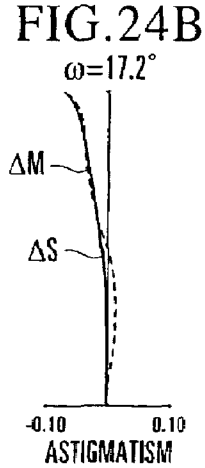
Figure 24C:
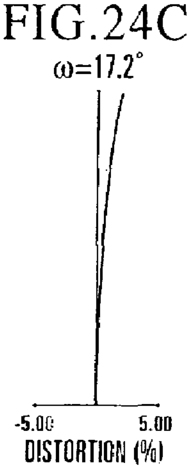
Figure 24D:
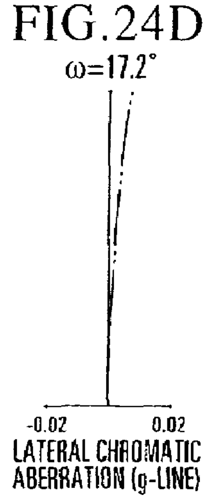

FIG. 21 is a lens block diagram showing a zoom lens according to the numerical example 6 of the invention. FIGS. 22A to 22D through FIGS. 24A to 24D are graphs showing aberration curves at the wide-angle end, the middle focal length position and the telephoto end, respectively, in the zoom lens according to the numerical example 6 of the invention.

Figure 25:
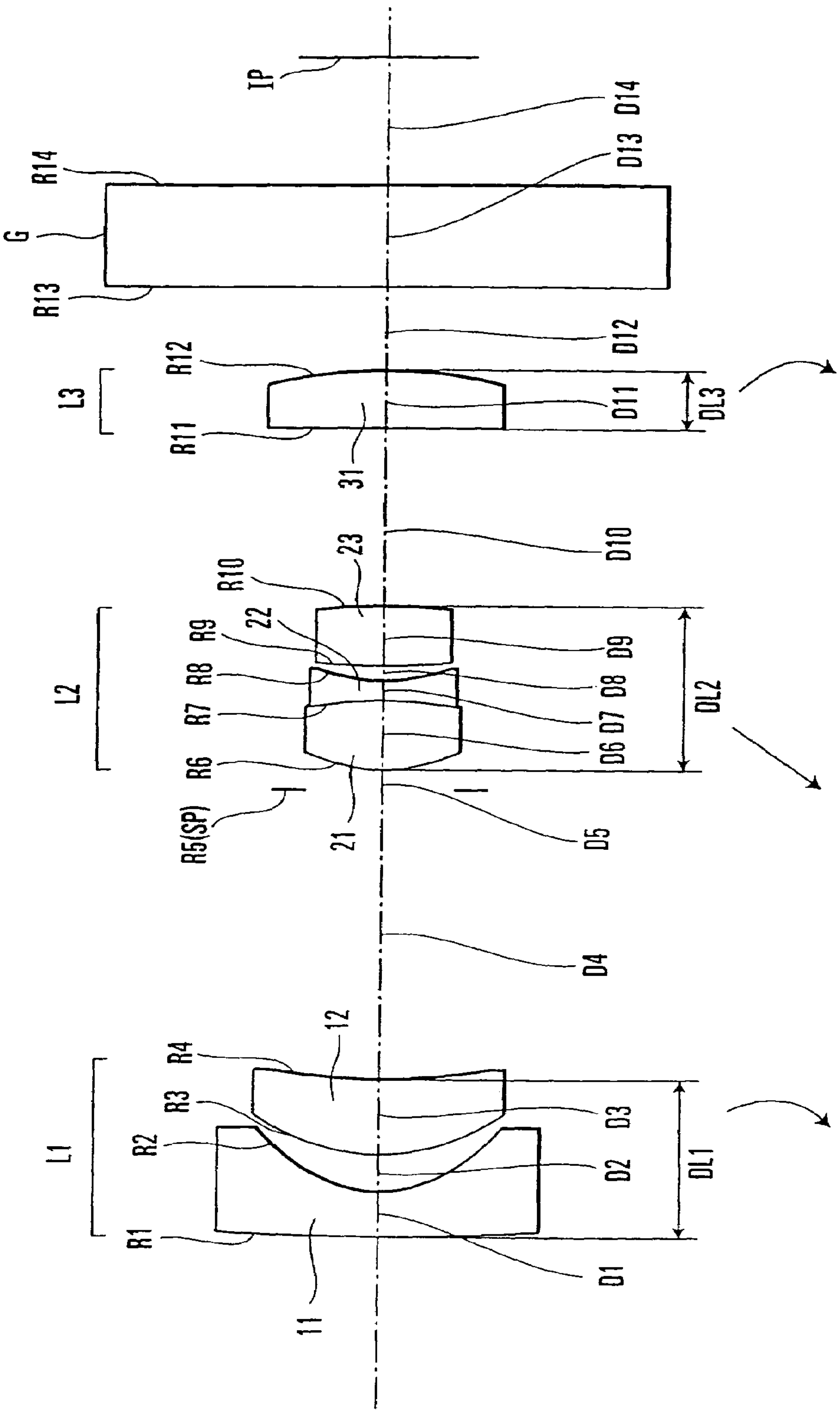
FIG. 25 is a lens block diagram showing a zoom lens at the wide-angle end according to a numerical example 7 of the invention.
Figure 26A:
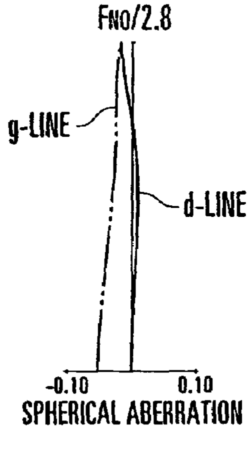
FIGS. 26A to 26D are graphs showing aberration curves at the wide-angle end in the zoom lens according to the numerical example 7 of the invention.
Figure 26B:
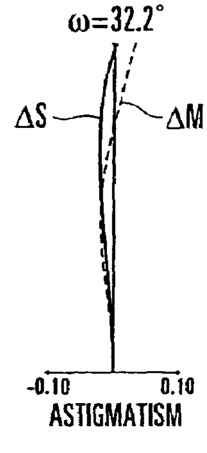
Figure 26C:
Figure 26D:
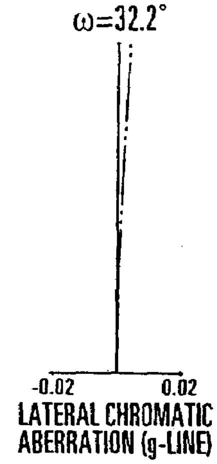
Figure 27A:
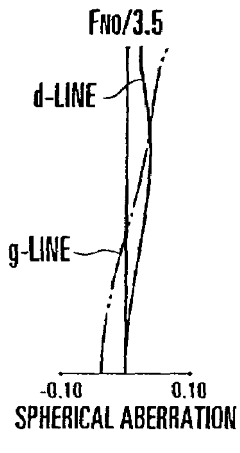
FIGS. 27A to 27D are graphs showing aberration curves at the middle focal length position in the zoom lens according to the numerical example 7 of the invention.
Figure 27B:
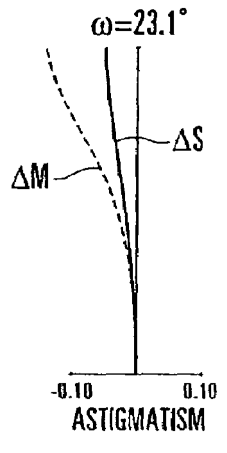
Figure 27C:
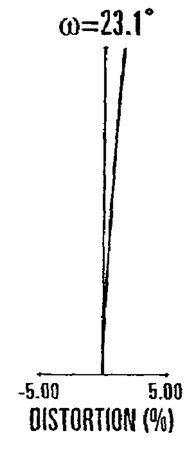
Figure 27D:
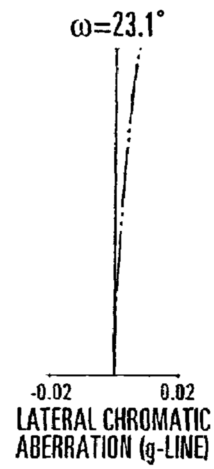
Figure 28A:
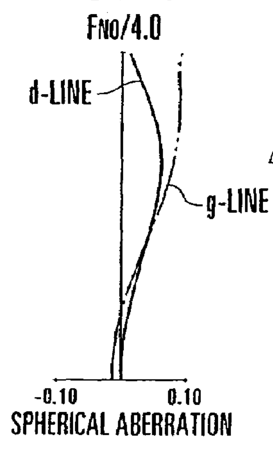
FIGS. 28A to 28D are graphs showing aberration curves at the telephoto end in the zoom lens according to the numerical example 7 of the invention.
Figure 28B:
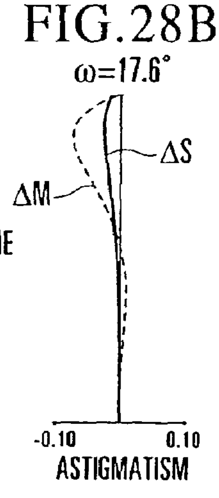
Figure 28C:
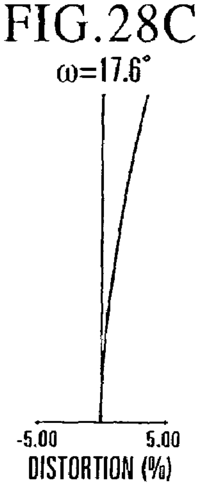
Figure 28D:
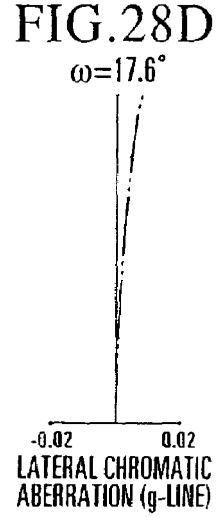

FIG. 25 is a lens block diagram showing a zoom lens according to the numerical example 7 of the invention. FIGS. 26A to 26D through FIGS. 28A to 28D are graphs showing aberration curves at the wide-angle end, the middle focal length position and the telephoto end, respectively, in the zoom lens according to the numerical example 7 of the invention.

Figure 29:
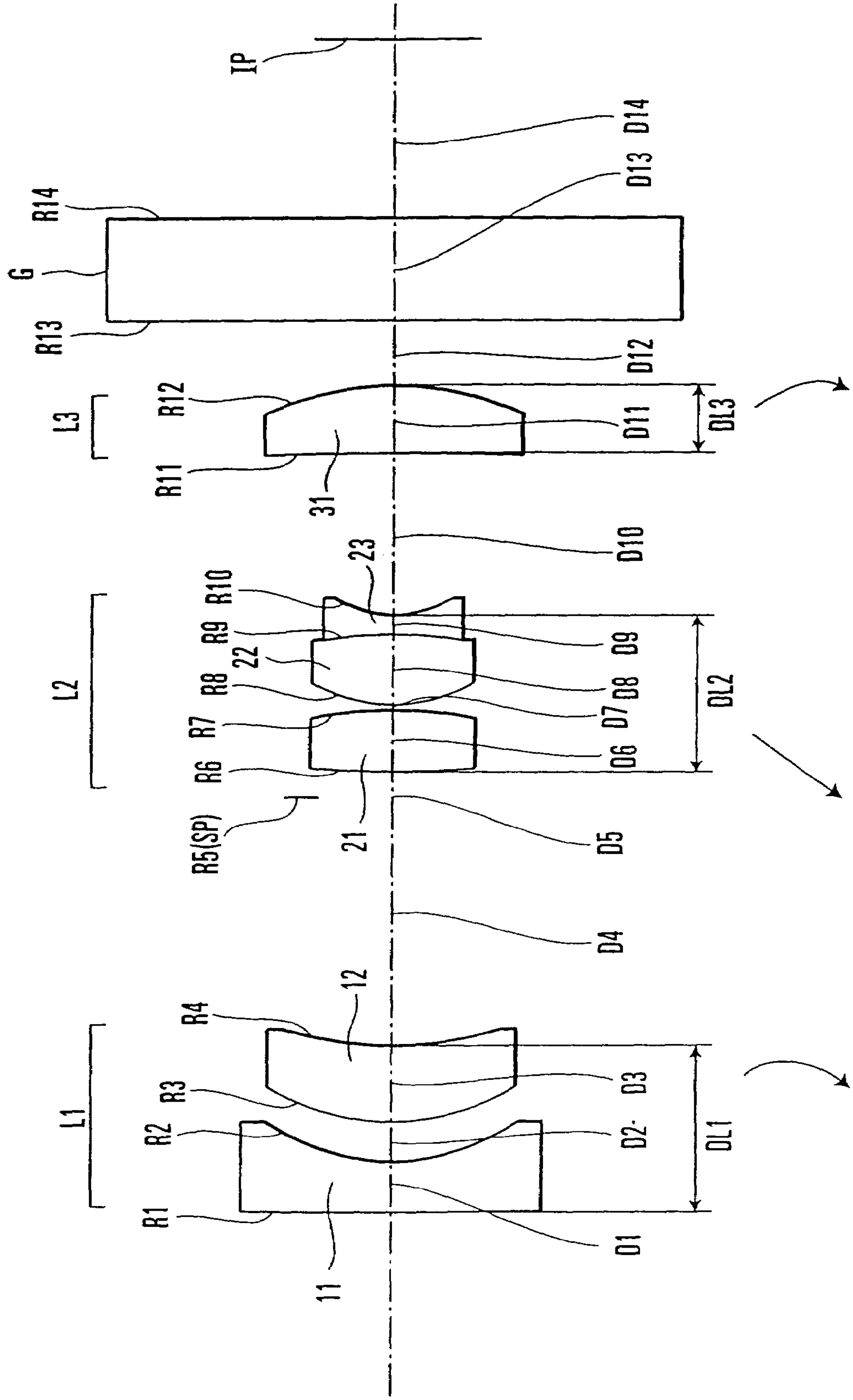
FIG. 29 is a lens block diagram showing a zoom lens at the wide-angle end according to a numerical example 8 of the invention.
Figure 30A:
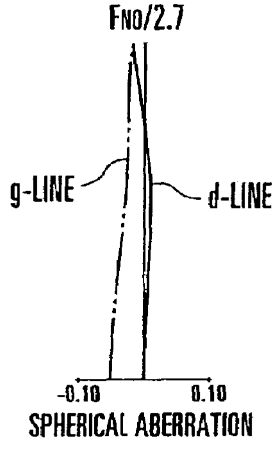
FIGS. 30A to 30D are graphs showing aberration curves at the wide-angle end in the zoom lens according to the numerical example 8 of the invention.
Figure 30B:
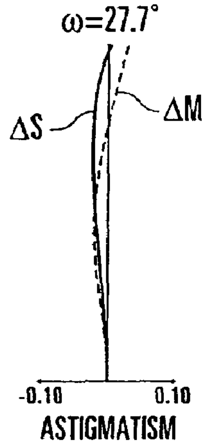
Figure 30C:
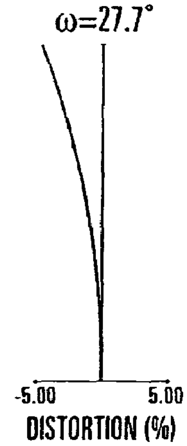
Figure 30D:
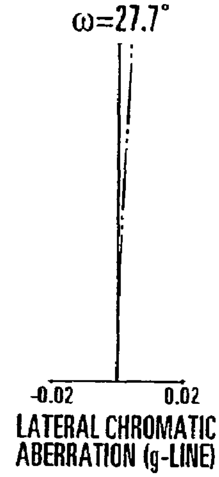
Figure 31A:
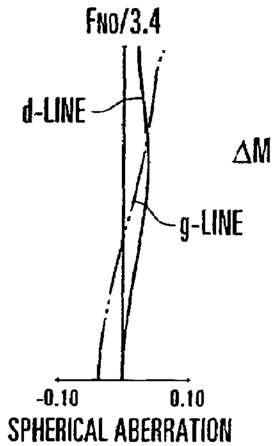
FIGS. 31A to 31D are graphs showing aberration curves at the middle focal length position in the zoom lens according to the numerical example 8 of the invention.
Figure 31B:
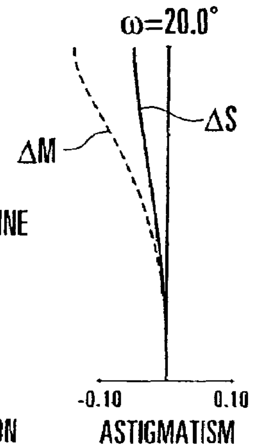
Figure 31C:
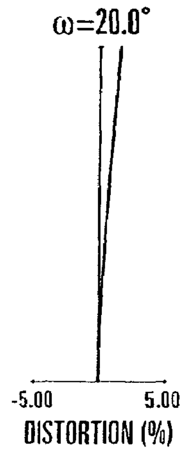
Figure 31D:
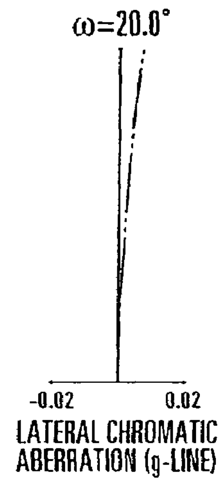
Figure 32A:
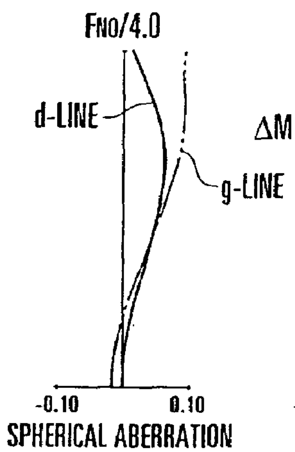
FIGS. 32A to 32D are graphs showing aberration curves at the telephoto end in the zoom lens according to the numerical example 8 of the invention.
Figure 32B:
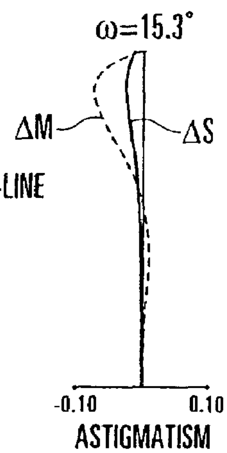
Figure 32C:
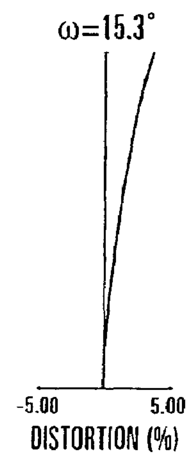
Figure 32D:
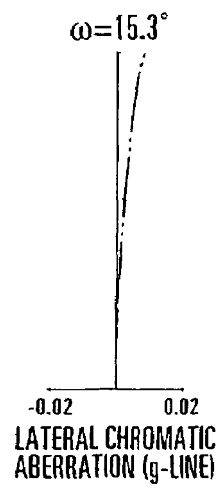

FIG. 29 is a lens block diagram showing a zoom lens according to the numerical example 8 of the invention. FIGS. 30A to 30D through FIGS. 32A to 32D are graphs showing aberration curves at the wide-angle end, the middle focal length position and the telephoto end, respectively, in the zoom lens according to the numerical example 8 of the invention.

In the lens block diagrams shown in FIGS. 21, 25 and 29, reference character L1 denotes a first lens unit of negative refractive power, reference character L2 denotes a second lens unit of positive refractive power, reference character L3 denotes a third lens unit of positive refractive power, reference character SP denotes an aperture stop for determining the rightness of an optical system, reference character IP denotes an image plane, and reference character G denotes a glass block, such as a filter or a color separation prism.

The zoom lens according to the second embodiment has three lens units, i.e., in order from the object side to the image side, the first lens unit L1 of negative refractive power, the second lens unit L2 of positive refractive power and the third lens unit L3 of positive refractive power. During zooming from the wide-angle end to the telephoto end, the first lens unit makes a reciprocating motion convex toward the image side, the second lens unit moves toward the object side, and the third lens unit moves toward the image side or moves with a locus convex toward the image side.

In the zoom lens according to the second embodiment, the variation of magnification is effected mainly by moving the second lens unit while the shift of an image point due to the variation of magnification is compensated for by moving forward and backward the first lens unit and moving the third lens unit toward the image side or moving the third lens unit with a locus convex toward the image side.

The third lens unit shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, the telecentric image formation on the image side necessary for the photographing apparatus (optical apparatus) using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

The zoom lens according to the second embodiment is characterized in that the first lens unit has one negative lens and one positive lens, the second lens unit is composed of one cemented lens and a positive lens, and the third lens unit has at least one positive lens.

As has been described in the foregoing, according to the second embodiment, the first lens unit of negative refractive power is composed of two lenses, i.e., in order from the object side to the image side, a negative lens 11 having a concave surface facing the image side, and a positive lens 12 of meniscus form having a convex surface facing the object side, the second lens unit of positive refractive power is composed of three lenses as a whole, i.e., a positive lens 21 of bi-convex form, a negative lens 22 having a concave surface facing the object side, and a positive lens 23 of bi-convex form, two of the three lenses constituting a cemented lens, and the third lens unit of positive refractive power is composed of a single positive lens 31 having a convex surface facing the object side.

With the respective lens units having such a lens construction as to make the desired refractive power arrangement and the correction of aberration compatible with each other, as described above, it is possible to attain the compactness of a lens system while keeping the good optical performance of the lens system. The first lens unit of negative refractive power has the role of causing an off-axial principal ray to be pupil-imaged on the center of a stop, and, particularly, on the wide-angle side, the amount of refraction of an off-axial principal ray is large. Therefore, in the first lens unit, the various off-axial aberrations, particularly, astigmatism and distortion, are apt to occur. Accordingly, similarly to an ordinary wide-angle lens, the first lens unit is made to have the construction having a negative lens and a positive lens so as to prevent the diameter of a lens disposed on the most object side from increasing. Further, it is preferable that a lens surface on the image side of the negative lens 11 is such an aspheric surface that a negative refractive power becomes progressively weaker toward a marginal portion of the lens surface. By this arrangement, astigmatism and distortion are corrected in a well-balanced manner, and the first lens unit is composed of such a small number of lenses as two, so that it becomes easy to make the entire lens system compact. In addition, in order to prevent the occurrence of an off-axial aberration due to the refraction of an off-axial principal ray, each of lenses constituting the first lens unit has a lens surface approximate to concentric spherical surfaces having the center on a point at which the stop and the optical axis intersect.

The second lens unit of positive refractive power has the positive lens 21 of bi-convex form disposed on the most object side of the second lens unit, so that the second lens unit has such a shape as to lessen the angle of refraction of an off-axial principal ray having exited from the first lens unit, thereby preventing the various off-axial aberrations from occurring. Further, the positive lens 21 is a lens arranged to allow an on-axial ray to pass at the largest height, and is concerned with the correction of, mainly, spherical aberration and coma. In the second embodiment, it is preferable that a lens surface on the object side of the positive lens 21 is such an aspheric surface that a positive refractive power becomes progressively weaker toward a marginal portion of the lens surface. By this arrangement, it becomes easy to correct well spherical aberration and coma.

In the zoom lens according to the numerical example 6 shown in FIG. 21, the negative lens 22 disposed on the image side of the positive lens 21 is made to have a concave surface facing the object side, so that a negative air lens is formed by the lens surface on the image side of the positive lens 21 and the concave surface on the object side of the negative lens 22. Accordingly, it is possible to correct spherical aberration occurring due to the increase of an aperture ratio.

Further, in the zoom lenses according to the numerical examples 6 and 7 shown in FIGS. 21 and 25, it is preferable that a lens surface on the image side of the positive lens 23 disposed on the most image side of the second lens unit L2 is such an aspheric surface that a positive refractive power becomes progressively stronger toward a marginal portion of the lens surface. By this arrangement, it is possible to effectively correct spherical aberration, which becomes conspicuous due to the increase of an aperture ratio.

In addition, in the second embodiment, in order to cope with the reduction of the amount of chromatic aberration, which is required according to the increased number of pixels and the minimization of cell pitches of a solid-state image sensor such as a CCD, a cemented lens composed of a negative lens and a positive lens cemented together is disposed in the second lens unit. By this arrangement, it is possible to correct well longitudinal chromatic aberration and lateral chromatic aberration.

The third lens unit of positive refractive power has a convex lens (positive lens) 31 having a convex surface facing the object side, and serves also as a field lens for making the zoom lens telecentric on the image side. Further, a lens surface on the image side of the convex lens 31 is such an aspheric surface that a positive refractive power becomes progressively weaker toward a marginal portion of the lens surface, and contributes to the correction of the various off-axial aberrations over the entire zooming range. Now, when the back focal distance is denoted by sk', the focal length of the third lens unit is denoted by f3, and the image magnification of the third lens unit is denoted by β3, the following relation is obtained:

$$sk' = f3(1-\beta 3)$$

provided that $0<\beta 3<1.0$. Here, when the third lens unit is moved toward the image side during the variation of magnification from the wide-angle end to the telephoto end, the back focal distance sk' decreases, so that the image magnification β3 of the third lens unit increases on the telephoto side. Then, as a result, the third lens unit shares the variation of magnification with the second lens unit, so that the amount of movement of the second lens unit is reduced. Therefore, since such a space for the movement of the second lens unit can be saved, the third lens unit contributes to the reduction in size of the lens system.

When a close-distance object is to be photographed by using the zoom lens according to the second embodiment, the good optical performance can be obtained by moving the first lens unit toward the object side. However, it is preferable to move the third lens unit also toward the object side. This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

Further, in a case where focusing is performed by using the third lens unit, if the third lens unit is arranged to be moved toward the image side during the variation of magnification from the wide-angle end to the telephoto end, the telephoto end, at which the amount of movement for focusing is large, can be located on the image side. Accordingly, it becomes possible to minimize the amount of total movement of the third lens unit required for zooming and focusing. This arrangement makes it possible to attain the compactness of the entire lens system.

Further, according to the second embodiment, it is more preferable to satisfy at least one of the following conditions (c-1) to (c-4).

(c-1) The following conditions are satisfied:

$$nd<1.8 \quad (5)$$

$$\nu d<40 \quad (6)$$

where nd and νd are a refractive index and Abbe number, respectively, of material of the negative lens included in the second lens unit.

If the upper limit of the condition (5) is exceeded, the Petzval sum increases in the positive direction, so that it becomes difficult to correct curvature of field. If the upper limit of the condition (6) is exceeded, it becomes disadvantageously difficult to correct longitudinal chromatic aberration at the telephoto end.

(c-2) The following condition is satisfied:

$$0.1<|X1/X3|<7.0 \quad (7)$$

where X1 is a distance on the optical axis between a position at which the first lens unit is located on the most object side and a position at which the first lens unit is located on the most image side during the variation of magnification from the wide-angle end to the telephoto end, and X3 is a distance on the optical axis between a position at which the third lens unit is located on the most object side and a position at which the third lens unit is located on the most image side during the variation of magnification from the wide-angle end to the telephoto end when an object distance is infinity.

The condition (7) is provided for shortening the total length of the optical system and for shortening the total length of the entire lens system obtained when the lens system is retracted.

Here, the distance X1 is the total stroke of the first lens unit during the variation of magnification from the wide-angle end to the telephoto end, and the distance X3 is the total stroke of the third lens unit during the variation of magnification from the wide-angle end to the telephoto end when an object distance is infinity.

If the lower limit of the condition (7) is exceeded, the amount of movement of the third lens unit on the optical axis increases, and it becomes necessary to lengthen the motor shaft for moving the third lens unit, so that it becomes disadvantageously difficult to shorten the total length of the lens system as retracted. If the upper limit of the condition (7) is exceeded, the locus of the first lens unit convex toward the image side becomes sharp, and the angle of a cam locus for the first lens unit leading from the wide-angle end to the telephoto end becomes large, so that the total length of the lens system as retracted is caused to become large disadvantageously.

(c-3) The following condition is satisfied:

$$0.25<(DL1+DL2+DL3)/DL<0.45 \quad (8)$$

where DL is a distance, at the telephoto end, from a vertex on the object side of a lens disposed on the most object side of the first lens unit to an image plane, DL1 is a distance from the vertex on the object side of the lens disposed on the most object side of the first lens unit to a vertex on the image side of a lens disposed on the most image side of the first lens unit, DL2 is a distance from a vertex on the object side of a lens disposed on the most object side of the second lens unit to a vertex on the image side of a lens disposed on the most image side of the second lens unit, and DL3 is a distance from a vertex on the object side of a lens disposed on the most object side of the third lens unit to a vertex on the image side of a lens disposed on the most image side of the third lens unit.

The condition (8) is provided for shortening the total length of the optical system and for shortening the total length of the entire lens system obtained when the lens system is retracted.

If the upper limit of the condition (8) is exceeded, although the total length of the optical system at the telephoto end becomes short, the sum of lengths of the respective lens units on the optical axis becomes large, so that the total length of the entire lens system as retracted becomes long disadvantageously. If the lower limit of the condition (8) is exceeded, although the sum of lengths of the respective lens units on the optical axis becomes small, the total length of the optical system at the telephoto end becomes long, and the amount of movement of each lens unit is necessarily increased. Therefore, the length of a cam ring or the like for moving each lens unit becomes long, and, as a result, the total length of the entire lens system as retracted does not become short.

(c-4) The following condition is satisfied:

$$0.02<DA2/DD2<0.25 \quad (9)$$

where DD2 is the sum of thicknesses on the optical axis of lenses constituting the second lens unit, and DA2 is the sum of air separations included in the second lens unit.

The condition (9) is provided for making the compactness of the optical system and the attainment of good optical performance compatible with each other.

If the upper limit of the condition (9) is exceeded, the length of the second lens unit on the optical axis becomes long, so that it becomes disadvantageously difficult to attain the compactness of the optical system. If the lower limit of the condition (9) is exceeded, the power of the air lens becomes small, so that it becomes disadvantageously difficult to correct spherical aberration.

Next, the concrete lens construction of each of the zoom lenses according to the numerical examples 6 to 8 is described.

NUMERICAL EXAMPLE 6

The zoom lens according to the numerical example 6 is a zoom lens having the variable magnification ratio of about 2 and the aperture ratio of 2.9–4.0 or thereabout. FIG. 21 shows an optical sectional view of the zoom lens according to the numerical example 6.

In the numerical example 6 shown in FIG. 21, the first lens unit of negative refractive power is composed of two lenses, i.e., in order from the object side to the image side, a negative lens 11 of meniscus form having a concave surface facing the image side, and a positive lens 12 of meniscus form having a convex surface facing the object side.

The second lens unit of positive refractive power is composed of three lenses as a whole, i.e., in order from the object side to the image side, a positive lens 21 of bi-convex form, a negative lens 22 of bi-concave form, and a positive lens 23 of bi-convex form, and the negative lens 22 and the positive lens 23 constitute a cemented lens. Further, the third lens unit of positive refractive power is composed of a positive lens 31 having a convex surface facing the object side.

Further, during zooming from the wide-angle end to the telephoto end, the first lens unit makes a reciprocating motion convex toward the image side, the second lens unit moves toward the object side, and the third lens unit moves with a locus convex toward the image side.

NUMERICAL EXAMPLE 7

The zoom lens according to the numerical example 7 is a zoom lens having the variable magnification ratio of about 2 and the aperture ratio of 2.7–4.0 or thereabout. FIG. 25 shows an optical sectional view of the zoom lens according to the numerical example 7.

In the numerical example 7 shown in FIG. 25, the first lens unit of negative refractive power is composed of two lenses, i.e., in order from the object side to the image side, a negative lens 11 of meniscus form having a concave surface facing the image side, and a positive lens 12 of meniscus form having a convex surface facing the object side.

The second lens unit of positive refractive power is composed of three lenses as a whole, i.e., in order from the object side to the image side, a positive lens 21 of bi-convex form, a negative lens 22 of bi-concave form, and a positive lens 23 of bi-convex form, and the positive lens 21 and the negative lens 22 constitute a cemented lens. Further, the third lens unit of positive refractive power is composed of a positive lens 31 of bi-convex form.

Further, during zooming from the wide-angle end to the telephoto end, the first lens unit makes a reciprocating motion convex toward the image side, the second lens unit moves toward the object side, and the third lens unit moves with a locus convex toward the image side.

NUMERICAL EXAMPLE 8

The zoom lens according to the numerical example 8 is a zoom lens having the variable magnification ratio of about 2 and the aperture ratio of 2.8–4.0 or thereabout. FIG. 29 shows an optical sectional view of the zoom lens according to the numerical example 8.

In the numerical example 8 shown in FIG. 29, the first lens unit of negative refractive power is composed of two lenses, i.e., in order from the object side to the image side, a negative lens 11 of bi-concave form, and a positive lens 12 of meniscus form having a convex surface facing the object side.

The second lens unit of positive refractive power is composed of three lenses as a whole, i.e., in order from the object side to the image side, a positive lens 21 of bi-convex form, a positive lens 22 of bi-convex form, and a negative lens 23 of bi-concave form, and the positive lens 22 and the negative lens 23 constitute a cemented lens. Further, the third lens unit of positive refractive power is composed of a positive lens 31 of bi-convex form.

Further, during zooming from the wide-angle end to the telephoto end, the first lens unit moves toward the object side, the second lens unit also moves toward the object side, and the third lens unit moves with a locus convex toward the image side.

According to the second embodiment, with the respective lens elements set as described above, in particular, the following advantageous effects can be obtained in particular.

(d-1) It is possible to attain a zoom lens which is suited for a photographic system using a solid-state image sensor, is compact with less constituent lens elements, is corrected particularly for chromatic aberration, and has excellent optical performance, by disposing, in order from the object side to the image side, a first lens unit of negative refractive power, a second lens unit of positive refractive power and a third lens unit of positive refractive power, effecting the variation of magnification by varying the separations of the respective adjacent lens units, constructing the first lens unit with two lenses, i.e., in order from the object side to the image side, a concave lens and a convex lens, constructing the second lens unit with three lenses, i.e., in order from the object side to the image side, a single convex lens and a cemented lens composed of a concave lens and a convex lens, or a cemented lens composed of a convex lens and a concave lens and a single convex lens, or a single convex lens and a cemented lens composed of a convex lens and a concave lens, and constructing the third lens unit with at least one convex lens.

(d-2) It is possible to effectively correct the various off-axial aberrations, such as astigmatism and distortion, and spherical aberration due to the increase of an aperture ratio, by effectively introducing an aspheric surface into each lens unit.

Next, numerical data of the numerical examples 6 to 8 of the invention are shown.

In addition, the values of the factors in the above-mentioned conditions (5) to (9) for the numerical examples 6 to 8 are listed in Table-2.

Numerical Example 6:

| f = 5.50–10.60(mm) Fno = 2.9–4.0 2ω = 61.4°–34.4° | | | |
|---|---|---|---|
| R1 = 20.453 | D1 = 1.20 | N1 = 1.77250 | ν1 = 49.6 |
| R2 = 3.694* | D2 = 0.90 | | |
| R3 = 5.082 | D3 = 2.10 | N2 = 1.80518 | ν2 = 25.4 |
| R4 = 8.267 | D4 = Variable | | |
| R5 = Stop | D5 = 0.50 | | |
| R6 = 13.292* | D6 = 1.60 | N3 = 1.73077 | ν3 = 40.5 |
| R7 = −12.248 | D7 = 0.95 | | |
| R8 = −4.673 | D8 = 0.60 | N4 = 1.76182 | ν4 = 26.5 |
| R9 = 23.052 | D9 = 2.00 | N5 = 1.77250 | ν5 = 49.6 |
| R10 = −5.042* | D10 = Variable | | |
| R11 = 19.454* | D11 = 1.60 | N6 = 1.60311 | ν6 = 60.6 |
| R12 = −1267.560 | D12 = Variable | | |
| R13 = ∞ | D13 = 2.80 | N7 = 1.51633 | ν7 = 64.2 |
| R14 = ∞ | | | |

*Aspheric Surface

| Variable | Focal Length | | | | |
|---|---|---|---|---|---|
| Separation | 5.50 | 7.79 | 10.60 | 6.53 | 9.17 |
| D4 | 7.52 | 4.27 | 1.72 | 5.89 | 2.88 |
| D10 | 4.91 | 9.63 | 13.06 | 7.43 | 11.50 |
| D12 | 3.41 | 1.68 | 1.23 | 2.38 | 1.30 |

Aspheric Coefficients:

| | | | |
|---|---|---|---|
| R2 | R = 3.69429e+00 | K = −9.73942e−01 | B = 1.43792e−03 |
| | C = 2.73074e−05 | D = 1.56359e−06 | |
| R6 | R = 1.32924e+01 | K = 1.27994e+01 | B = −7.85390e−04 |
| | C = −6.33445e−05 | D = −9.01039e−07 | |
| R10 | R = −5.04162e+00 | K = 8.47026e−01 | B = 1.28637e−03 |
| | C = 2.36015e−05 | D = 7.54790e−06 | |
| R11 | R = 1.94539e+01 | K = 0.00000e+00 | B = −4.37109e−04 |
| | C = 1.62332e−05 | D = −1.26788e−06 | |

Numerical Example 7:

| f = 5.20–10.35(mm) Fno = 2.8–4.0 2ω = 64.4°–35.2° | | | |
|---|---|---|---|
| R1 = 110.720 | D1 = 1.20 | N1 = 1.77250 | ν1 = 49.6 |
| R2 = 3.410* | D2 = 1.02 | | |
| R3 = 5.803 | D3 = 2.00 | N2 = 1.80518 | ν2 = 25.4 |
| R4 = 18.549 | D4 = Variable | | |
| R5 = Stop | D5 = 0.50 | | |
| R6 = 4.856* | D6 = 1.90 | N3 = 1.77250 | ν3 = 49.6 |
| R7 = −9.078 | D7 = 0.50 | N4 = 1.71736 | ν4 = 29.5 |
| R8 = 5.069 | D8 = 0.42 | | |
| R9 = 19.306 | D9 = 1.60 | N5 = 1.69680 | ν5 = 55.5 |
| R10 = −14.532* | D10 = Variable | | |
| R11 = 508.660* | D11 = 1.50 | N6 = 1.69680 | ν6 = 55.5 |
| R12 = −13.714 | D12 = Variable | | |
| R13 = ∞ | D13 = 2.70 | N7 = 1.51633 | ν7 = 64.2 |
| R14 = ∞ | | | |

*Aspheric Surface

| Variable | Focal Length | | | | |
|---|---|---|---|---|---|
| Separation | 5.20 | 7.70 | 10.35 | 6.36 | 9.06 |
| D4 | 7.89 | 4.60 | 2.13 | 6.21 | 3.26 |
| D10 | 4.85 | 9.05 | 11.63 | 7.15 | 10.55 |
| D12 | 2.21 | 1.20 | 1.81 | 1.50 | 1.30 |

Aspheric Coefficients:

| | | | |
|---|---|---|---|
| R2 | R = 3.41414e+00 | K = −9.99930e−01 | B = 1.00175e−03 |
| | C = 1.62461e−05 | D = −3.70217e−07 | |
| R6 | R = 4.85608e+00 | K = 7.96803e−01 | B = −1.38408e−03 |
| | C = −4.51331e−05 | D = −6.60254e−06 | |
| R10 | R = −1.45325e+01 | K = 7.69796e+00 | B = 1.06613e−03 |
| | C = 7.42392e−05 | D = 2.58556e−06 | |
| R11 | R = 5.08660e+02 | K = 0.00000e+00 | B = −4.51399e−04 |
| | C = 2.67697e−06 | D = −3.21647e−07 | |

Numerical Example 8:

| f = 6.24–11.97(mm) Fno = 2.7–4.0 2ω = 55.4°–30.6° | | | |
|---|---|---|---|
| R1 = −408.296 | D1 = 1.30 | N1 = 1.77250 | ν1 = 49.6 |
| R2 = 5.731* | D2 = 1.11 | | |
| R3 = 6.705 | D3 = 2.00 | N2 = 1.84666 | ν2 = 23.8 |
| R4 = 9.956 | D4 = Variable | | |
| R5 = Stop | D5 = 0.70 | | |
| R6 = 37.724* | D6 = 1.60 | N3 = 1.69680 | ν3 = 55.5 |
| R7 = −11.263 | D7 = 0.15 | | |
| R8 = 4.068* | D8 = 1.90 | N4 = 1.69680 | ν4 = 55.5 |
| R9 = −10.353 | D9 = 0.50 | N5 = 1.64769 | ν5 = 33.8 |
| R10 = 3.020 | D10 = Variable | | |
| R11 = 130.261* | D11 = 1.80 | N6 = 1.60311 | ν6 = 60.6 |
| R12 = −8.133 | D12 = Variable | | |
| R13 = ∞ | D13 = 2.70 | N7 = 1.51633 | ν7 = 64.2 |
| R14 = ∞ | | | |

*Aspheric Surface

| Variable | Focal Length | | | | |
|---|---|---|---|---|---|
| Separation | 6.24 | 8.99 | 11.97 | 7.54 | 10.50 |
| D4 | 6.61 | 4.09 | 2.25 | 5.29 | 3.09 |
| D10 | 4.30 | 8.27 | 11.64 | 6.37 | 10.03 |
| D12 | 1.75 | 1.19 | 1.24 | 1.40 | 1.14 |

Aspheric Coefficients:

| | | | |
|---|---|---|---|
| R2 | R = 5.73088e+00 | K = −1.98834e+00 | B = 1.10448e−03 |
| | C = 6.36136e−06 | D = −1.55169e−07 | |
| R6 | R = 3.77245e+01 | K = −1.10342e+02 | B = −1.46479e−04 |
| | C = 2.09594e−05 | D = −3.06969e−06 | |
| R8 | R = 4.06784e+00 | K = −3.30676e−01 | B = 4.58158e−04 |
| | C = 3.25580e−06 | D = 2.67999e−06 | |
| R11 | R = 1.30261e+02 | K = 0.00000e+00 | B = −9.13704e−04 |
| | C = 2.07821e−05 | D = −7.46835e−07 | |

TABLE 2

| | | Numerical Example | | |
|---|---|---|---|---|
| Condition | | 6 | 7 | 8 |
| (5) | nd | 1.76182 | 1.71736 | 1.64769 |
| (6) | νd | 26.5 | 29.5 | 33.8 |
| (7) | X1 | 0.44 | 0.74 | 2.46 |
| | X3 | 2.29 | 1.03 | 0.61 |
| | \|X1/X3\| | 0.20 | 0.72 | 4.00 |
| (8) | DL1 | 4.20 | 4.22 | 4.41 |
| | DL2 | 5.15 | 4.42 | 4.15 |
| | DL3 | 1.60 | 1.50 | 1.80 |
| | DL | 31.08 | 29.29 | 28.60 |
| | (DL1 + DL1 + DL3)/DL | 0.35 | 0.35 | 0.36 |
| (9) | DA2 | 0.95 | 0.42 | 0.15 |
| | DD2 | 5.15 | 4.42 | 4.15 |
| | DA2/DD2 | 0.18 | 0.09 | 0.04 |

According to the second embodiment, it is possible to attain a zoom lens which is suited, in particular, for a photographic system using a solid-state image sensor, is compact with less constituent lens elements, and has excellent optical performance.

(Third Embodiment)

FIG. 33 to FIGS. 44A to 44D relate to a third embodiment of the invention, which corresponds to numerical examples 9 to 11 of the invention to be described later.

Figure 33:
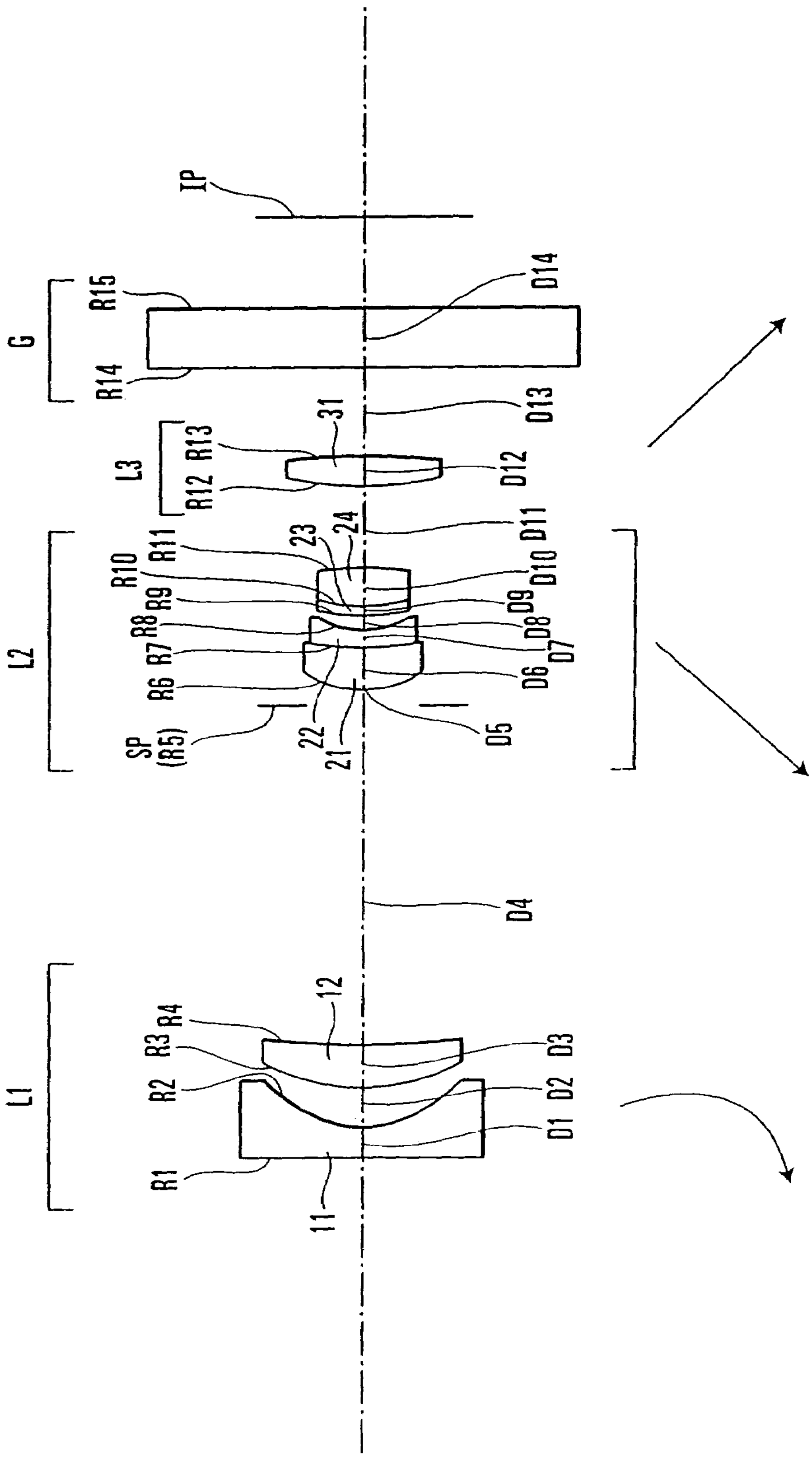
FIG. 33 is a lens block diagram showing a zoom lens at the wide-angle end according to a numerical example 9 of the invention.
Figure 34A:
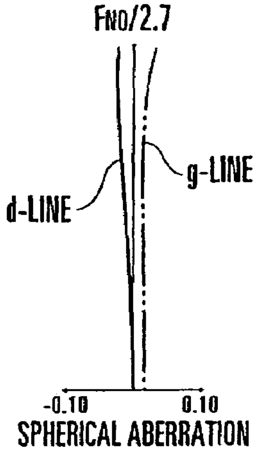
FIGS. 34A to 34D are graphs showing aberration curves at the wide-angle end in the zoom lens according to the numerical example 9 of the invention.
Figure 34B:
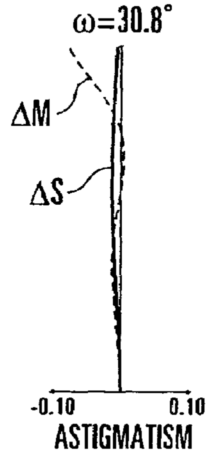
Figure 34C:
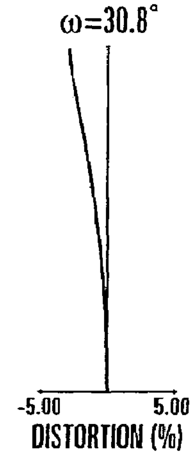
Figure 34D:
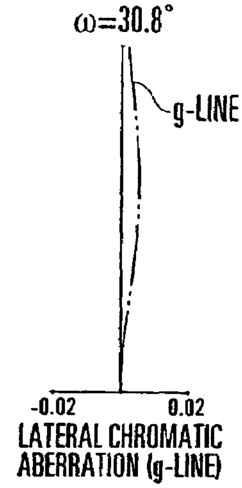
Figure 35A:
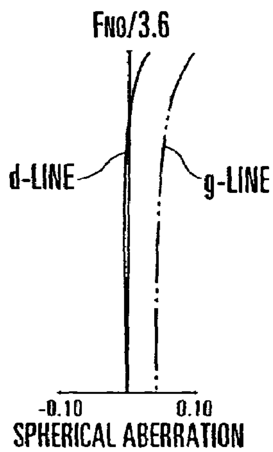
FIGS. 35A to 35D are graphs showing aberration curves at the middle focal length position in the zoom lens according to the numerical example 9 of the invention.
Figure 35B:
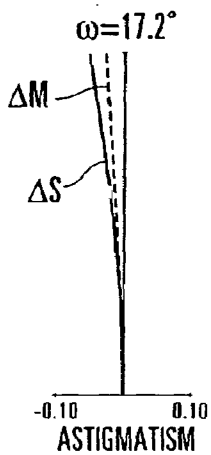
Figure 35C:
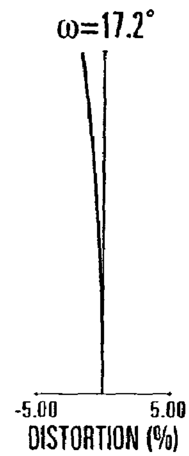
Figure 35D:
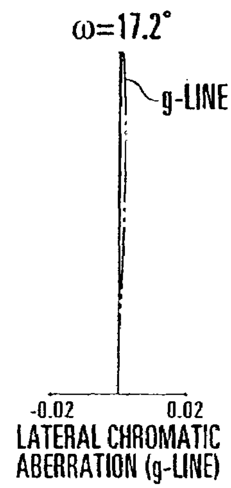
Figure 36A:
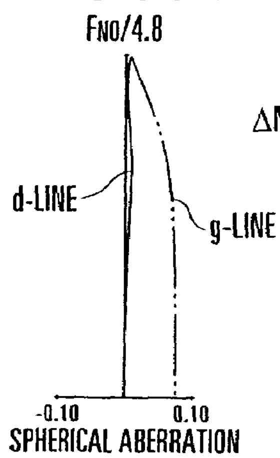
FIGS. 36A to 36D are graphs showing aberration curves at the telephoto end in the zoom lens according to the numerical example 9 of the invention.
Figure 36B:
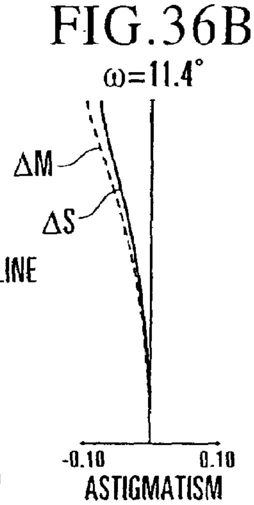
Figure 36C:
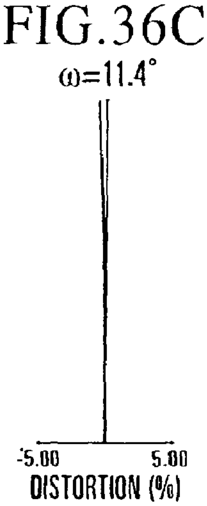
Figure 36D:
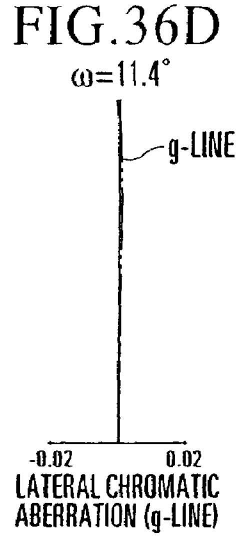

FIG. 33 is a lens block diagram showing a zoom lens according to the numerical example 9 of the invention. FIGS. 34A to 34D through FIGS. 36A to 36D are graphs showing aberration curves at the wide-angle end, the middle focal length position and the telephoto end, respectively, in the zoom lens according to the numerical example 9 of the invention.

Figure 37:
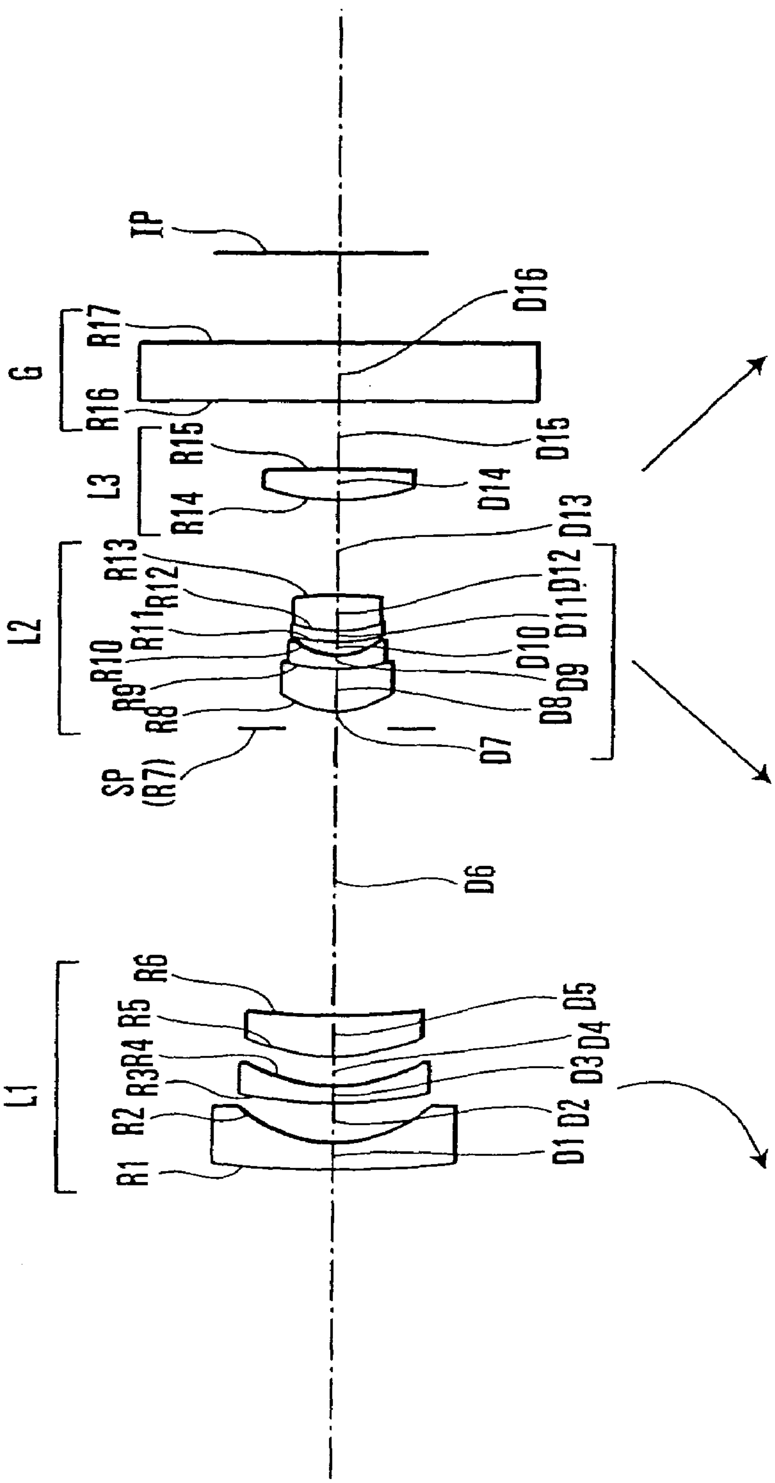
FIG. 37 is a lens block diagram showing a zoom lens at the wide-angle end according to a numerical example 10 of the invention.
Figure 38A:
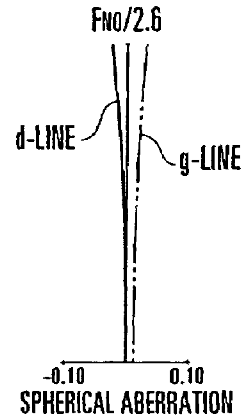
FIGS. 38A to 38D are graphs showing aberration curves at the wide-angle end in the zoom lens according to the numerical example 10 of the invention.
Figure 38B:
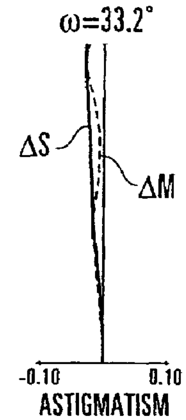
Figure 38C:
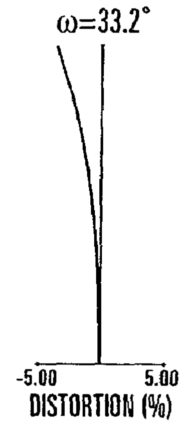
Figure 38D:
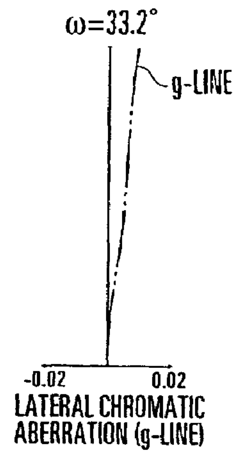
Figure 39A:
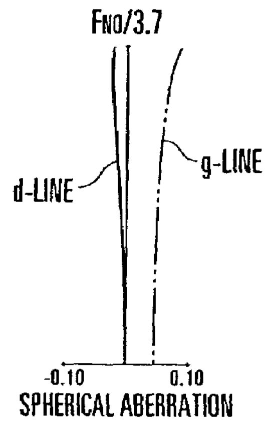
FIGS. 39A to 39D are graphs showing aberration curves at the middle focal length position in the zoom lens according to the numerical example 10 of the invention.
Figure 39B:
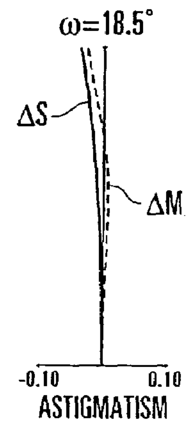
Figure 39C:
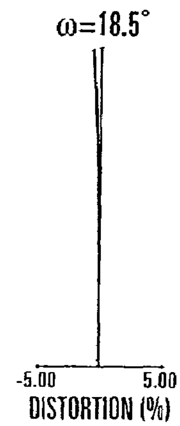
Figure 39D:
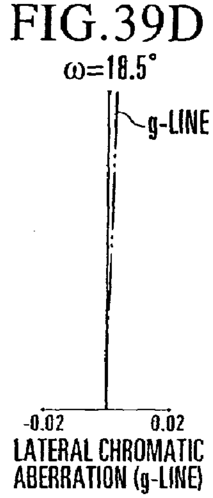
Figure 40A:
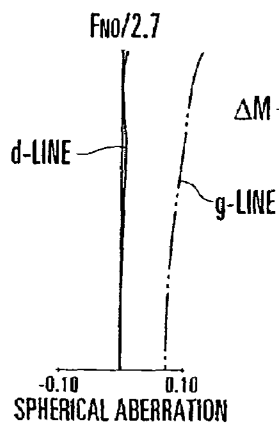
FIGS. 40A to 40D are graphs showing aberration curves at the telephoto end in the zoom lens according to the numerical example 10 of the invention.
Figure 40B:
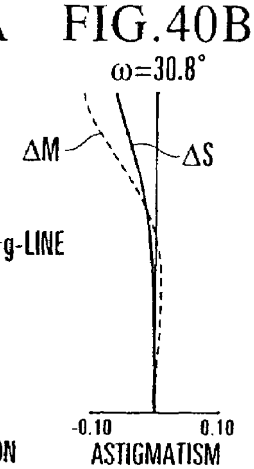
Figure 40C:
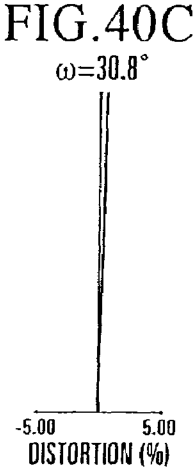
Figure 40D:
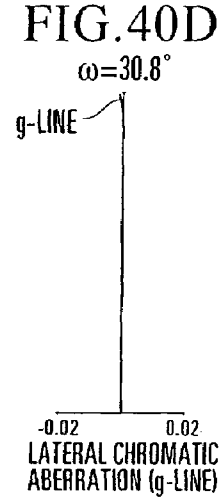

FIG. 37 is a lens block diagram showing a zoom lens according to the numerical example 10 of the invention. FIGS. 38A to 38D through FIGS. 40A to 40D are graphs showing aberration curves at the wide-angle end, the middle focal length position and the telephoto end, respectively, in the zoom lens according to the numerical example 10 of the invention.

Figure 41:
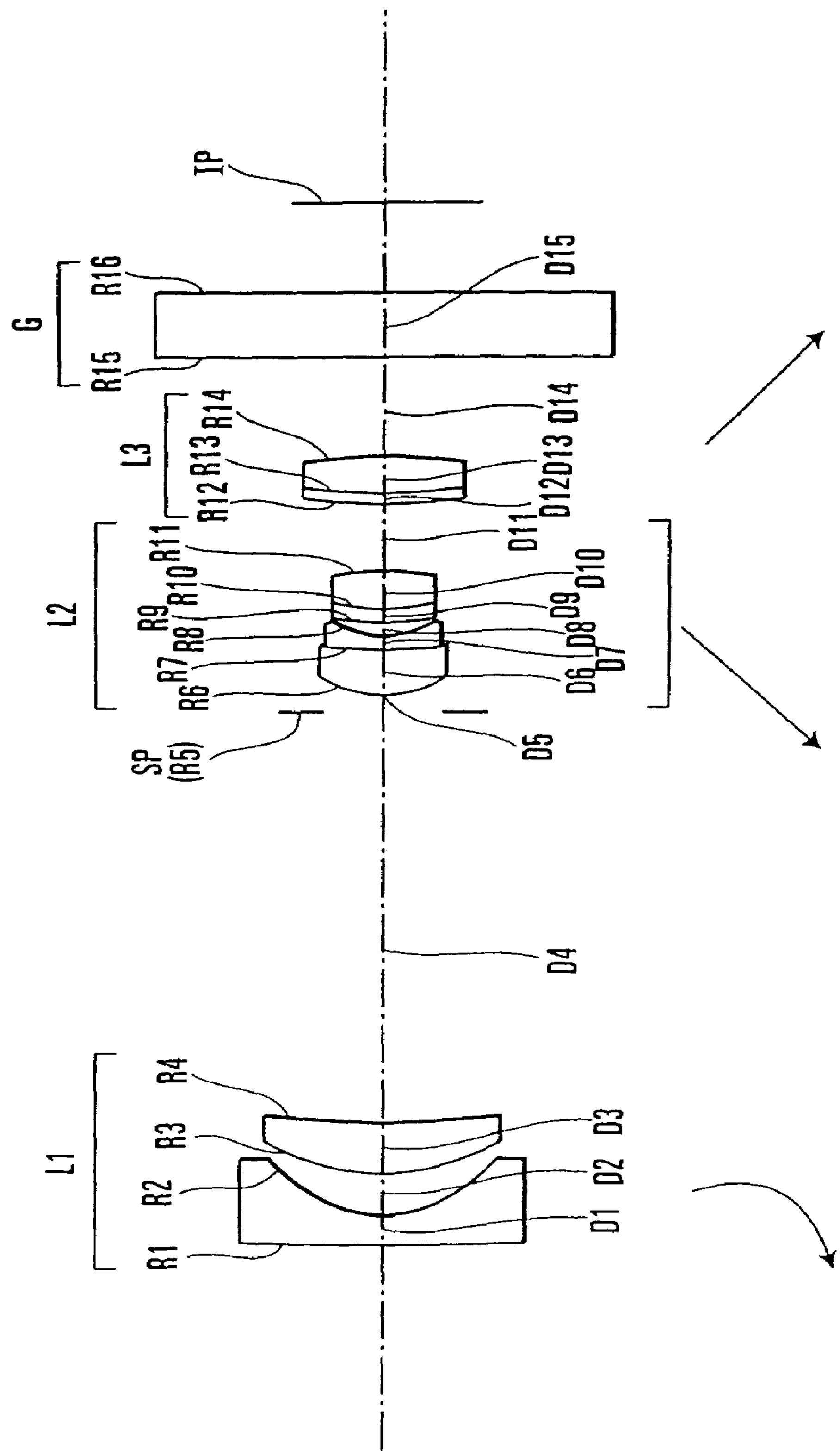
FIG. 41 is a lens block diagram showing a zoom lens at the wide-angle end according to a numerical example 11 of the invention.
Figure 42A:
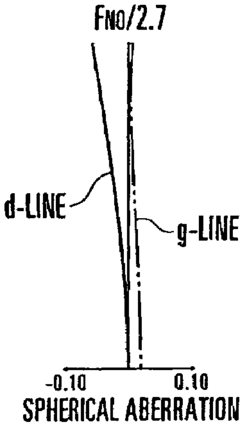
FIGS. 42A to 42D are graphs showing aberration curves at the wide-angle end in the zoom lens according to the numerical example 11 of the invention.
Figure 42B:
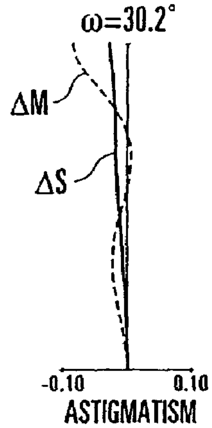
Figure 42C:
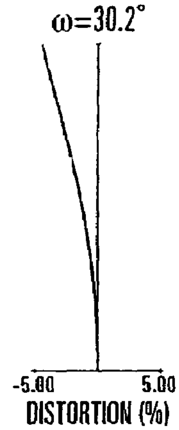
Figure 42D:
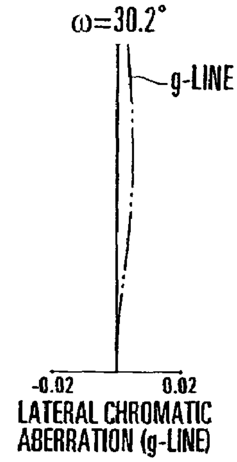
Figure 43A:
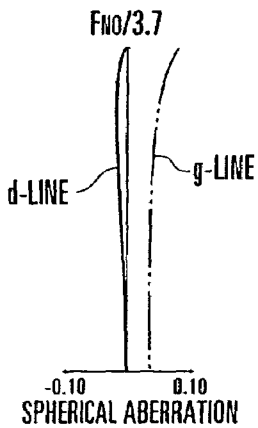
FIGS. 43A to 43D are graphs showing aberration curves at the middle focal length position in the zoom lens according to the numerical example 11 of the invention.
Figure 43B:
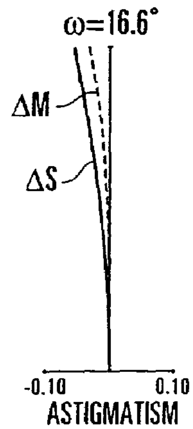
Figure 43C:
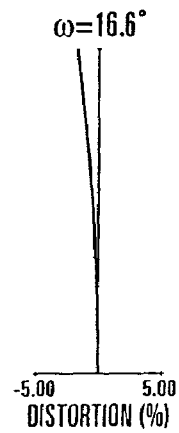
Figure 43D:
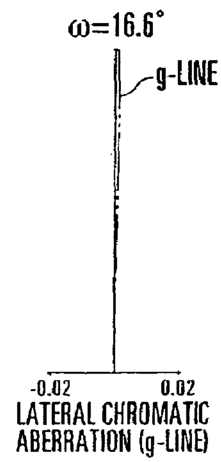
Figure 44A:
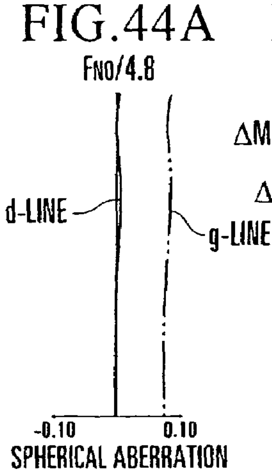
FIGS. 44A to 44D are graphs showing aberration curves at the telephoto end in the zoom lens according to the numerical example 11 of the invention.
Figure 44B:
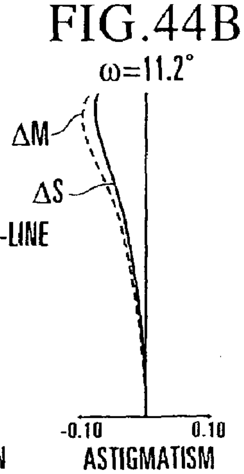
Figure 44C:
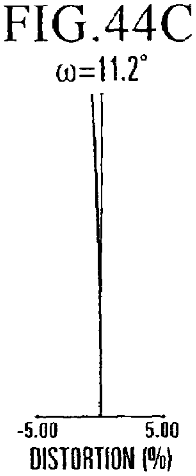
Figure 44D:
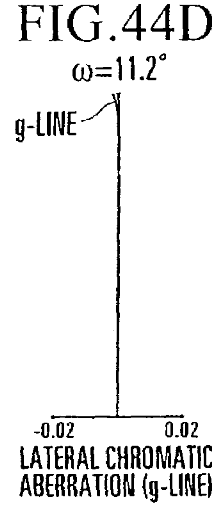

FIG. 41 is a lens block diagram showing a zoom lens according to the numerical example 11 of the invention. FIGS. 42A to 42D through FIGS. 43A to 43D are graphs showing aberration curves at the wide-angle end, the middle focal length position and the telephoto end, respectively, in the zoom lens according to the numerical example 11 of the invention.

In the lens block diagrams shown in FIGS. 33, 37 and 41, reference character L1 denotes a first lens unit of negative refractive power, reference character L2 denotes a second lens unit of positive refractive power, reference character L3 denotes a third lens unit of positive refractive power, reference character SP denotes an aperture stop, reference character IP denotes an image plane, and reference character G denotes a glass block, such as a filter or a color separation prism.

The zoom lens according to the third embodiment has three lens units, i.e., in order from the object side to the image side, the first lens unit L1 of negative refractive power, the second lens unit L2 of positive refractive power and the third lens unit L3 of positive refractive power. During zooming from the wide-angle end to the telephoto end, the first lens unit, the second lens unit and the third lens unit each move. More specifically, the first lens unit makes a reciprocating motion convex toward the image side, the second lens unit moves toward the object side, and the third lens unit moves toward the image side or moves with a locus convex toward the object side.

In the zoom lens according to the third embodiment, the variation of magnification is effected mainly by moving the second lens unit while the shift of an image point due to the variation of magnification is compensated for by moving forward and backward the first lens unit and moving the third lens unit toward the image side or moving the third lens unit with a locus convex toward the object side.

The third lens unit shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, the telecentric image formation on the image side necessary for the photographing apparatus (optical apparatus) using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

The zoom lens according to the third embodiment is characterized in that the third lens unit has at least one positive lens, and the following conditions are satisfied:

$$ndp3<1.5 \quad (10)$$

$$vp3>70 \quad (11)$$

where ndp3 and vdp3 are a refractive index and Abbe number, respectively, of material of the positive lens of the third lens unit.

The conditions (10) and (11) are provided mainly for correcting well curvature of field and lateral chromatic aberration. If the upper limit of the condition (10) is exceeded, the Petzval Sum increases in the negative direction, so that it becomes difficult to correct curvature of field. Further, if the upper limit of the condition (11) is exceeded, it becomes disadvantageously difficult to correct lateral chromatic aberration at the telephoto end.

In addition, with the zoom lens according to the third embodiment constructed as described in the foregoing, the primary object of the invention can be attained. However, in order to obtain better optical performance or in order to attain the reduction in size of the entire lens system, it is preferable to satisfy at least one of the following conditions (e-1) to (e-16).

(e-1) During the variation of magnification from the wide-angle end to the telephoto end, the first lens unit moves with a locus convex toward the image side, the second lens unit moves monotonically toward the object side, and the third lens unit moves toward the image side.

(e-2) The first lens unit consists of two lenses, i.e., a negative lens and a positive lens, and at least one surface of the negative lens of the first lens unit is an aspheric surface.

In the zoom lens according to the third embodiment, the first lens unit of negative refractive power has the role of causing an off-axial principal ray to be pupil-imaged on the center of a stop, and, particularly, on the wide-angle side, the amount of refraction of an off-axial principal ray is large. Therefore, in the first lens unit, the various off-axial aberrations, particularly, astigmatism and distortion, are apt to occur.

Accordingly, similarly to an ordinary wide-angle lens, the first lens unit is made to have the construction having a negative lens and a positive lens so as to prevent the diameter of a lens disposed on the most object side from increasing. Further, it is more preferable that a lens surface on the image side of the negative lens 11 of meniscus form is such an aspheric surface that a negative refractive power becomes progressively weaker toward a marginal portion of the lens surface. By this arrangement, astigmatism and distortion are corrected in a well-balanced manner, and the first lens unit is composed of such a small number of lenses as two, so that it becomes easy to make the entire lens system compact.

In addition, in order to prevent the occurrence of an off-axial aberration due to the refraction of an off-axial principal ray, each of lenses constituting the first lens unit has a lens surface approximate to concentric spherical surfaces having the center on a point at which the stop and the optical axis intersect.

(e-3) The following conditions are satisfied:

$$ndn1>1.70 \quad (12)$$

$$vdn1>35.0 \quad (13)$$

where ndn1 and vdn1 are a refractive index and Abbe number, respectively, of material of a negative lens included in the first lens unit.

The conditions (12) and (13) are provided for making the compactness of the entire lens system and the good imaging performance compatible with each other.

If the upper limit of the condition (12) is exceeded, the Petzval sum of the first lens unit increases in the positive direction, so that it becomes difficult to correct curvature of field.

Further, if the upper limit of the condition (13) is exceeded, it becomes disadvantageously difficult to correct lateral chromatic aberration at the wide-angle end, in particular.

(e-4) The second lens unit consists of two cemented lenses.

In the third embodiment, in order to cope with the reduction of the amount of chromatic aberration, which is required according to the increased number of pixels and the minimization of cell pitches of a solid-state image sensor such as a CCD, the second lens unit consists of two cemented lenses, i.e., a first cemented lens composed of a positive lens 21 of meniscus form and a negative lens 22 of meniscus form cemented together, and a second cemented lens composed of a negative lens 23 and a positive lens 24 cemented together. By this arrangement, it is possible to correct well longitudinal chromatic aberration and lateral chromatic aberration.

Further, with the second lens unit consisting of two cemented lenses, the following advantages are obtained. Since a refractive power of the concave (negative) lens component in the so-called triplet type is separated into two components, the degree of freedom of the correction of aberration is increased as against an aberration correcting method using such a single concave lens component as that in the triplet type. Accordingly, it becomes unnecessary to correct off-axial flare, which, otherwise, is corrected by increasing the glass thickness of the concave lens component, or to correct spherical aberration due to two negative air lenses provided before and behind the concave lens component. Therefore, it becomes possible to lessen the thickness on the optical axis of the second lens unit as compared with the triplet type. Thus, the second lens unit composed of two cemented lenses contributes to the shortening of the entire optical system and the shortening of the total length of the lens system as retracted.

(e-5) The second lens unit has, on the most object side thereof, a first cemented lens composed of a positive lens having a convex surface facing the object side and a negative lens having a concave surface facing the image side, a lens surface on the object side of the positive lens of the first cemented lens is an aspheric surface, and the following condition is satisfied:

$$0<(R21-R23)/(R21+R23)<0.1 \quad (14)$$

where R21 is a radius of paraxial curvature of the lens surface on the object side of the positive lens of the first cemented lens, and R23 is a radius of paraxial curvature of a lens surface on the image side of the negative lens of the first cemented lens.

If the upper limit of the condition (14) is exceeded, the Petzval sum of the second lens unit increases in the negative direction, so that it becomes difficult to correct curvature of field.

If the lower limit of the condition (14) is exceeded, it becomes disadvantageously difficult to correct spherical aberration and coma.

(e-6) The second lens unit has a positive lens disposed on the most image side thereof, and the following conditions are satisfied:

$$ndp2>1.70 \quad (15)$$

$$vdp2>40.0 \quad (16)$$

where ndp2 and vdp2 are a refractive index and Abbe number, respectively, of material of the positive lens of the second lens unit.

If the upper limit of the condition (15) is exceeded, the Petzval sum increases in the negative direction, so that it becomes difficult to correct curvature of field. Further, if the upper limit of the condition (16) is exceeded, it becomes disadvantageously difficult to correct longitudinal chromatic aberration at the telephoto end.

(e-7) The third lens unit consists of one positive lens.

The third lens unit of positive refractive power consists of one positive lens 31 having a convex surface facing the object side, and serves also as a field lens for making the zoom lens telecentric on the image side.

(e-8) One positive lens of the third lens unit has at least one aspheric surface.

In particular, in the third embodiment, it is preferable that a lens surface on the image side of the convex lens 31 is such an aspheric surface that a positive refractive power becomes progressively weaker toward a marginal portion of the lens surface. By this arrangement, it is possible to correct the various off-axial aberrations over the entire zooming range.

(e-9) Focusing from an infinitely distant object to a closest object is effected by moving the third lens unit toward the object side.

When focusing from an infinitely distant object to a closest object is effected by using the zoom lens according to the third embodiment, the good optical performance can be obtained by moving the first lens unit toward the object side. However, it is more preferable to move the third lens unit toward the object side.

This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

Further, in a case where focusing is performed by using the third lens unit, if the third lens unit is arranged to be moved toward the image side during the variation of magnification from the wide-angle end to the telephoto end, the telephoto end, at which the amount of movement for focusing is large, can be located on the image side. Accordingly, it becomes possible to minimize the amount of total movement of the third lens unit required for zooming and focusing. This arrangement makes it possible to attain the compactness of the entire lens system.

(e-10) The following condition is satisfied:

$$0.25<(L1+L2+L3)/L<0.45 \quad (17)$$

where L is a distance, at the telephoto end, from a vertex on the object side of a lens disposed on the most object side of the first lens unit to an image plane, L1 is a distance from the vertex on the object side of the lens disposed on the most object side of the first lens unit to a vertex on the image side of a lens disposed on the most image side of the first lens unit, L2 is a distance from a vertex on the object side of a lens disposed on the most object side of the second lens unit to a vertex on the image side of a lens disposed on the most image side of the second lens unit, and L3 is a distance from a vertex on the object side of a lens disposed on the most object side of the third lens unit to a vertex on the image side of a lens disposed on the most image side of the third lens unit.

If the upper limit of the condition (17) is exceeded, although the total length of the optical system at the telephoto end becomes short, the sum of lengths of the respective lens units on the optical axis becomes large, so that the total length of the entire lens system as retracted becomes long disadvantageously.

If the lower limit of the condition (17) is exceeded, although the sum of lengths of the respective lens units on the optical axis becomes small, the total length of the optical system at the telephoto end becomes long, and the amount of movement of each lens unit is necessarily increased. Therefore, the length of a cam ring or the like for moving each lens unit becomes long, and, as a result, the total length of the entire lens system as retracted does not become short.

(e-11) The following condition is satisfied:

$$0.05<A2/D2<0.2 \quad (18)$$

where D2 is the sum of thicknesses on the optical axis of lenses constituting the second lens unit, and A2 is the sum of air separations included in the second lens unit.

If the upper limit of the condition (18) is exceeded, the length of the second lens unit on the optical axis becomes long, so that it becomes disadvantageously difficult to attain the compactness of the optical system.

If the lower limit of the condition (18) is exceeded, the power of the air lens becomes small, so that it becomes disadvantageously difficult to correct spherical aberration.

(e-12) The first lens unit of negative refractive power consists of two lenses, i.e., in order from the object side to the image side, a negative lens 11 of meniscus form having a concave surface facing the image side, and a positive lens 12 of meniscus form having a convex surface facing the object side, or consists of three lenses, i.e., in order from the object side to the image side, a negative lens 11 of meniscus form having a convex surface facing the object side, a negative lens 12 of meniscus form having a convex surface facing the object side, and a positive lens 13 of meniscus form having a convex surface facing the object side, the second lens unit of positive refractive power consists of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form, the positive lens 21 and the negative lens 22 constituting a cemented lens, the negative lens 23 and the positive lens 24 constituting a cemented lens, and the third lens unit of positive refractive power consists of a positive lens 31 having a convex surface facing the image side or a cemented lens composed of a negative lens and a positive lens.

By this arrangement, it is possible to easily attain the compactness of a lens system while keeping good optical performance.

(e-13) The second lens unit of positive refractive power has, on the most object side thereof, a positive lens 21 having a strong convex surface facing the object side. By this arrangement, it is possible to lessen the angle of refraction of an off-axial principal ray having exited from the first lens unit, thereby preventing the various off-axial aberrations from occurring.

(e-14) A positive lens 21 included in the second lens unit is a lens arranged to allow an on-axial ray to pass at the largest height, and is concerned with the correction of, mainly, spherical aberration and coma. Therefore, it is preferable that a lens surface on the object side of the positive lens 21 is such an aspheric surface that a positive refractive power becomes progressively weaker toward a marginal portion of the lens surface. By this arrangement, it becomes easy to correct well spherical aberration and coma.

(e-15) A negative lens 22 disposed on the image side of a positive lens 21 on the object side included in the second lens unit is made to have a concave surface facing the image side, so that a negative air lens is formed by the concave surface on the image side of the negative lens 22 and a convex surface on the object side of a negative lens 23 disposed subsequent to the negative lens 22. By this arrangement, it is possible to correct spherical aberration occurring due to the increase of an aperture ratio.

(e-16) When the back focal distance is denoted by sk', the focal length of the third lens unit is denoted by f3, and the image magnification of the third lens unit is denoted by $\beta 3$, the following relation is obtained:

$$sk'=f3(1-\beta 3)$$

provided that $0<\beta 3<1.0$.

Here, when the third lens unit is moved toward the image side during the variation of magnification from the wide-angle end to the telephoto end, the back focal distance sk' decreases, so that the image magnification $\beta 3$ of the third lens unit increases on the telephoto side. Then, as a result, the third lens unit shares the variation of magnification with the second lens unit, so that the amount of movement of the second lens unit is reduced. Therefore, since such a space for the movement of the second lens unit can be saved, the third lens unit contributes to the reduction in size of the lens system.

Next, characteristic features of the lens construction of each of the zoom lenses according to the numerical examples 9 to 11 are described.

NUMERICAL EXAMPLE 9

The zoom lens according to the numerical example 9 shown in FIG. 33 is a zoom lens having the variable magnification ratio of about 3 and the aperture ratio of 2.7–4.8 or thereabout.

NUMERICAL EXAMPLE 10

In the zoom lens according to the numerical example 10 shown in FIG. 37, during zooming from the wide-angle end to the telephoto end, the first lens unit makes a reciprocating motion convex toward the image side, the second lens unit moves toward the object side, and the third lens unit moves toward the image side.

In the numerical example 10, the first lens unit consists of three lenses, i.e., in order from the object side to the image side, a negative lens 11 of meniscus form, a negative lens 12 of meniscus form and a positive lens 13 of meniscus form, so that it is possible to easily attain the further widening of an angle of view as compared with a zoom lens in which the first lens unit is composed of two lenses.

The zoom lens according to the numerical example 10 is a zoom lens having the variable magnification ratio of about 3 and the aperture ratio of 2.6–4.8 or thereabout.

NUMERICAL EXAMPLE 11

In the zoom lens according to the numerical example 11 shown in FIG. 41, during zooming from the wide-angle end to the telephoto end, the first lens unit makes a reciprocating motion convex toward the image side, the second lens unit moves toward the object side, and the third lens unit moves toward the image side.

In the numerical example 11, the third lens unit consists of a cemented lens composed of a negative lens of meniscus form and a positive lens of bi-convex form, thereby sufficiently correcting chromatic aberration in conjunction with two cemented lenses of the second lens unit.

The zoom lens according to the numerical example 11 is a zoom lens having the variable magnification ratio of about 3.0 and the aperture ratio of 2.7–4.8 or thereabout.

Next, numerical data of the numerical examples 9 to 11 of the invention are shown.

In addition, the values of the factors in the above-mentioned conditions (10) to (18) for the numerical examples 9 to 11 are listed in Table-3.

Numerical Example 9:

| | | | |
|---|---|---|---|
| R1 = 206.343 | D1 = 1.40 | N1 = 1.80238 | ν1 = 40.7 |
| R2 = 4.841* | D2 = 1.87 | | |
| R3 = 9.750 | D3 = 2.00 | N2 = 1.84666 | ν2 = 23.9 |
| R4 = 49.125 | D4 = Variable | | |
| R5 = Stop | D5 = 0.70 | | |
| R6 = 4.564* | D6 = 2.00 | N3 = 1.74330 | ν3 = 49.3 |
| R7 = 10.675 | D7 = 0.80 | N4 = 1.69895 | ν4 = 30.1 |
| R8 = 3.878 | D8 = 0.72 | | |
| R9 = 10.459 | D9 = 0.50 | N5 = 1.84666 | ν5 = 23.9 |
| R10 = 6.339 | D10 = 1.80 | N6 = 1.60311 | ν6 = 60.6 |
| R11 = −19.132 | D11 = Variable | | |
| R12 = 14.948 | D12 = 1.40 | N7 = 1.48749 | ν7 = 70.2 |
| R13 = −48.563 | D13 = Variable | | |
| R14 = ∞ | D14 = 2.82 | N8 = 1.51633 | ν8 = 64.1 |
| R15 = ∞ | | | |

*Aspheric Surface

| Variable | Focal Length | | |
|---|---|---|---|
| Separation | 5.49 | 10.60 | 16.18 |
| D4 | 16.12 | 5.84 | 2.43 |
| D11 | 3.93 | 11.43 | 19.83 |
| D13 | 4.20 | 3.82 | 2.53 |

Aspheric Coefficients:

| | | | |
|---|---|---|---|
| R2 | R = 4.84094e+00 | K = −1.84876e+00 | B = 1.10500e−03 |
| | C = −1.66493e−05 | D = 5.13200e−07 | E = −2.00144e−08 |
| | F = 3.39222e−10 | | |
| R6 | R = 4.56367e+00 | K = −1.26047e−01 | B = −2.89482e−04 |
| | C = −9.34418e−06 | D = 1.07843e−07 | E = −3.76119e−08 |

Numerical Example 10:

| | | | |
|---|---|---|---|
| R1 = 59.735 | D1 = 1.30 | N1 = 1.67470 | ν1 = 54.9 |
| R2 = 6.518* | D2 = 2.02 | | |
| R3 = 21.785 | D3 = 0.80 | N2 = 1.77250 | ν2 = 49.6 |
| R4 = 8.687 | D4 = 1.48 | | |
| R5 = 11.006 | D5 = 2.00 | N3 = 1.84666 | ν3 = 23.9 |
| R6 = 33.156 | D6 = Variable | | |
| R7 = Stop | D7 = 0.80 | | |
| R8 = 4.526* | D8 = 2.20 | N4 = 1.74330 | ν4 = 49.3 |
| R9 = 11.087 | D9 = 0.60 | N5 = 1.69895 | ν5 = 30.1 |
| R10 = 3.873 | D10 = 0.75 | | |
| R11 = 10.369 | D11 = 0.50 | N6 = 1.84666 | ν6 = 23.9 |
| R12 = 6.401 | D12 = 1.80 | N7 = 1.60311 | ν7 = 60.6 |
| R13 = −19.975 | D13 = Variable | | |

-continued

| | | | |
|---|---|---|---|
| R14 = 12.110* | D14 = 1.50 | N8 = 1.48749 | ν8 = 70.2 |
| R15 = −54.317 | D15 = Variable | | |
| R16 = ∞ | D16 = 2.83 | N9 = 1.51633 | ν9 = 64.1 |
| R17 = ∞ | | | |

*Aspheric Surface

| Variable | Focal Length | | |
|---|---|---|---|
| Separation | 5.00 | 9.79 | 14.98 |
| D6 | 14.64 | 5.46 | 2.12 |
| D13 | 4.83 | 13.24 | 21.64 |
| D15 | 3.55 | 3.02 | 2.51 |

Aspheric Coefficients:

| | | | |
|---|---|---|---|
| R2 | R = 6.51783e+00 | K = 2.42523e−01 | B = −5.97797e−04 |
| | C = −1.56333e−06 | D = −7.09941e−07 | E = 2.27735e−08 |
| | F = −6.39051e−10 | | |
| R8 | R = 4.52644e+00 | K = −1.27422e−01 | B = −3.12555e−04 |
| | C = −9.46539e−06 | D = 8.23854e−08 | E = −3.89693e−08 |
| R14 | R = 1.21103e+01 | K = 0 | B = −1.72597e−04 |
| | C = 7.00489e−06 | D = −1.67824e−07 | |

Numerical Example 11:

| | | | |
|---|---|---|---|
| R1 = 156.481 | D1 = 1.30 | N1 = 1.80238 | ν1 = 40.7 |
| R2 = 5.435* | D2 = 1.83 | | |
| R3 = 9.697 | D3 = 2.20 | N2 = 1.84666 | ν2 = 23.9 |
| R4 = 34.098 | D4 = Variable | | |
| R5 = Stop | D5 = 0.80 | | |
| R6 = 4.588* | D6 = 2.00 | N3 = 1.74330 | ν3 = 49.3 |
| R7 = 13.399 | D7 = 0.60 | N4 = 1.69895 | ν4 = 30.1 |
| R8 = 3.929 | D8 = 0.66 | | |
| R9 = 11.757 | D9 = 0.60 | N5 = 1.84666 | ν5 = 23.9 |
| R10 = 7.899 | D10 = 1.70 | N6 = 1.60311 | ν6 = 60.6 |
| R11 = −20.079 | D11 = Variable | | |
| R12 = 25.476 | D12 = 0.50 | N7 = 1.60342 | ν7 = 38.0 |
| R13 = 24.901 | D13 = 1.60 | N8 = 1.49700 | ν8 = 81.5 |
| R14 = −25.962 | D14 = Variable | | |
| R15 = ∞ | D15 = 2.80 | N9 = 1.51633 | ν9 = 64.1 |
| R16 = ∞ | | | |

*Aspheric Surface

| Variable | Focal Length | | |
|---|---|---|---|
| Separation | 5.64 | 10.99 | 16.51 |
| D4 | 18.32 | 6.10 | 2.69 |
| D11 | 3.11 | 9.75 | 18.27 |
| D14 | 4.42 | 4.42 | 2.54 |

Aspheric Coefficients:

| | | | |
|---|---|---|---|
| R2 | R = 5.43534e+00 | K = −2.28361e+00 | B = 1.23160e−03 |
| | C = −2.40093e−05 | D = 8.92996e−07 | E = −2.78071e−08 |
| | F = 3.81774e−10 | | |

-continued

| | | | |
|---|---|---|---|
| R6 | R = 4.58844e+00 | K = −1.27107e−01 | B = −2.62331e−04 |
| | C = −8.61678e−06 | D = 1.99209e−07 | E = −3.78975e−08 |

TABLE 3

| Condition | | lower limit | upper limit | Numerical Example 9 | 10 | 11 |
|---|---|---|---|---|---|---|
| (10) | ndp3 | | 1.5 | 1.48749 | 1.48749 | 1.49700 |
| (11) | vdp3 | 70 | | 70.2 | 70.2 | 81.5 |
| (12) | ndn1 | 1.7 | | 1.80238 | — | 1.80238 |
| (13) | vdn1 | 35 | | 40.7 | — | 40.7 |
| (14) | R21 | | | 4.564 | 4.526 | 4.588 |
| | R23 | | | 3.878 | 3.873 | 3.929 |
| | (R21 − R23)/(R21 + R23) | 0 | 0.1 | 0.081 | 0.078 | 0.077 |
| (15) | ndp2 | 1.7 | | 1.74330 | 1.74330 | 1.74330 |
| (16) | vdp2 | | 40 | 49.3 | 49.3 | 49.3 |
| (17) | L1 | | | 5.27 | 7.60 | 5.33 |
| | L2 | | | 5.82 | 5.85 | 5.56 |
| | L3 | | | 1.40 | 1.50 | 2.10 |
| | L | | | 41.74 | 45.78 | 41.28 |
| | (L1 + L2 + L3)/L | 0.25 | 0.45 | 0.30 | 0.33 | 0.31 |
| (18) | A2 | | | 0.72 | 0.75 | 0.66 |
| | D2 | | | 5.82 | 5.85 | 5.56 |
| | A2/D2 | 0.05 | 0.2 | 0.12 | 0.13 | 0.12 |

According to the third embodiment of the invention, it is possible to attain a zoom lens which is suited for a photographic system using a solid-state image sensor, has a high variable magnification ratio despite being compact and small in diameter with less constituent lens elements, and has excellent optical performance.

(Fourth Embodiment)

FIG. 45 to FIGS. 60A to 60D relate to a fourth embodiment of the invention, which corresponds to numerical examples 12 to 15 of the invention to be described later.

Figure 45:
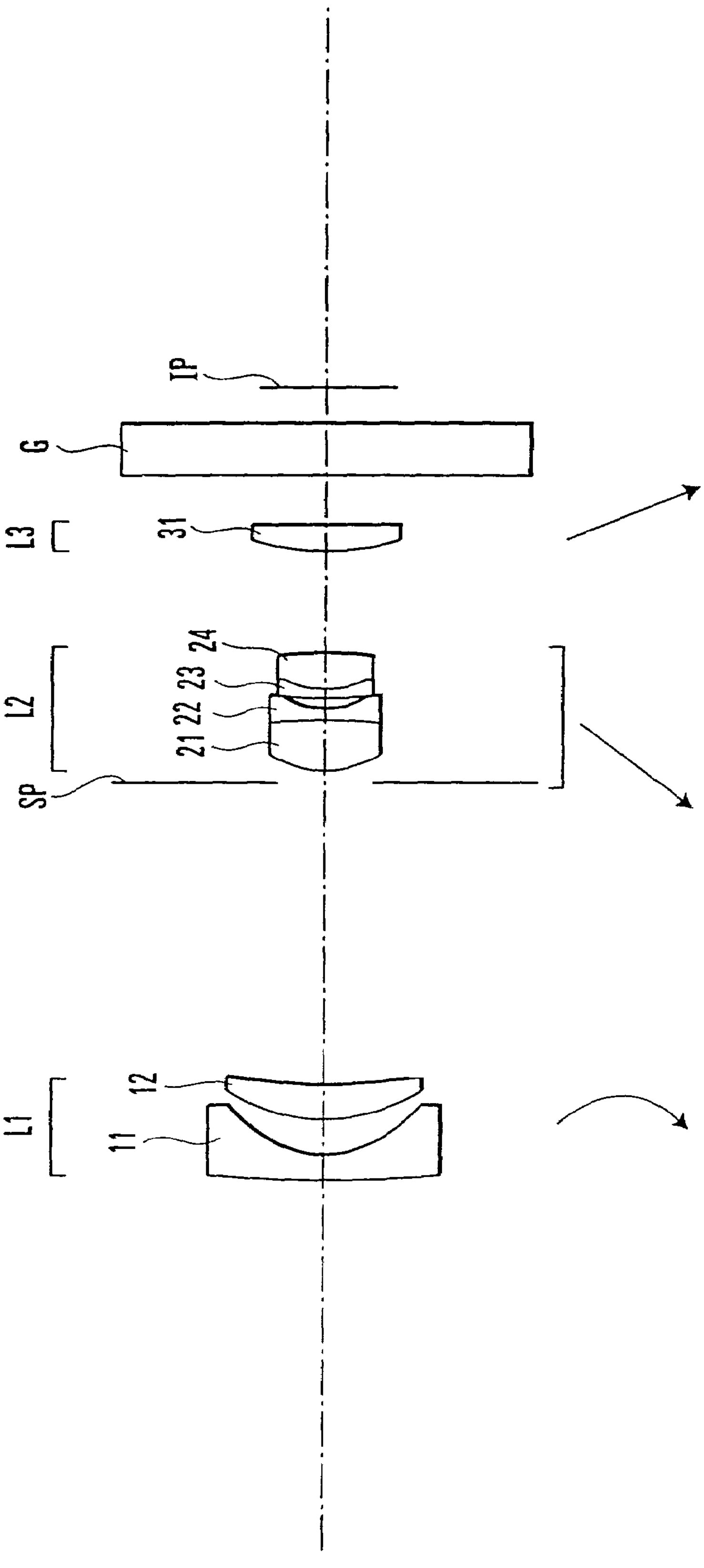
FIG. 45 is a lens block diagram showing a zoom lens at the wide-angle end according to a numerical example 12 of the invention.
Figure 46A:
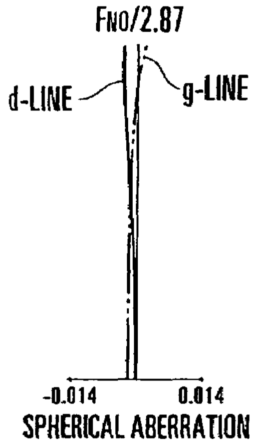
FIGS. 46A to 46D are graphs showing aberration curves at the wide-angle end in the zoom lens according to the numerical example 12 of the invention.
Figure 46B:
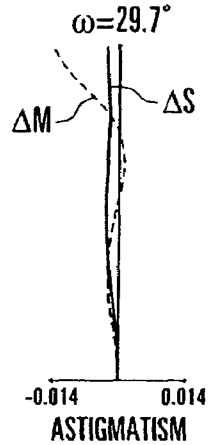
Figure 46C:
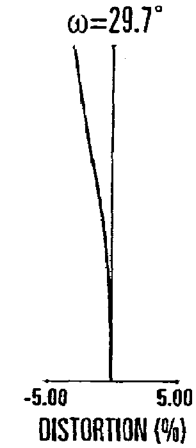
Figure 46D:
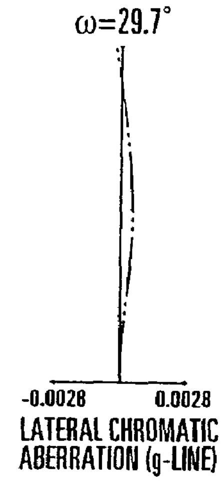
Figure 47A:
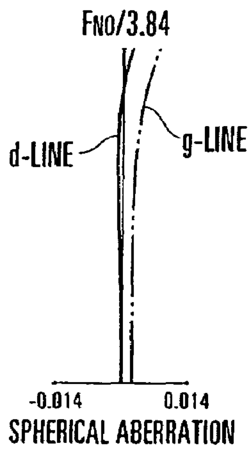
FIGS. 47A to 47D are graphs showing aberration curves at the middle focal length position in the zoom lens according to the numerical example 12 of the invention.
Figure 47B:
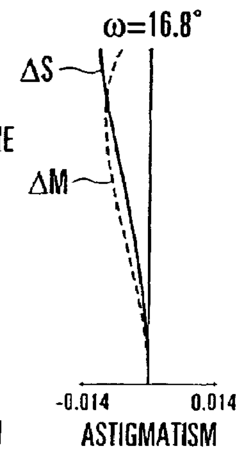
Figure 47C:
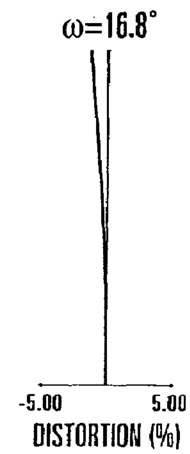
Figure 47D:
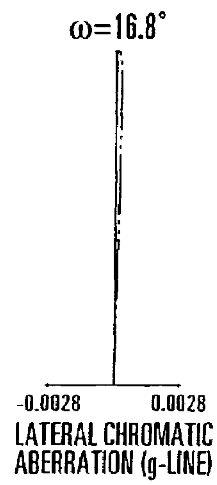
Figure 48A:
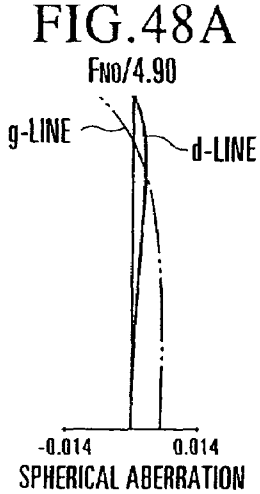
FIGS. 48A to 48D are graphs showing aberration curves at the telephoto end in the zoom lens according to the numerical example 12 of the invention.
Figure 48B:
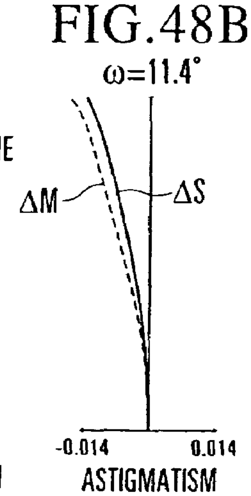
Figure 48C:
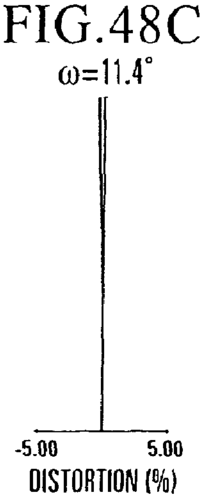
Figure 48D:
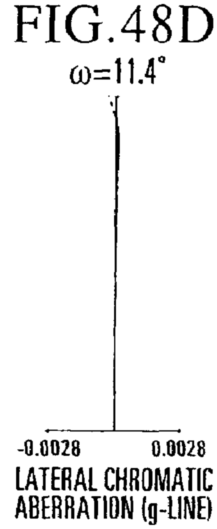

FIG. 45 is a lens block diagram showing a zoom lens according to the numerical example 12 of the invention. FIGS. 46A to 46D through FIGS. 48A to 48D are graphs showing aberration curves at the wide-angle end, the middle focal length position and the telephoto end, respectively, in the zoom lens according to the numerical example 12 of the invention.

Figure 49:
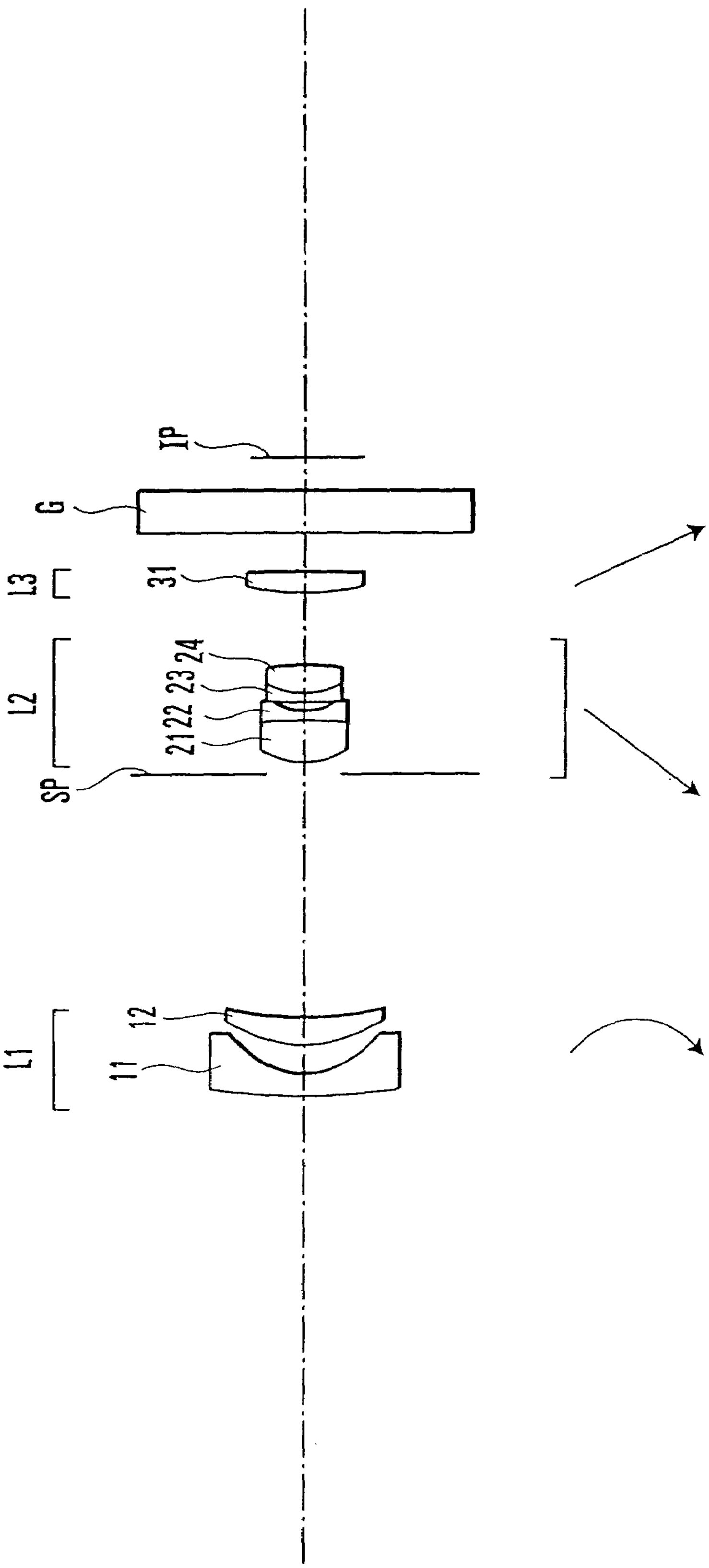
FIG. 49 is a lens block diagram showing a zoom lens at the wide-angle end according to a numerical example 13 of the invention.
Figure 50A:
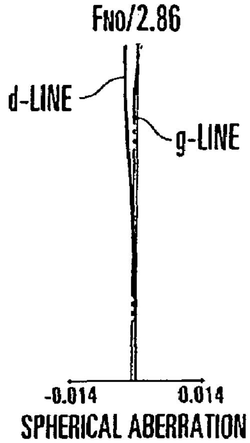
FIGS. 50A to 50D are graphs showing aberration curves at the wide-angle end in the zoom lens according to the numerical example 13 of the invention.
Figure 50B:
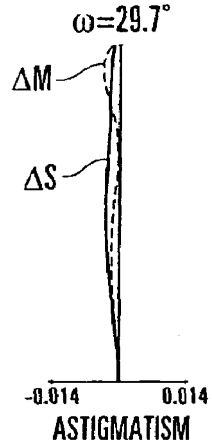
Figure 50C:
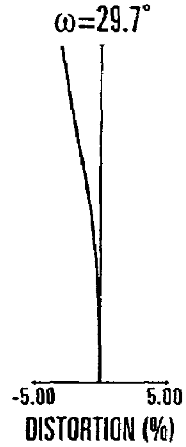
Figure 50D:
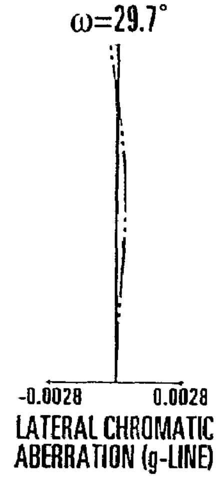
Figure 51A:
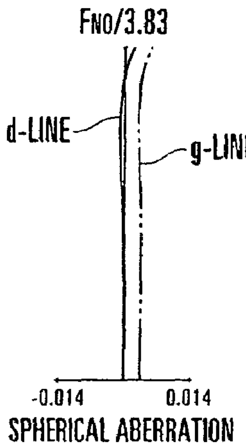
FIGS. 51A to 51D are graphs showing aberration curves at the middle focal length position in the zoom lens according to the numerical example 13 of the invention.
Figure 51B:
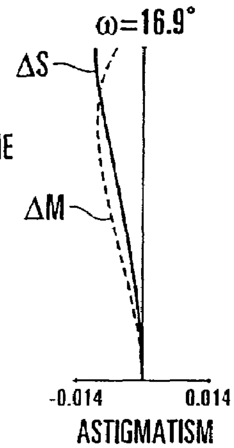
Figure 51C:
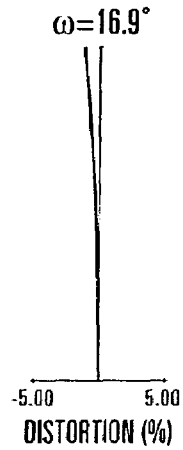
Figure 51D:
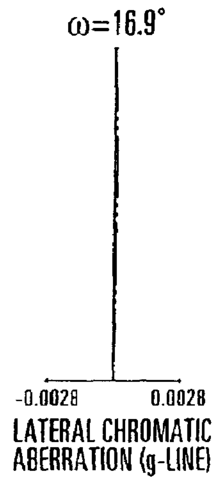
Figure 52A:
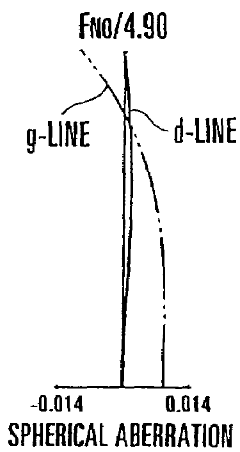
FIGS. 52A to 52D are graphs showing aberration curves at the telephoto end in the zoom lens according to the numerical example 13 of the invention.
Figure 52B:
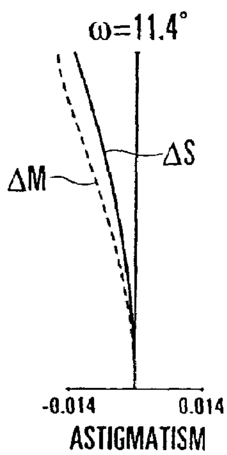
Figure 52C:
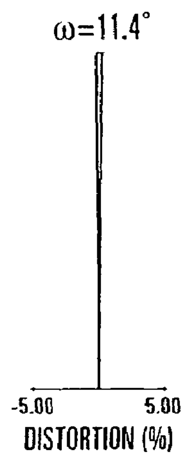
Figure 52D:
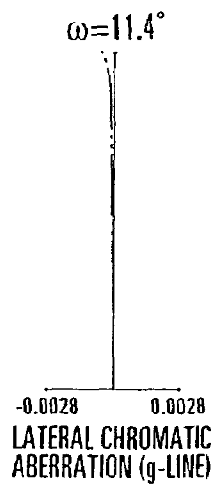

FIG. 49 is a lens block diagram showing a zoom lens according to the numerical example 13 of the invention. FIGS. 50A to 50D through FIGS. 52A to 52D are graphs showing aberration curves at the wide-angle end, the middle focal length position and the telephoto end, respectively, in the zoom lens according to the numerical example 13 of the invention.

Figure 53:
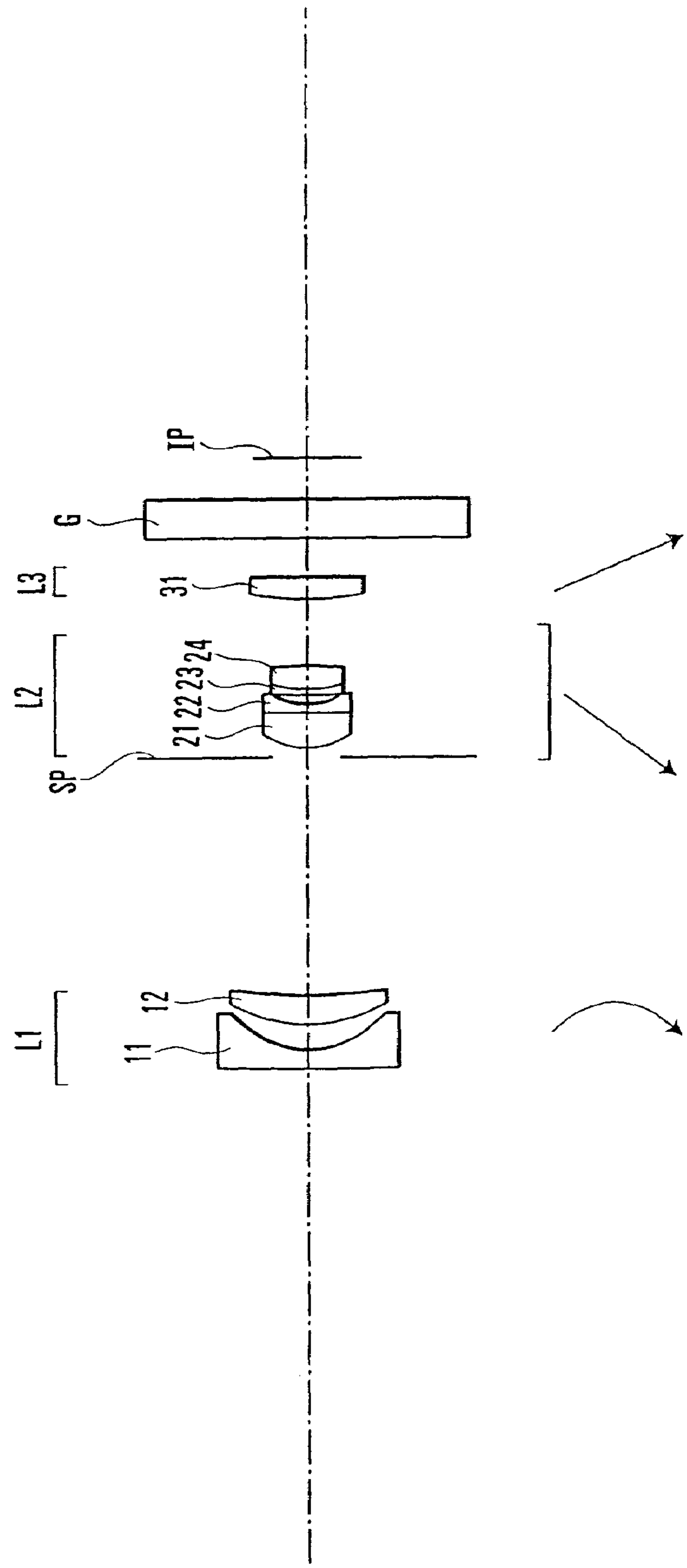
FIG. 53 is a lens block diagram showing a zoom lens at the wide-angle end according to a numerical example 14 of the invention.
Figure 54A:
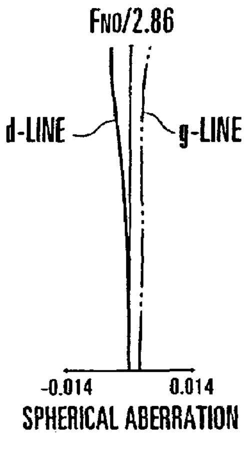
FIGS. 54A to 54D are graphs showing aberration curves at the wide-angle end in the zoom lens according to the numerical example 14 of the invention.
Figure 54B:
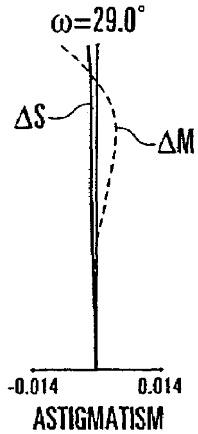
Figure 54C:
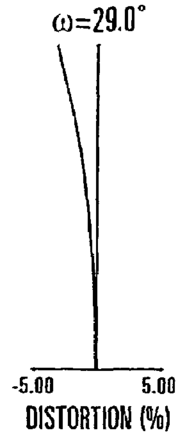
Figure 54D:
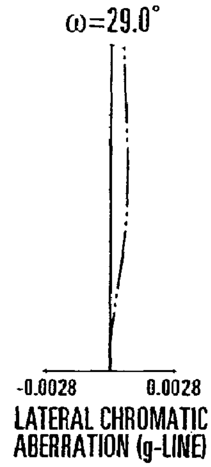
Figure 55A:
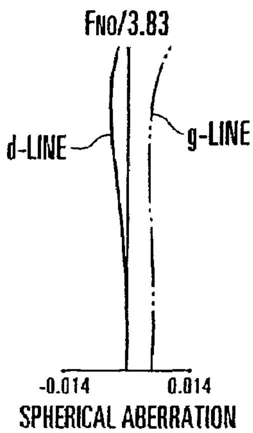
FIGS. 55A to 55D are graphs showing aberration curves at the middle focal length position in the zoom lens according to the numerical example 14 of the invention.
Figure 55B:
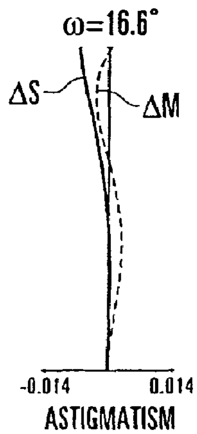
Figure 55C:
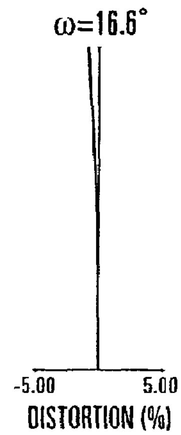
Figure 55D:
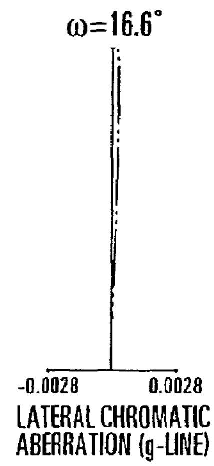
Figure 56A:
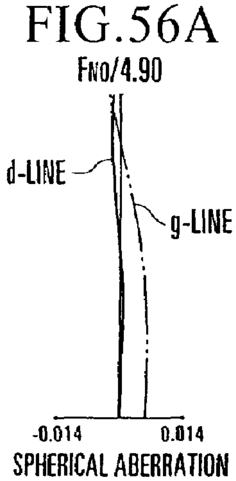
FIGS. 56A to 56D are graphs showing aberration curves at the telephoto end in the zoom lens according to the numerical example 14 of the invention.
Figure 56B:
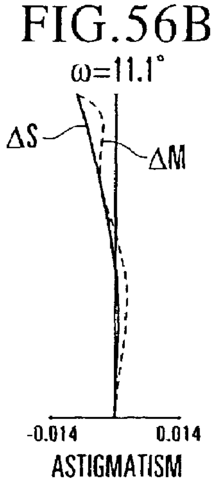
Figure 56C:
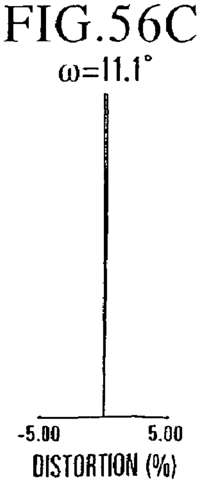
Figure 56D:
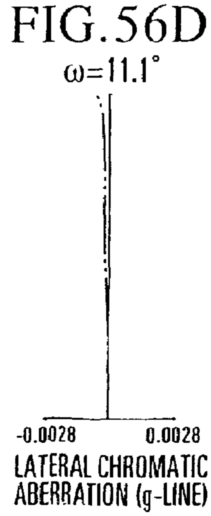

FIG. 53 is a lens block diagram showing a zoom lens according to the numerical example 14 of the invention. FIGS. 54A to 54D through FIGS. 56A to 56D are graphs showing aberration curves at the wide-angle end, the middle focal length position and the telephoto end, respectively, in the zoom lens according to the numerical example 14 of the invention.

Figure 57:
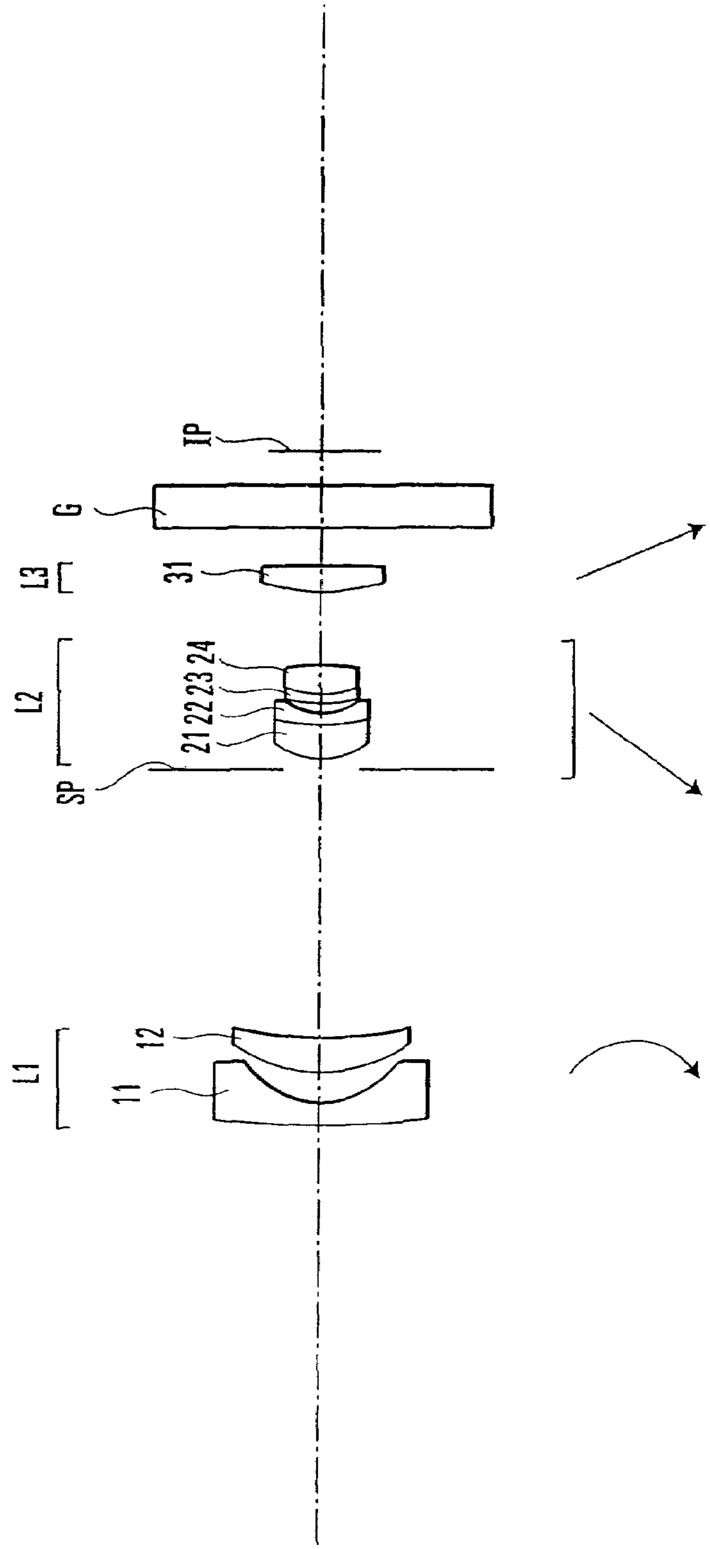
FIG. 57 is a lens block diagram showing a zoom lens at the wide-angle end according to a numerical example 15 of the invention.
Figure 58A:
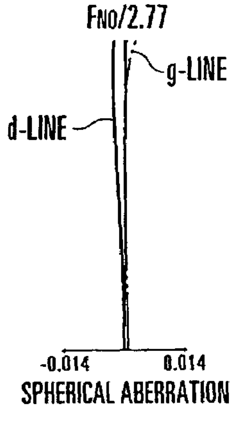
FIGS. 58A to 58D are graphs showing aberration curves at the wide-angle end in the zoom lens according to the numerical example 15 of the invention.
Figure 58B:
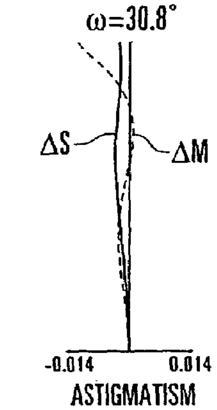
Figure 58C:
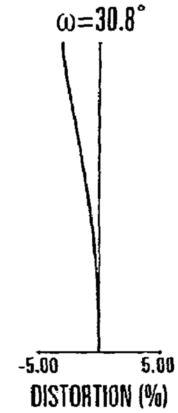
Figure 58D:
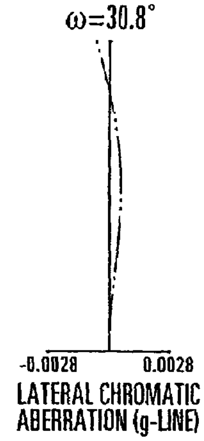
Figure 59A:
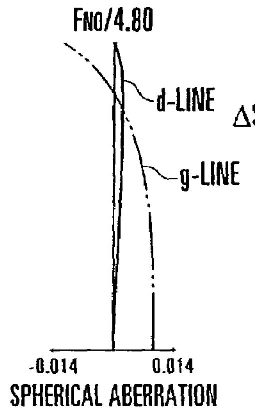
FIGS. 59A to 59D are graphs showing aberration curves at the middle focal length position in the zoom lens according to the numerical example 15 of the invention.
Figure 59B:
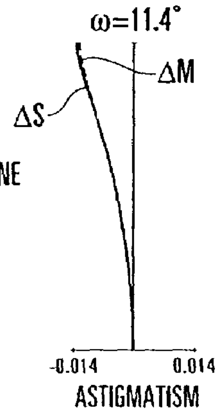
Figure 59C:
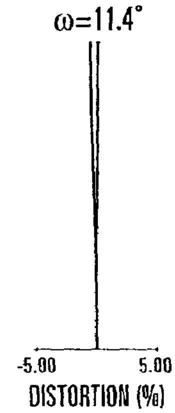
Figure 59D:
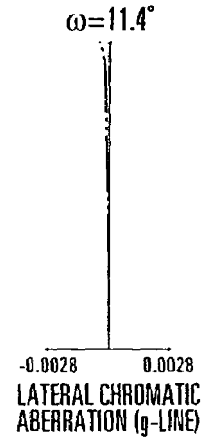
Figure 60A:
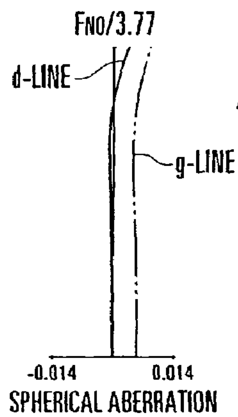
FIGS. 60A to 60D are graphs showing aberration curves at the telephoto end in the zoom lens according to the numerical example 15 of the invention.
Figure 60B:
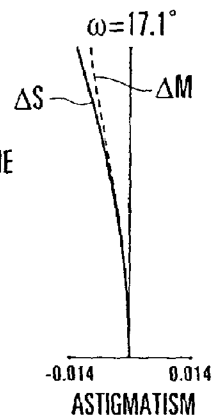
Figure 60C:
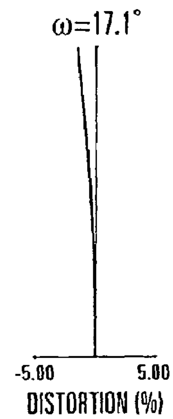
Figure 60D:
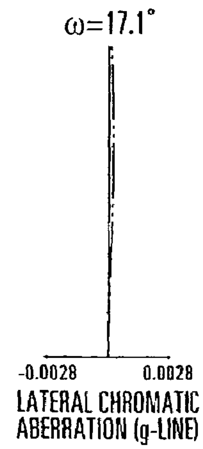

FIG. 57 is a lens block diagram showing a zoom lens according to the numerical example 15 of the invention. FIGS. 58A to 58D through FIGS. 60A to 60D are graphs showing aberration curves at the wide-angle end, the middle focal length position and the telephoto end, respectively, in the zoom lens according to the numerical example 15 of the invention.

In the lens block diagrams shown in FIGS. 45, 49, 53 and 57, reference character L1 denotes a first lens unit of negative refractive power, reference character L2 denotes a second lens unit of positive refractive power, reference character L3 denotes a third lens unit of positive refractive power, reference character SP denotes an aperture stop for determining the brightness of an optical system, reference character IP denotes an image plane, and reference character G denotes a glass block, such as a filter or a color separation prism.

As shown in the lens block diagrams of FIGS. 45, 49, 53 and 57, the zoom lens according to the fourth embodiment has three lens units, i.e., in order from the object side to the image side, the first lens unit L1 of negative refractive power, the second lens unit L2 of positive refractive power and the third lens unit L3 of positive refractive power. During the variation of magnification from the wide-angle end to the telephoto end, as indicated by the arrows shown in the lens block diagrams shown in FIGS. 45, 49, 53 and 57, the first lens unit L1 makes a reciprocating motion convex toward the image side, the second lens unit moves toward the object side, and the third lens unit moves toward the image side.

The zoom lens according to the fourth embodiment has the basic construction as described above. Then, according to the fourth embodiment, it is possible to attain a zoom lens having high optical performance, by making the zoom lens have such a lens construction as to satisfy at least one of the following conditions (19) to (22):

$$0.08<M3/fw<0.4 \quad (19)$$

$$0.7<|f1/ft|<1.0 \quad (20)$$

$$1.45<f3/ft<2.0 \quad (21)$$

$$0.63<f2/ft<0.8 \quad (22)$$

where M3 is an amount of movement of the third lens unit toward the image side during the variation of magnification from the wide-angle end to the telephoto end with an infinitely distant object focused on, fw and ft are focal lengths of the zoom lens at the wide-angle end and the telephoto end, respectively, and f1, f2 and f3 are focal lengths of the first lens unit, the second lens unit and the third lens unit, respectively.

Next, characteristic features of the lens construction of the zoom lens according to the fourth embodiment are described.

The first lens unit when the zoom lens is at the telephoto end is located at about the same position as when the zoom lens is at the wide-angle end, or is located slightly nearer to the image side than when the zoom lens is at the wide-angle end. Accordingly, the amount of movement of the first lens unit required when the zoom lens is retracted is prevented from becoming too large.

The aperture stop SP is disposed on the object side of the second lens unit L2, and is arranged to move along the optical axis integrally with the second lens unit.

In the zoom lens according to the fourth embodiment, the variation of magnification is effected mainly by moving the second lens unit of positive refractive power while the shift of an image point due to the variation of magnification is compensated for by moving forward and backward the first lens unit of negative refractive power and moving the third lens unit of positive refractive power toward the image side.

The third lens unit of positive refractive power shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, in particular, the telecentric image formation on the image side necessary for the optical apparatus using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

Further, in the fourth embodiment, the first lens unit of negative refractive power is composed of two lenses, i.e., in order from the object side to the image side, a negative lens 11 having a concave surface facing the image side, and a positive lens 12 of meniscus form having a convex surface facing the object side, the second lens unit of positive refractive power is composed of four lenses, i.e., a positive lens 21 of bi-convex form, a negative lens 22 of bi-concave form, a negative lens 23 of meniscus form having a convex surface facing the object side, and a positive lens 24 of bi-convex form, the positive lens 21 and the negative lens 22 constituting a cemented lens, the negative lens 23 and the positive lens 24 constituting a cemented lens, and the third lens unit of positive refractive power is composed of a single positive lens 31 having a strong convex surface facing the object side.

With the respective lens units having such a lens construction as to make the desired refractive power arrangement and the correction of aberration compatible with each other, as described above, it is possible to attain the compactness of a lens system while keeping the good optical performance of the lens system. The first lens unit of negative refractive power has the role of causing an off-axial principal ray to be pupil-imaged on the center of a stop, and, particularly, on the wide-angle side, the amount of refraction of an off-axial principal ray is large. Therefore, in the first lens unit, the various off-axial aberrations, particularly, astigmatism and distortion, are apt to occur. Accordingly, similarly to an ordinary wide-angle lens, the first lens unit is made to have the construction having a negative lens and a positive lens so as to prevent the diameter of a lens disposed on the most object side from increasing. Further, it is preferable that a lens surface on the image side of the negative lens 11 is such an aspheric surface that a negative refractive power becomes progressively weaker toward a marginal portion of the lens surface. By this arrangement, astigmatism and distortion are corrected in a well-balanced manner, and the first lens unit is composed of such a small number of lenses as two, so that it becomes easy to make the entire lens system compact.

The second lens unit of positive refractive power has, on the most object side thereof, the positive lens 21 having a strong convex surface facing the object side, so that the second lens unit has such a shape as to lessen the angle of refraction of an off-axial principal ray having exited from the first lens unit, thereby preventing the various off-axial aberrations from occurring. Further, the positive lens 21 is a lens arranged to allow an on-axial ray to pass at the largest height, and is concerned with the correction of, mainly, spherical aberration and coma. In the fourth embodiment, it is preferable that a lens surface on the object side of the positive lens 21 is such an aspheric surface that a positive refractive power becomes progressively weaker toward a marginal portion of the lens surface. By this arrangement, it becomes easy to correct well spherical aberration and coma. Further, the negative lens 22 disposed on the image side of the positive lens 21 is made to have a concave surface facing the image side, so that a negative air lens is formed by the lens surface on the image side of the negative lens 22 and a convex surface on the object side of the negative lens 23 disposed subsequent to the negative lens 22. Accordingly, it is possible to correct spherical aberration occurring due to the increase of an aperture ratio.

In addition, in the fourth embodiment, in order to cope with the reduction of the amount of chromatic aberration, which is required according to the increased number of pixels and the minimization of cell pitches of a solid-state image sensor such as a CCD, the second lens unit is composed of two cemented lenses. By this arrangement, it is possible to correct well longitudinal chromatic aberration and lateral chromatic aberration.

In the zoom lens according to the fourth embodiment, the third lens unit is moved toward the image side to make the third lens unit have the function of the variation of magnification and to lessen the burden of the variation of magnification imposed on the second lens unit, so that the amount of movement of the second lens unit is reduced, thereby attaining the reduction in the total lens length.

Next, the technical significance of each of the above-mentioned conditions (19) to (22) and the lens construction other than that mentioned in the foregoing are described.

(f-1) The condition (19) is provided mainly for reducing the size of the entire lens system.

If the amount of movement of the third lens unit becomes too small beyond the lower limit of the condition (19), the contribution of the third lens unit concerning the variation of magnification becomes small, necessitating moving the second lens unit much to that extent, so that the reduction in size of the lens system becomes insufficient. On the other hand, if the upper limit of the condition (19) is exceeded, it becomes difficult to secure the back focal distance at the telephoto end.

(f-2) The condition (20) is provided mainly for appropriately setting the refractive power of the first lens unit so as to correct well the various aberrations, such as distortion and curvature of field, as well as to secure the sufficient back focal distance, thereby attaining high optical performance.

If the focal length of the first lens unit becomes short beyond the lower limit of the condition (20), it becomes difficult to correct the variation of distortion or curvature of field during the variation of magnification. On the other hand, if the upper limit of the condition (20) is exceeded, it becomes difficult to secure the back focal distance.

(f-3) When a close-distance object is to be photographed by using the zoom lens according to the fourth embodiment, the good optical performance can be obtained by moving the first lens unit toward the object side. However, it is preferable to move the third lens unit also toward the object side. This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

(f-4) The condition (21) is provided for making the zoom lens have a more telecentric construction than the two-unit construction merely composed of a negative lens unit and a positive lens unit, by additionally providing the third lens unit of positive refractive power, and is provided for making the effect of the telecentric construction sufficient.

If the focal length of the third lens unit becomes too short beyond the lower limit of the condition (21), the composite focal length of the first lens unit and the second lens unit becomes long to that extent, so that the compactness of the entire lens system becomes insufficient. On the other hand, if the upper limit of the condition (21) is exceeded, the exit pupil becomes too short, in particular, at the wide-angle end, and, in a case where focusing is effected by using the third lens unit, the amount of movement required for focusing increases disadvantageously.

(f-5) The condition (22) is provided for reducing the amount of movement of the second lens unit required for the variation of magnification, to attain the reduction in size of the entire lens system.

If the focal length of the second lens unit becomes short beyond the lower limit of the condition (22), although an advantage arises in reducing the size of the lens system, the Petzval sum becomes too large in the positive direction, so that it becomes difficult to correct curvature of field. On the other hand, if the upper limit of the condition (22) is exceeded, the amount of movement of the second lens unit required for the variation of magnification becomes large, so that it becomes difficult to attain the reduction in size of the lens system.

(f-6) In the fourth embodiment, with the second lens unit consisting of two cemented lenses, the following advantages are obtained. Since a refractive power of the concave (negative) lens component in the so-called triplet type is separated into two components, the degree of freedom of the correction of aberration is increased as against an aberration correcting method using such a single concave lens component as that in the triplet type. Accordingly, it becomes unnecessary to correct off-axial flare, which, otherwise, is corrected by increasing the glass thickness of the concave lens component, or to correct spherical aberration due to two negative air lenses provided before and behind the concave lens component. Therefore, it becomes possible to lessen the thickness on the optical axis of the second lens unit as compared with the triplet type. Thus, the second lens unit composed of two cemented lenses contributes to the shortening of the entire optical system and the shortening of the total length of the lens system as retracted.

(f-7) It is desirable that the third lens unit is composed of a single positive lens, from the viewpoints of the size of the lens system and the reduction of load imposed on an actuator required for focusing. In this instance, it is preferable to satisfy the following condition:

$$-1.5<(R3f+R3r)/(R3f-R3r)<-0.5 \quad (23)$$

where R3f is a radius of curvature of a lens surface on the object side of the single positive lens, and R3r is a radius of curvature of a lens surface on the image side of the single positive lens.

The condition (23) is provided for, when the third lens unit is a single positive lens of spherical form, appropriately setting the shape of the single positive lens so as to enable focusing to be effected while lessening the variation of aberration.

If the lower limit of the condition (23) is exceeded, the ghost occurring due to the interreflection between the image pickup surface and the lens surface on the object side of the single positive lens of the third lens unit becomes apt to be formed in the vicinity of the image pickup surface. If it is intended to avoid this ghost, it becomes necessary to take the excessive back focal distance, thereby making it difficult to sufficiently reduce the size of the lens system. On the other hand, if the upper limit of the condition (23) is exceeded, in a case where focusing is effected by using the third lens unit, it becomes difficult to correct spherical aberration and astigmatism caused by the focusing.

(f-8) If such an aspheric surface that a positive refractive power becomes progressively weaker toward a marginal portion thereof is introduced into the third lens unit, it is possible to further reduce the variation of astigmatism during the variation of magnification.

According to the fourth embodiment of the invention, it is possible to attain a zoom lens which is suited for a photographic system using a solid-state image sensor, is compact with less constituent lens elements, is corrected particularly for chromatic aberration, and has excellent optical performance, by constructing the zoom lens with three lens units, i.e., in order from the object side to the image side, a first lens unit of negative refractive power, a second lens unit of positive refractive power and a third lens unit of positive refractive power, effecting the variation of magnification by varying the separation between the respective adjacent lens units, and appropriately setting the refractive power arrangement, the amount of movement and the shape of each lens unit.

Further, it is possible to effectively correct the various off-axial aberrations, particularly, astigmatism and distortion, and spherical aberration caused by the increase of an aperture ratio, by introducing an aspheric surface into each lens unit.

Next, numerical data of the numerical examples 12 to 15 of the invention are shown.

In addition, the values of the factors in the above-mentioned conditions (19) to (23) for the numerical examples 12 to 15 are listed in Table-4.

Numerical Example 12:

| f = 1–2.83 Fno = 2.87–4.90 2ω = 59.5°–22.8° | | | |
|---|---|---|---|
| R1 = 10.855 | D1 = 0.21 | N1 = 1.802380 | ν1 = 40.8 |
| R2 = 0.830* | D2 = 0.31 | | |
| R3 = 1.545 | D3 = 0.29 | N2 = 1.846660 | ν2 = 23.9 |
| R4 = 4.768 | D4 = Variable | | |
| R5 = Stop | D5 = 0.11 | | |
| R6 = 0.885* | D6 = 0.43 | N3 = 1.802380 | ν3 = 40.8 |
| R7 = −5.079 | D7 = 0.10 | N4 = 1.698947 | ν4 = 30.1 |
| R8 = 0.720 | D8 = 0.08 | | |
| R9 = 2.210 | D9 = 0.09 | N5 = 1.698947 | ν5 = 30.1 |
| R10 = 0.944 | D10 = 0.31 | N6 = 1.603112 | ν6 = 60.6 |
| R11 = −3.065 | D11 = Variable | | |
| R12 = 2.292 | D12 = 0.21 | N7 = 1.518229 | ν7 = 58.9 |
| R13 = 144.538 | D13 = 0.43 | | |
| R14 = ∞ | D14 = 0.44 | N8 = 1.516330 | ν8 = 64.1 |
| R15 = ∞ | | | |

*Aspheric Surface

| Variable Separation | Focal Length 1.00 | 2.41 | 2.83 |
|---|---|---|---|
| D4 | 2.57 | 0.54 | 0.32 |
| D11 | 0.87 | 2.62 | 3.11 |

Aspheric Coefficients:

| | | | |
|---|---|---|---|
| R2 | K = −1.30000e+00 | B = 1.19770e−01 | C = 6.17069e−02 |
| | D = −1.61837e−01 | E = 1.55951e−01 | F = −4.47577e−02 |
| R6 | K = −6.96530e−02 | B = −6.61431e−02 | C = −4.49055e−02 |
| | D = −6.81707e−02 | E = −4.05399e−02 | F = 0.00000e+00 |

Numerical Example 13:

| f = 1–2.83 Fno = 2.86–4.90 2ω = 59.5°–22.8° | | | |
|---|---|---|---|
| R1 = 9.686 | D1 = 0.21 | N1 = 1.802380 | ν1 = 40.8 |
| R2 = 0.838* | D2 = 0.31 | | |
| R3 = 1.532 | D3 = 0.29 | N2 = 1.846660 | ν2 = 23.9 |
| R4 = 4.456 | D4 = Variable | | |
| R5 = Stop | D5 = 0.11 | | |
| R6 = 0.884* | D6 = 0.44 | N3 = 1.743300 | ν3 = 49.3 |
| R7 = −3.817 | D7 = 0.10 | N4 = 1.603420 | ν4 = 38.0 |
| R8 = 0.715 | D8 = 0.09 | | |
| R9 = 2.243 | D9 = 0.09 | N5 = 1.698947 | ν5 = 30.1 |
| R10 = 0.828 | D10 = 0.31 | N6 = 1.603112 | ν6 = 60.6 |
| R11 = −3.729 | D11 = Variable | | |
| R12 = 2.648 | D12 = 0.21 | N7 = 1.603112 | ν7 = 60.6 |
| R13 = 44.247 | D13 = 0.43 | | |
| R14 = ∞ | D14 = 0.44 | N8 = 1.516330 | ν8 = 64.1 |
| R15 = ∞ | | | |

*Aspheric Surface

| Variable Separation | Focal Length 1.00 | 2.40 | 2.83 |
|---|---|---|---|
| D4 | 2.60 | 0.54 | 0.32 |
| D11 | 0.77 | 2.54 | 3.05 |

Aspheric Coefficients:

| | | | |
|---|---|---|---|
| R2 | K = −1.30000e+00 | B = 1.18880e−01 | C = 8.30828e−02 |
| | D = −2.46182e−01 | E = 3.32011e−01 | F = −1.68932e−01 |
| R6 | K = −9.46702e−02 | B = −7.14402e−02 | C = −3.93806e−02 |
| | D = −9.10926e−02 | E = −4.05399e−02 | F = 0.00000e+00 |

Numerical Example 14:

| f = 1–2.83 Fno = 2.86–4.90 2ω = 58.0°–22.2° | | | |
|---|---|---|---|
| R1 = 40.701 | D1 = 0.21 | N1 = 1.806100 | ν1 = 40.7 |
| R2 = 0.876* | D2 = 0.28 | | |
| R3 = 1.641 | D3 = 0.31 | N2 = 1.846660 | ν2 = 23.9 |
| R4 = 7.676 | D4 = Variable | | |
| R5 = Stop | D5 = 0.11 | | |
| R6 = 0.797* | D6 = 0.37 | N3 = 1.743300 | ν3 = 49.3 |
| R7 = 38.519 | D7 = 0.08 | N4 = 1.647689 | ν4 = 33.8 |
| R8 = 0.674 | D8 = 0.09 | | |
| R9 = 2.419 | D9 = 0.07 | N5 = 1.846660 | ν5 = 23.9 |
| R10 = 1.359 | D10 = 0.25 | N6 = 1.603112 | ν6 = 60.6 |
| R11 = −2.632 | D11 = Variable | | |
| R12 = 3.108* | D12 = 0.24 | N7 = 1.589130 | ν7 = 61.3 |
| R13 = −25.016 | D13 = 0.42 | | |
| R14 = ∞ | D14 = 0.43 | N8 = 1.516330 | ν8 = 64.1 |
| R15 = ∞ | | | |

*Aspheric Surface

| Variable Separation | Focal Length 1.00 | 2.39 | 2.83 |
|---|---|---|---|
| D4 | 2.58 | 0.51 | 0.27 |
| D11 | 0.72 | 2.55 | 3.04 |

Aspheric Coefficients:

| | | | |
|---|---|---|---|
| R2 | K = −2.25821e+00 | B = 2.69487e−01 | C = −1.72442e−01 |
| | D = 1.53228e−01 | E = −1.20333e−01 | F = 4.19943e−02 |
| R6 | K = −9.88795e−02 | B = −7.77363e−02 | C = −4.83226e−02 |
| | D = −1.69170e−01 | E = 7.89854e−03 | F = 0.00000e+00 |
| R12 | K = −2.86549e+00 | B = −2.19540e−02 | C = 1.90603e−01 |
| | D = −6.03124e−01 | E = 7.17200e−01 | F = −5.29660e−02 |

Numerical Example 15:

| f = 1–2.95 Fno = 2.77–4.80 2ω = 61.7° –22.9° | | | |
|---|---|---|---|
| R1 = 11.859 | D1 = 0.23 | N1 = 1.802380 | ν1 = 40.7 |
| R2 = 0.886* | D2 = 0.35 | | |
| R3 = 1.689 | D3 = 0.38 | N2 = 1.846660 | ν2 = 23.9 |
| R4 = 5.373 | D4 = Variable | | |
| R5 = Stop | D5 = 0.12 | | |
| R6 = 0.868* | D6 = 0.40 | N3 = 1.743300 | ν3 = 49.3 |
| R7 = 2.419 | D7 = 0.11 | N4 = 1.647689 | ν4 = 33.8 |
| R8 = 0.732 | D8 = 0.12 | | |
| R9 = 1.890 | D9 = 0.09 | N5 = 1.846660 | ν5 = 23.9 |
| R10 = 1.093 | D10 = 0.33 | N6 = 1.603112 | ν6 = 60.6 |
| R11 = −3.344 | D11 = Variable | | |
| R12 = 2.445 | D12 = 0.27 | N7 = 1.487490 | ν7 = 70.2 |
| R13 = −37.684 | D13 = 0.45 | | |
| R14 = ∞ | D14 = 0.46 | N8 = 1.516330 | ν8 = 64.1 |
| R15 = ∞ | | | |

*Aspheric Surface

| Variable Separation | Focal Length 1.00 | 2.50 | 2.95 |
|---|---|---|---|
| D4 | 2.98 | 0.60 | 0.35 |
| D11 | 0.83 | 2.82 | 3.36 |

Aspheric Coefficients:

| | | | |
|---|---|---|---|
| R2 | K = −1.55665e+00 | B = 1.47610e−01 | C = −2.95829e−02 |
| | D = 3.79213e−02 | E = −5.88716e−02 | F = 3.154797e−02 |
| R6 | K = −1.02390e−01 | B = −5.07761e−02 | C = −3.18134e−02 |
| | D = −5.79304e−02 | E = −2.08294e−02 | F = 0.00000e+00 |

TABLE 4

| | | Numerical Example | | | |
|---|---|---|---|---|---|
| Condition | | 12 | 13 | 14 | 15 |
| (19) | M3/fw | 0.173 | 0.241 | 0.324 | 0.173 |
| (20) | \|f1/ft\| | 0.838 | 0.855 | 0.890 | 0.857 |
| (21) | f3/ft | 1.588 | 1.648 | 1.665 | 1.600 |
| (22) | f2/ft | 0.719 | 0.720 | 0.725 | 0.759 |
| (23) | (R3f + R3r)/(R3f − R3r) | −1.032 | −1.127 | — | −0.878 |

According to the fourth embodiment of the invention, it is possible to attain a zoom lens which is compact and small in diameter with less constituent lens elements, has a high variable magnification ratio and has excellent optical performance.

Figure 61:
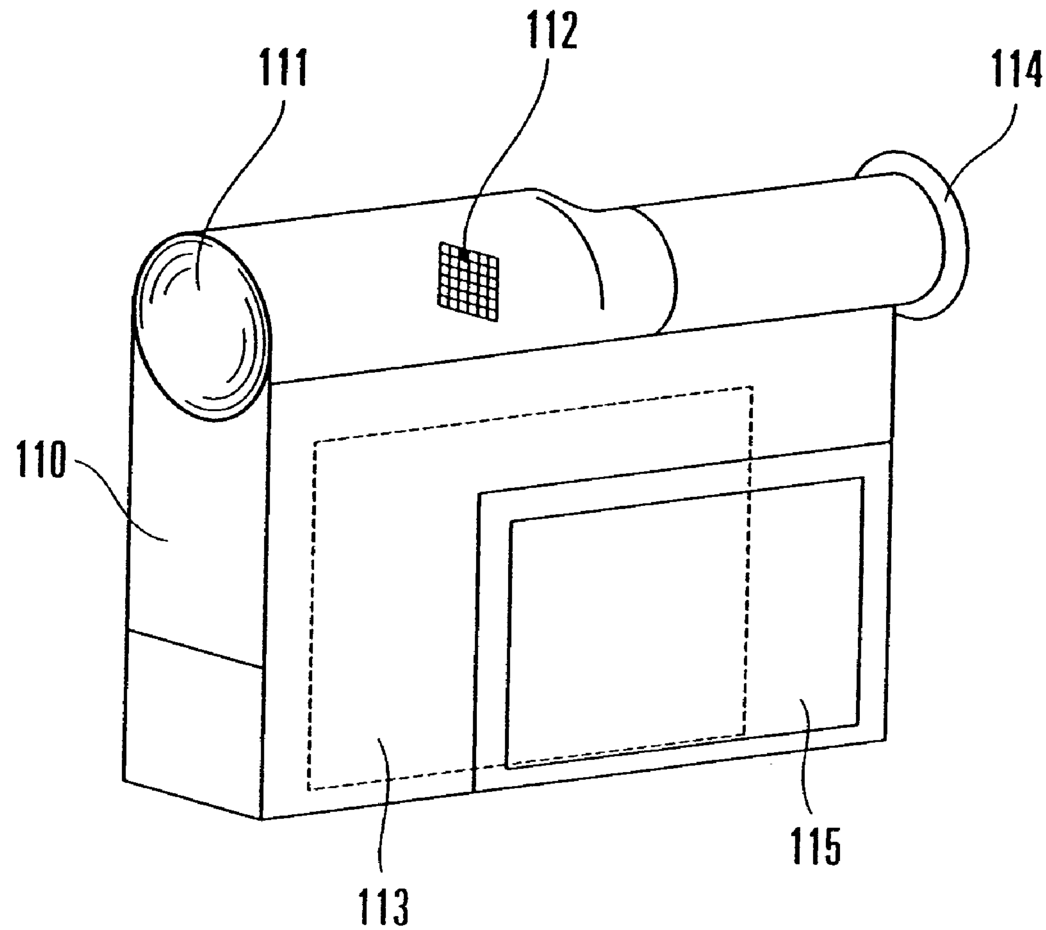
FIG. 61 is a schematic diagram showing a video camera in which a zoom lens according to the invention is used as a photographic optical system.

Next, a video camera (optical apparatus) using, as a photographic optical system, a zoom lens set forth in any one of the above numerical examples 1 to 15 is described as an embodiment of the invention with reference to FIG. 61.

Referring to FIG. 61, the video camera includes a video camera body 110, a photographic optical system 111 composed of a zoom lens according to the invention, an image sensor 112, such as a CCD, arranged to receive an object image formed through the photographic optical system 111, a recording means 113 for recording the object image received by the image sensor 112, and a viewfinder 114 used for observing an object image displayed on a display element (not shown). The display element is composed of a liquid crystal panel or the like, and is arranged to display thereon the object image formed on the image sensor 112.

As described above, by applying a zoom lens according to the invention to an optical apparatus, such as a video camera, it is possible to realize an optical apparatus which is small in size and has high optical performance.

What is claimed is:

1. A zoom lens, comprising, in order from an object side to an image side:

a first lens unit of negative optical power, said first lens unit consisting of, in order from the object side to the image side, a negative lens and a positive lens;

a second lens unit of positive optical power; and a third lens unit of positive optical power, wherein a separation between said first lens unit and said second lens unit and a separation between said second lens unit and said third lens unit are varied to effect variation of magnification, wherein, during the variation of magnification from a wide-angle end to a telephoto end with an infinitely distant object focused on, said third lens unit moves monotonically toward the image side or moves with a locus convex toward the image side, and wherein said zoom lens satisfies the following condition:

$$0.7<|f1/ft|<1.0$$

where f1 is a focal length of said first lens unit, and ft is a focal length of said zoom lens at the telephoto end.

2. A zoom lens according to claim 1, wherein said zoom lens satisfies the following condition:

$$1.45<f3/ft<2.0$$

where f3 is a focal length of said third lens unit, and ft is a focal length of said zoom lens at the telephoto end.

3. A zoom lens according to claim 1, wherein said zoom lens satisfies the following condition:

$$0.63<f2/ft<0.8$$

where f2 is a focal length of said second lens unit, and ft is a focal length of said zoom lens at the telephoto end.

4. A zoom lens according to claim 1, wherein said third lens unit consists of one positive lens.

5. A zoom lens according to claim 4, wherein said zoom lens satisfies the following condition:

$$-1.5<(R3f+R3r)/(R3f-R3r)<-0.5$$

where R3f is a radius of curvature of a lens surface on the object side of the positive lens of said third lens unit, and R3r is a radius of curvature of a lens surface on the image side of the positive lens of said third lens unit.

6. A zoom lens according to claim 1, wherein said second lens unit consists of a first cemented lens and a second cemented lens, each of said first and second cemented lenses consisting of two lens elements cemented together.

7. A zoom lens according to claim 1, wherein said third lens unit moves toward the object side during focusing from an infinitely distant object to a closest object.

8. An optical apparatus, comprising:

a zoom lens according to claim 1.

9. A zoom lens according to claim 1, wherein during the variation of magnification from a wide-angle end to a telephoto end with an infinitely distant object focused on, said third lens unit moves monotonically toward the image side.

10. A zoom lens according to claim 1, wherein during the variation of magnification from a wide-angle end to a telephoto end with an infinitely distant object focused on, said third lens unit moves with a locus convex toward the image side.

* * * * *